US012151833B2

(12) United States Patent
Mukae

(10) Patent No.: US 12,151,833 B2
(45) Date of Patent: Nov. 26, 2024

(54) SATELLITE CONSTELLATION FORMING SYSTEM, SATELLITE CONSTELLATION FORMING METHOD, AND GROUND FACILITY

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 17/761,227

(22) PCT Filed: Sep. 25, 2020

(86) PCT No.: PCT/JP2020/036342
§ 371 (c)(1),
(2) Date: Mar. 17, 2022

(87) PCT Pub. No.: WO2021/060491
PCT Pub. Date: Apr. 1, 2021

(65) Prior Publication Data
US 2022/0363416 A1    Nov. 17, 2022

(30) Foreign Application Priority Data

Sep. 26, 2019    (JP) ................. 2019-175079

(51) Int. Cl.
*B64G 3/00* (2006.01)
*B64G 1/10* (2006.01)
(Continued)

(52) U.S. Cl.
CPC ............. *B64G 3/00* (2013.01); *B64G 1/1085* (2013.01); *B64G 1/242* (2013.01); *G06Q 10/04* (2013.01); *G06Q 30/0283* (2013.01)

(58) Field of Classification Search
CPC ........ B64G 1/1085; B64G 1/242; B64G 3/00; G06Q 10/04; G06Q 30/0283
See application file for complete search history.

(56) References Cited

U.S. PATENT DOCUMENTS

| 5,199,672 A * | 4/1993 | King ................... B64G 1/2427 244/164 |
| 6,198,990 B1 * | 3/2001 | Croom ................ B64G 1/2427 701/13 |

(Continued)

FOREIGN PATENT DOCUMENTS

| JP | 2016-43891 A | 4/2016 |
| JP | 2017-114159 A | 6/2017 |

OTHER PUBLICATIONS

International Search Report and Written Opinion mailed on Dec. 15, 2020, received for PCT Application PCT/JP2020/036341, Filed on Sep. 25, 2020, 9 pages including English Translation.

(Continued)

*Primary Examiner* — Tyler J Lee
(74) *Attorney, Agent, or Firm* — XSENSUS LLP

(57) ABSTRACT

An object is to appropriately manage disclosure of information on the orbit of a satellite constellation. An information management device (1000) is installed in at least one of a plurality of management business devices each of which conducts a management business for a plurality of space objects flying in space. A storage unit (1400) stores orbit forecast information (51) including an orbit forecast, which is a forecast value of an orbit of each of the plurality of space objects, and a forecast error that is forecast for the orbit. An information disclosure unit (1100) determines whether the orbit forecast information (51) is to be disclosed to a different information management device, based on a disclosure threshold (141) for determining whether the orbit (Continued)

forecast information (51) is to be disclosed and the forecast error.

4 Claims, 49 Drawing Sheets

(51) Int. Cl.
  *B64G 1/24* (2006.01)
  *G06Q 10/04* (2023.01)
  *G06Q 30/02* (2023.01)
  *G06Q 30/0283* (2023.01)

(56) References Cited

U.S. PATENT DOCUMENTS

| | | | |
|---|---|---|---|
| 7,587,325 B1 | 9/2009 | Scott | |
| 7,689,358 B2* | 3/2010 | Jaeger | B64G 1/242 |
| | | | 701/531 |
| 9,463,882 B1* | 10/2016 | Field | B64G 1/645 |
| 9,617,017 B1 | 4/2017 | Kaplan | |
| 9,714,101 B1 | 7/2017 | Kaplan | |
| 10,453,351 B2 | 10/2019 | Choi et al. | |
| 10,829,249 B2* | 11/2020 | Amimoto | B64G 1/2427 |
| 11,104,456 B2 | 8/2021 | Schilling | |
| 2002/0003192 A1* | 1/2002 | Taormina | H04B 7/195 |
| | | | 244/158.4 |
| 2004/0024527 A1 | 2/2004 | Patera | |
| 2006/0016934 A1* | 1/2006 | Sharer | B64G 1/2427 |
| | | | 244/158.4 |
| 2008/0177430 A1 | 7/2008 | Tekawy et al. | |
| 2009/0230249 A1* | 9/2009 | Geneste | B64G 1/242 |
| | | | 244/171.1 |
| 2011/0121139 A1 | 5/2011 | Poulos | |
| 2011/0198446 A1 | 8/2011 | Knirsch | |
| 2012/0225725 A1 | 9/2012 | Velasco-Tang | |
| 2017/0193830 A1 | 7/2017 | Fragoso | |
| 2018/0268605 A1 | 9/2018 | Jia | |
| 2018/0370658 A1 | 12/2018 | Amimoto et al. | |
| 2019/0251215 A1 | 8/2019 | Linares | |
| 2019/0389602 A1 | 12/2019 | Schilling | |
| 2020/0062426 A1 | 2/2020 | Drexler | |
| 2021/0183249 A1 | 6/2021 | Beauchamp | |
| 2021/0403181 A1* | 12/2021 | L | B64G 1/644 |
| 2022/0371755 A1 | 11/2022 | Mukae | |

OTHER PUBLICATIONS

Murakami et al., "Space Traffic Management with a NASA UAS Traffic Management (UTM) Inspired Architecture", AIAA SciTech Forum, Jan. 7-11, 2019, pp. 1-27.
International Search Report and Written Opinion mailed on Dec. 15, 2020, received for PCT Application PCT/JP2020/036342, Filed on Sep. 25, 2020, 8 pages including English Translation.
Handley, "Delay is Not an Option: Low Latency Routing in Space", Available Online at: https://people.eecs.berkeley.edu/~sylvia/cs268-2019/papers/starlink.pdf, 2019, 7 pages.
International Search Report and Written Opinion mailed on Dec. 15, 2020, received for PCT Application PCT/JP2020/036343, Filed on Sep. 25, 2020, 11 pages including English Translation.
Office Action issued on Nov. 15, 2022, in Japanese patent Application No. 2021-549060, which corresponds to co-pending U.S. Appl. No. 17/761,239.
Office Action issued on Nov. 1, 2022, in Japanese patent Application No. 2021-549058, which corresponds to co-pending U.S. Appl. No. 17/761,199, 5 pages.
Office Action issued on Nov. 15, 2022, in Japanese patent Application No. 2021-549060, which corresponds to co-pending U.S. Appl. No. 17/761,239, 9 pages.
US Office Action issued Feb. 8, 2924, in corresponding U.S. Appl. No. 17/761,239, 41 pages.
Office Action issued on Nov. 1, 2022, in corresponding Japanese patent Application No. 2021-549058, 5 pages.
Office Action issued Apr. 1, 2024, in co-pending U.S. Appl. No. 17/761,199.

* cited by examiner

Fig. 11

511: SPACE OBJECT ID
512: FORECAST EPOCH
513: FORECAST ORBITAL ELEMENTS
51: ORBIT FORECAST INFORMATION
514: FORECAST ERROR
515: FORECAST FLIGHT STATE

| SPACE OBJECT ID | | EPOCH | SIX KEPLERIAN ELEMENTS | | | | | | FORECAST ERROR | | | | |
|---|---|---|---|---|---|---|---|---|---|---|---|---|---|
| SATELLITE ID | DEBRIS ID | Epoch | Mean Motion | Eccentricity | Inclination | RAAN | Argument of Perigee | Mean Anomaly | TRAVEL DIRECTION | ORTHOGONAL DIRECTION | BASIS | VERIFICATION RECORD | FORECAST FLIGHT STATE |
| | | Year and date | Orbits/day | No unit | deg | deg | deg | deg | km | km | | | |
| A | | a1 | a2 | a3 | a4 | a5 | a6 | a7 | a8 | a9 | IN-ORBIT MEASUREMENT | VERIFIED ON GROUND | STEADY OPERATION |
| B | | b1 | b2 | b3 | b4 | b5 | b6 | b7 | b8 | b9 | IN-ORBIT MEASUREMENT | | STEADY OPERATION |
| C | | c1 | c2 | c3 | c4 | c5 | c6 | c7 | c8 | c9 | IN-ORBIT ANALYSIS | | |
| D | | d1 | d2 | d3 | d4 | d5 | d6 | d7 | d8 | d9 | GROUND MEASUREMENT | VERIFIED BY STATISTICS | STEADY OPERATION |
| E | | e1 | e2 | e3 | e4 | e5 | e6 | e7 | e8 | e9 | GROUND MEASUREMENT | | |
| F | | f1 | f2 | f3 | f4 | f5 | f6 | f7 | f8 | f9 | SSA MEASUREMENT | | NON-STEADY OPERATION |
| | α | α1 | α2 | α3 | α4 | α5 | α6 | α7 | α8 | α9 | SSA MEASUREMENT | | |
| | β | β1 | β2 | β3 | β4 | β5 | β6 | β7 | β8 | β9 | SSA MEASUREMENT | | |
| | γ | γ1 | γ2 | γ3 | γ4 | γ5 | γ6 | γ7 | γ8 | γ9 | SSA MEASUREMENT | | |
| | δ | δ1 | δ2 | δ3 | δ4 | δ5 | δ6 | δ7 | δ8 | δ9 | SSA MEASUREMENT | | |

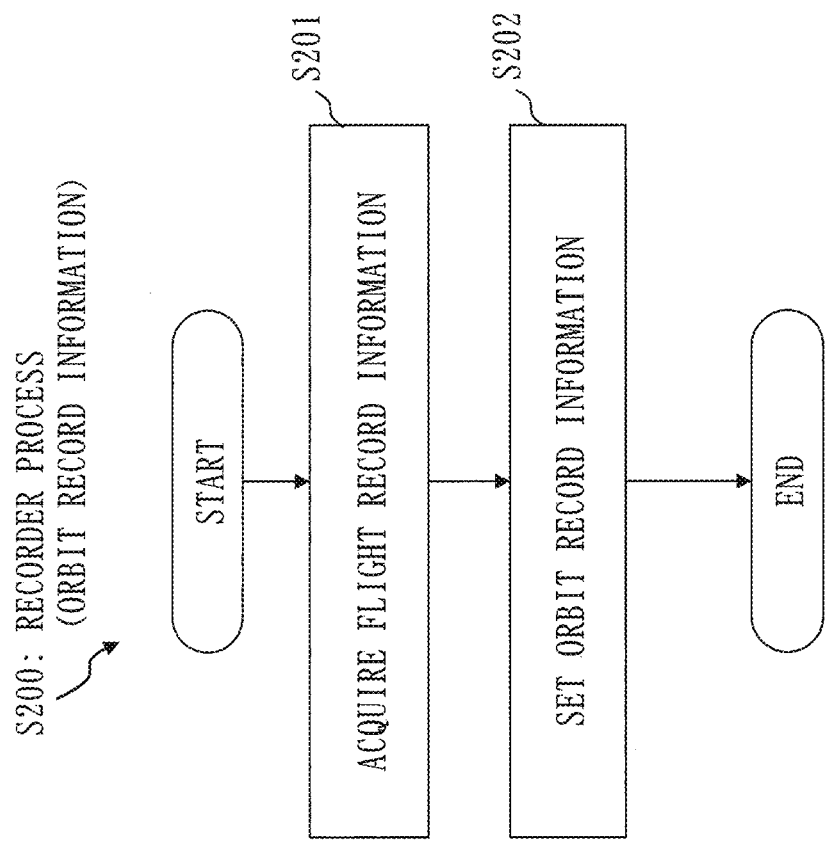

Fig. 13

521: SPACE OBJECT ID  52: ORBIT RECORD INFORMATION  525: RECORD FLIGHT STATE
522: RECORD EPOCH  523: RECORD ORBITAL ELEMENTS  524: SPECIFIC TIME
241: SPECIFIC TIME  242: RECORD LOCATION COORDINATES

| SATELLITE ID | DEBRIS ID | Epoch Year and day | SIX KEPLERIAN ELEMENTS ||||||| TIME | LOCATION COORDINATES ||| RECORD FLIGHT STATE |
|---|---|---|---|---|---|---|---|---|---|---|---|---|---|
| | | | Mean Motion Orbits/day | Eccentricity No unit | Inclination deg | RAAN deg | Argument of Perigee deg | Mean Anomaly deg | | R | AZ | EL | |
| A | | a1 | a2 (actual) | a3 (actual) | a4 (actual) | a5 (actual) | a6 (actual) | a7 (actual) | ta | r a | aza | e1a | STEADY OPERATION |
| B | | b1 | b2 (actual) | b3 (actual) | b4 (actual) | b5 (actual) | b6 (actual) | b7 (actual) | tb | r b | azb | e1b | STEADY OPERATION |
| C | | c1 | c2 (actual) | c3 (actual) | c4 (actual) | c5 (actual) | c6 (actual) | c7 (actual) | tc | r c | azc | e1c | |
| D | | d1 | d2 (actual) | d3 (actual) | d4 (actual) | d5 (actual) | d6 (actual) | d7 (actual) | td | r d | azd | e1d | STEADY OPERATION |
| E | | e1 | e2 (actual) | e3 (actual) | e4 (actual) | e5 (actual) | e6 (actual) | e7 (actual) | te | r e | aze | e1e | |
| F | | f1 | f2 (actual) | f3 (actual) | f4 (actual) | f5 (actual) | f6 (actual) | f7 (actual) | tf | r f | azf | e1f | NON-STEADY OPERATION |
| | A | α1 | α2 (actual) | α3 (actual) | α4 (actual) | α5 (actual) | α6 (actual) | α7 (actual) | tα | r α | azα | e1α | |
| | B | β1 | β2 (actual) | β3 (actual) | β4 (actual) | β5 (actual) | β6 (actual) | β7 (actual) | tβ | r β | azβ | e1β | |
| | Γ | γ1 | γ2 (actual) | γ3 (actual) | γ4 (actual) | γ5 (actual) | γ6 (actual) | γ7 (actual) | tγ | r γ | azγ | e1γ | |
| | Δ | δ1 | δ2 (actual) | δ3 (actual) | δ4 (actual) | δ5 (actual) | δ6 (actual) | δ7 (actual) | tδ | r δ | azδ | e1δ | |

Fig.18

USE DESCRIPTION:PROXIMITY ANALYSIS
AND COLLISION ANALYSIS BETWEEN TWO
OBJECTS

OUTPUT:
PROXIMITY/
COLLISION
PREDICTION

141: ALERT ISSUANCE INFORMATION

PRIMARY USE

| | SATELLITE ID1 | SATELLITE ID2 | DEBRIS ID1 | TIME | LOCATION COORDINATES | | | PROXIMITY DISTANCE |
|---|---|---|---|---|---|---|---|---|
| | | | | | R | AZ | EL | L |
| | | | | | km | deg | deg | km |
| PROXIMITY ALERT | A | B | | t1 | r1 | az1 | el1 | 100 |
| | C | | Γ | t2 | r2 | az2 | el2 | 80 |
| COLLISION ALERT | D | E | | t3 | r3 | az3 | el3 | (d8+e8) or less |
| | F | | Δ | t4 | r4 | az4 | el4 | (f8+δ8) or less |

Fig. 28

| | COLLISION AVOIDANCE OPERATION RESPONSIBILITY INITIAL ALGORITHM |
|---|---|
| STEP 1 | RISK ANALYSIS OF HIGHER-ORDER DAMAGE<br>· HIGH RISK IN CONGESTED ORBIT<br>· HIGH RISK IN MEGA-CONSTELLATION |
| STEP 2 | RESPONSIBILITY ASSIGNMENT FOR COLLISION AVOIDANCE (PART 1)<br>· WHEN AVOIDANCE ACTION IS POSSIBLE BETWEEN PARTIES CONCERNED ⇒ ADJUSTMENT OF RESPONSIBILITY BETWEEN PARTIES CONCERNED<br>· WHEN AVOIDANCE ACTION IS NOT POSSIBLE BETWEEN PARTIES CONCERNED ⇒ DEBRIS REMOVAL BUSINESS OPERATOR |
| STEP 2-1 | ADJUSTMENT OF COLLISION AVOIDANCE RESPONSIBILITY BETWEEN PARTIES CONCERNED<br>JUDGE THE FOLLOWING DEPENDING ON INDIVIDUAL SITUATION, ON BASIS THAT PARTY IN NON-STEADY OPERATION WILL NOT CAUSE ADVERSE INFLUENCE ON PARTY IN STEADY OPERATION<br>· IF OBJECT INTRUDES INTO CONGESTED ORBIT, COLLISION AVOIDANCE ACTION WILL BECOME NEW COLLISION RISK. THUS, REQUEST INTRUDING PARTY TO TAKE COLLISION AVOIDANCE ACTION.<br>· IF OBJECT WILL INTRUDE INTO ORBIT OF MEGA-CONSTELLATION, REQUEST MEGA-CONSTELLATION BUSINESS OPERATOR HAVING HIGH-PRECISION ORBIT INFORMATION TO TAKE COLLISION AVOIDANCE ACTION.<br>· FOR ROCKET BUSINESS OPERATOR AND MEGA-CONSTELLATION BUSINESS OPERATOR, MEDIATE ADJUSTMENT BETWEEN PARTIES CONCERNED (ASSIGNMENT RESULT DEPENDS ON SITUATION)<br>· FOR ORBITAL TRANSFER BUSINESS OPERATOR AND MEGA-CONSTELLATION BUSINESS OPERATOR, MEDIATE ADJUSTMENT BETWEEN PARTIES CONCERNED (ASSIGNMENT RESULT DEPENDS ON SITUATION) |
| STEP 2-2 | REQUEST DEBRIS REMOVAL BUSINESS OPERATOR TO GET INVOLVED<br>· IF OBJECT WITHOUT COLLISION AVOIDANCE FUNCTION WILL INTRUDE INTO CONGESTED ORBIT, REQUEST DEBRIS REMOVAL BUSINESS OPERATOR TO GET INVOLVED |

Fig. 29

| | AI (MACHINE LEARNING) ON<br>INFORMATION ON PARTIES CONCERNED IN COLLISION/PROXIMITY ALERT |
|---|---|
| INPUT<br>INFORMATION | SORT OUT INFORMATION ON PARTIES CONCERNED IN COLLISION<br>ALERT/PROXIMITY ALERT<br>· BUSINESS OPEROATOR ON STEADY OPERATION SIDE OR BUSINESS<br>OPERATOR ON NON-STEADY OPERATION SIDE?<br>· PRESENCE OR ABSENCE OF COLLISION AVOIDANCE ACTION?<br>· MEGA-CONSTELLATION BUSINESS OPERATOR? (CHECK POSSIBILITY OF<br>CHAIN-REACTION COLLISION)<br>· COLLISION/PROXIMITY IN ROCKET LAUNCH?<br>· COLLISION/PROXIMITY IN ORBITAL TRANSER?<br>· CONGESTED ORBIT (VICINITY OF LEO SUN-SYNCHRONOUS LST 10:30,<br>POLAR REGION, OR LIKE) ? |

SATELLITE CONSTELLATION FORMING SYSTEM, SATELLITE CONSTELLATION FORMING METHOD, AND GROUND FACILITY

CROSS-REFERENCE TO RELATED APPLICATIONS

The present application is based on PCT filing PCT/JP2020/036342, filed Sep. 25, 2020, which claims priority to JP 2019-175079, filed Sep. 26, 2019, the entire contents of each are incorporated herein by reference. This application is also related to U.S. Patent Application Ser. Number; Ser. No. 17/761,239, entitled COLLISION AVOIDANCE ASSISTANCE DEVICE, SATELLITE CONSTELLATION FORMING SYSTEM, COLLISION AVOIDANCE ASSISTANCE METHOD, COMPUTER READABLE MEDIUM, COLLISION AVOIDANCE ASSISTANCE SYSTEM, AND SATELLITE CONSTELLATION BUSINESS DEVICE, filed Mar. 17, 2022 and U.S. patent application Ser. No. 17/761,199, entitled COLLISION AVOIDANCE ASSISTANCE DEVICE, SPACE INFORMATION RECORDER, COLLISION AVOIDANCE ASSISTANCE METHOD, AND INSURANCE PAYMENT SYSTEM, filed Mar. 17, 2022.

TECHNICAL FIELD

The present invention relates to an information management device, an information management method, an information management program, a satellite constellation forming system, a satellite constellation forming method, a satellite constellation forming program, and a ground facility.

BACKGROUND ART

In recent years, large-scale satellite constellations including several hundred to several thousand satellites have started to be constructed, and the risk of collision in orbit is increasing. In addition, space debris such as an artificial satellite that has become uncontrollable due to a failure or rocket debris has been increasing. With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

In a rocket launch, a launch window is limited to an extremely limited time interval. If there happens to be an orbital plane in airspace above a lift-off site, there is a high risk of collision and the launch cannot be performed. In particular, in a large-scale satellite constellation, called a mega-constellation, this possibility is high. Therefore, a business operator that newly launches a space object such as a rocket or a satellite into space needs to acquire information on the orbit of a satellite constellation.

However, Patent Literature 1 does not discuss disclosure of information on the orbit of a satellite constellation.

An object of the present invention is to appropriately manage information on the orbit of a satellite constellation.

Solution to Problem

An information management device according to the present invention is installed in at least one of a plurality of management business devices each of which conducts a management business for a plurality of space objects flying in space, and the information management device includes
 a storage unit to store orbit forecast information including an orbit forecast, which is a forecast value of an orbit of each of the plurality of space objects, and a forecast error that is forecast for the orbit; and
 an information disclosure unit to determine whether the orbit forecast information is to be disclosed to a different information management device, based on a disclosure threshold for determining whether the orbit forecast information is to be disclosed and the forecast error.

Advantageous Effects of Invention

In an information management device according to the present invention, an information disclosure unit determines whether orbit forecast information is to be disclosed to a different information management device, based on a disclosure threshold for determining whether the orbit forecast information is to be disclosed and a forecast error. Therefore, the information management device according to the present invention has the effect of being able to appropriately manage disclosure of information on the orbit of a satellite constellation.

BRIEF DESCRIPTION OF DRAWINGS

FIG. 11 is a diagram illustrating an example of orbit forecast information according to Embodiment 1;

FIG. 12 is a flowchart of a recorder process of setting orbit record information according to Embodiment 1;

FIG. 13 is a diagram illustrating an example of orbit record information according to Embodiment 1;

FIG. 18 is a diagram illustrating alert issuance information according to Embodiment 1;

FIG. 28 is an example of a summary of the avoidance decision process according to Embodiment 2;

FIG. 29 is an example of input information in a machine learning process according to Embodiment 2;

DESCRIPTION OF EMBODIMENTS

Figure 1:
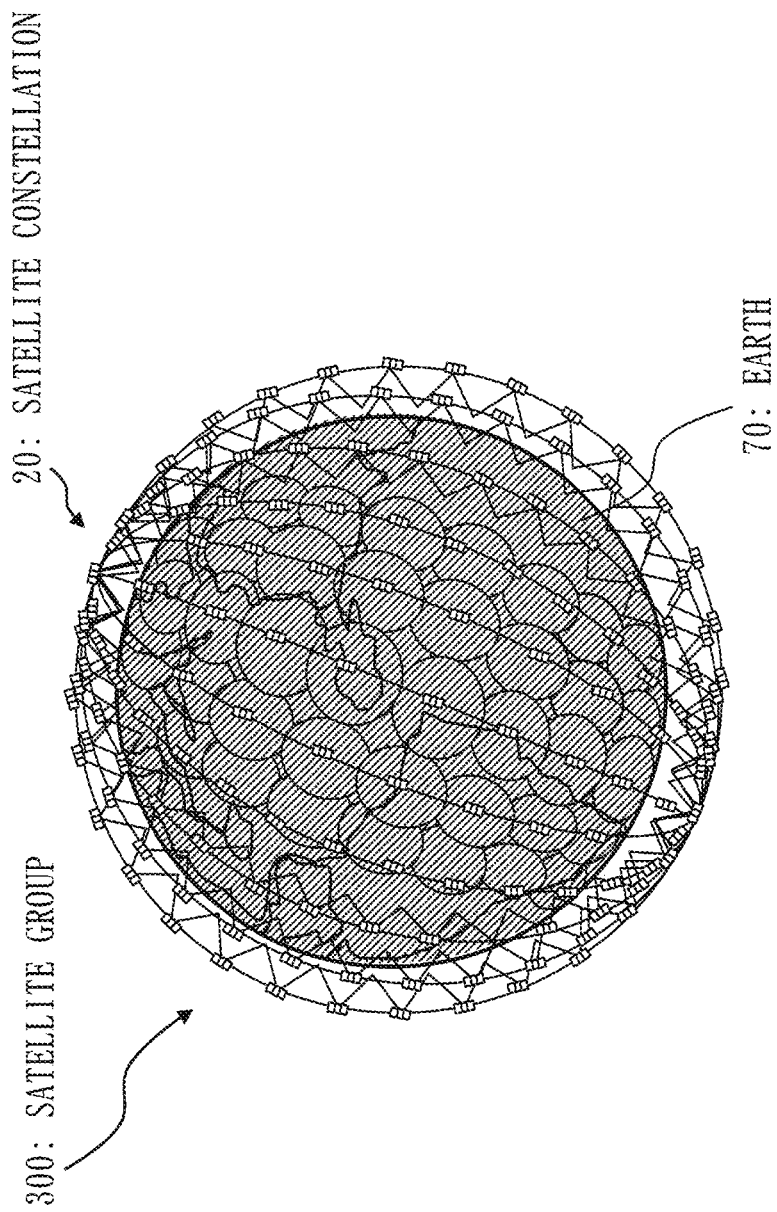
FIG. 1 is an example in which a plurality of satellites cooperatively realize a communication service to the ground over the entire globe of Earth.

Embodiments of the present invention will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation, which is assumed for a collision avoidance assistance system according to the following embodiments, will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
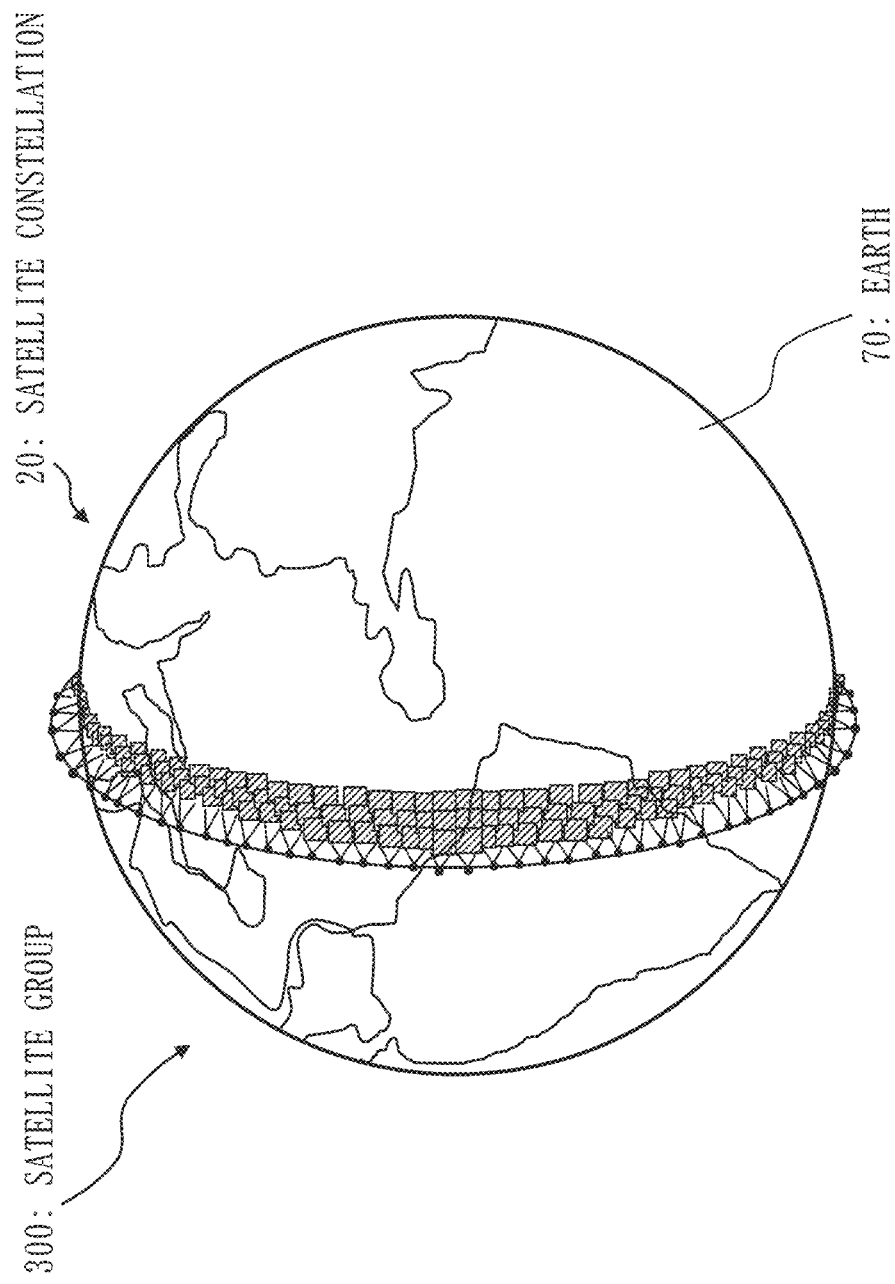
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications service company as illustrated in FIG. 1 or an observation service company as illustrated in FIG. 2.

Figure 3:
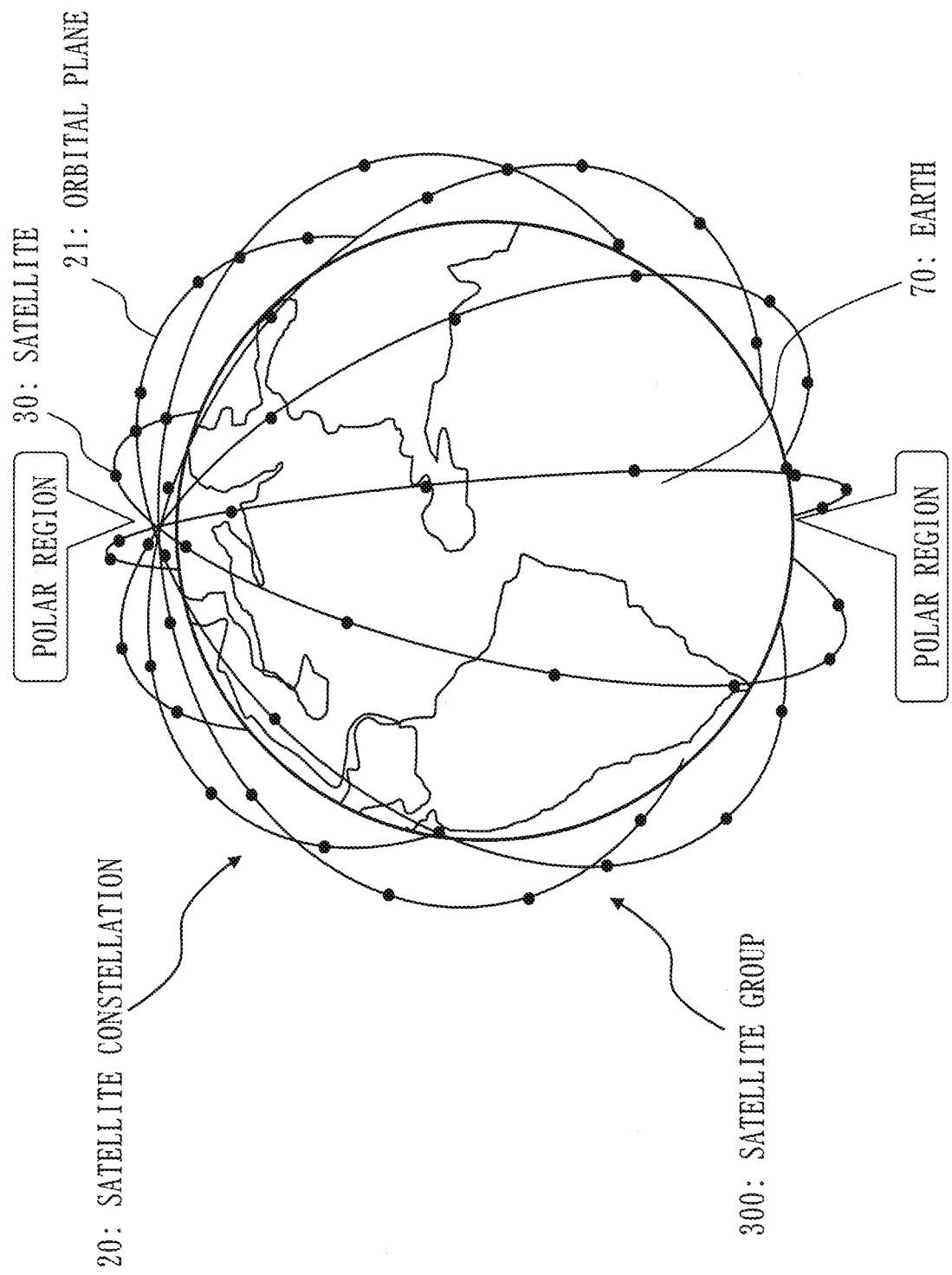
FIG. 3 is an example of a satellite constellation having a plurality of orbital planes that intersect in the vicinity of the polar regions.
Figure 4:
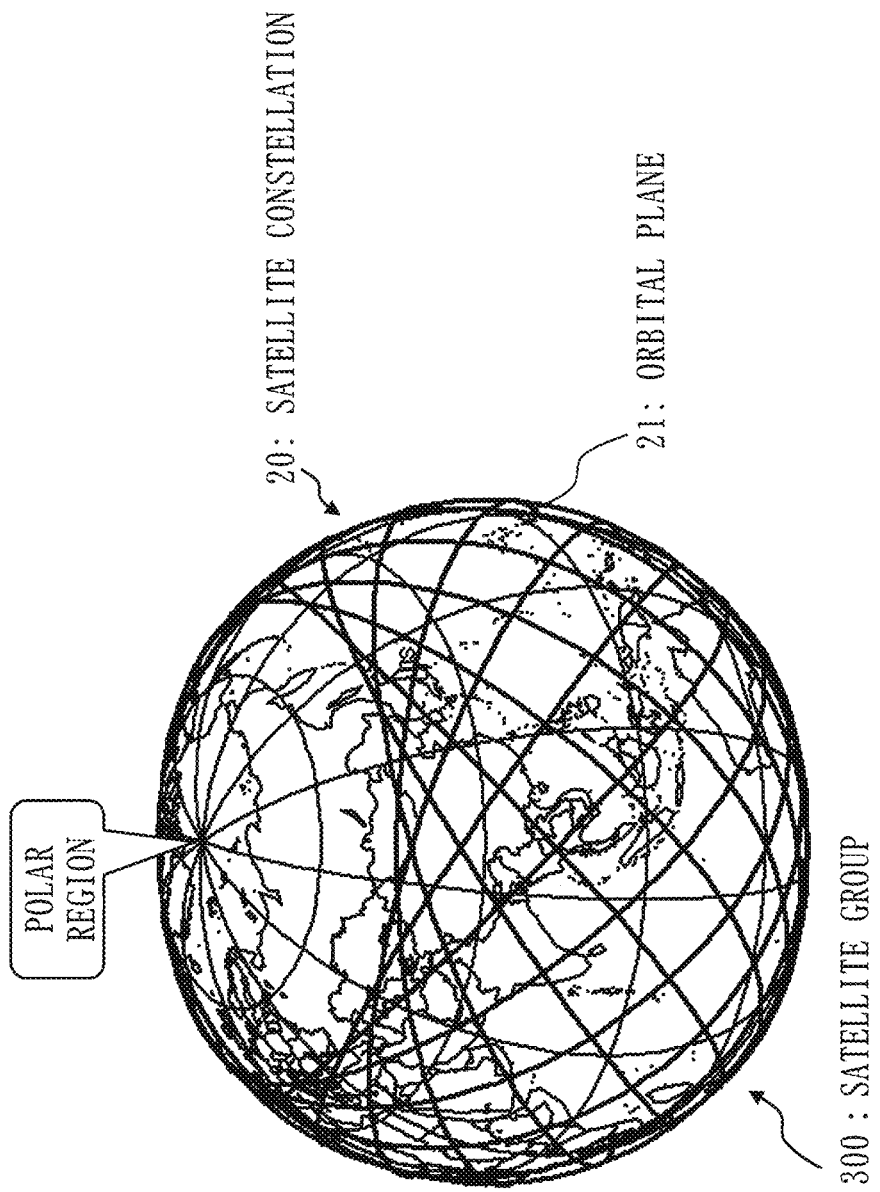
FIG. 4 is an example of a constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision accidents in orbit is increasing. In addition, space debris such as an artificial satellite that has become uncontrollable due to a failure or rocket debris has been increasing. A large-scale satellite constellation is also called a mega-constellation. Such debris is also called space debris.

As described above, with the increase in debris in outer space and the rapid increase in the number of satellites such as those in a mega-constellation, the need for space traffic management (STM) is increasing.

In order to avoid collisions between space objects, there has been increasing need for deorbit after completion of a mission in orbit (PMD), or ADR, which causes debris such as a failed satellite or an upper stage of a rocket that is floating to deorbit by external means such as a debris retrieval satellite. International discussions have begun as STM on the need for such ADR. PMD is an abbreviation for Post Mission Disposal. ADR is an abbreviation for Active Debris Removal. STM is an abbreviation for Space Traffic Management.

With the enhanced system including international cooperation in space situation awareness (SSA) and improvement of measurement precision, it has become possible to monitor space objects of smaller sizes. The total number of space objects that can be monitored is also increasing.

A collision avoidance assistance device 100 according to this embodiment assists avoidance of a collision between space objects among a plurality of space objects 60 flying in space. As described above, with the rapid increase in space objects such as satellites and debris in outer space, the risk of collision between space objects 60 is increasing.

Referring to FIGS. 5 to 8, an example of a satellite 30 and a ground facility 700 in a satellite constellation forming system 600 that forms a satellite constellation 20 will be described. For example, the satellite constellation forming system 600 is operated by a business operator that operates a satellite constellation business, such as a mega-constellation business device 41, an LEO constellation business device 42, or a satellite business device 43.

Figure 5:
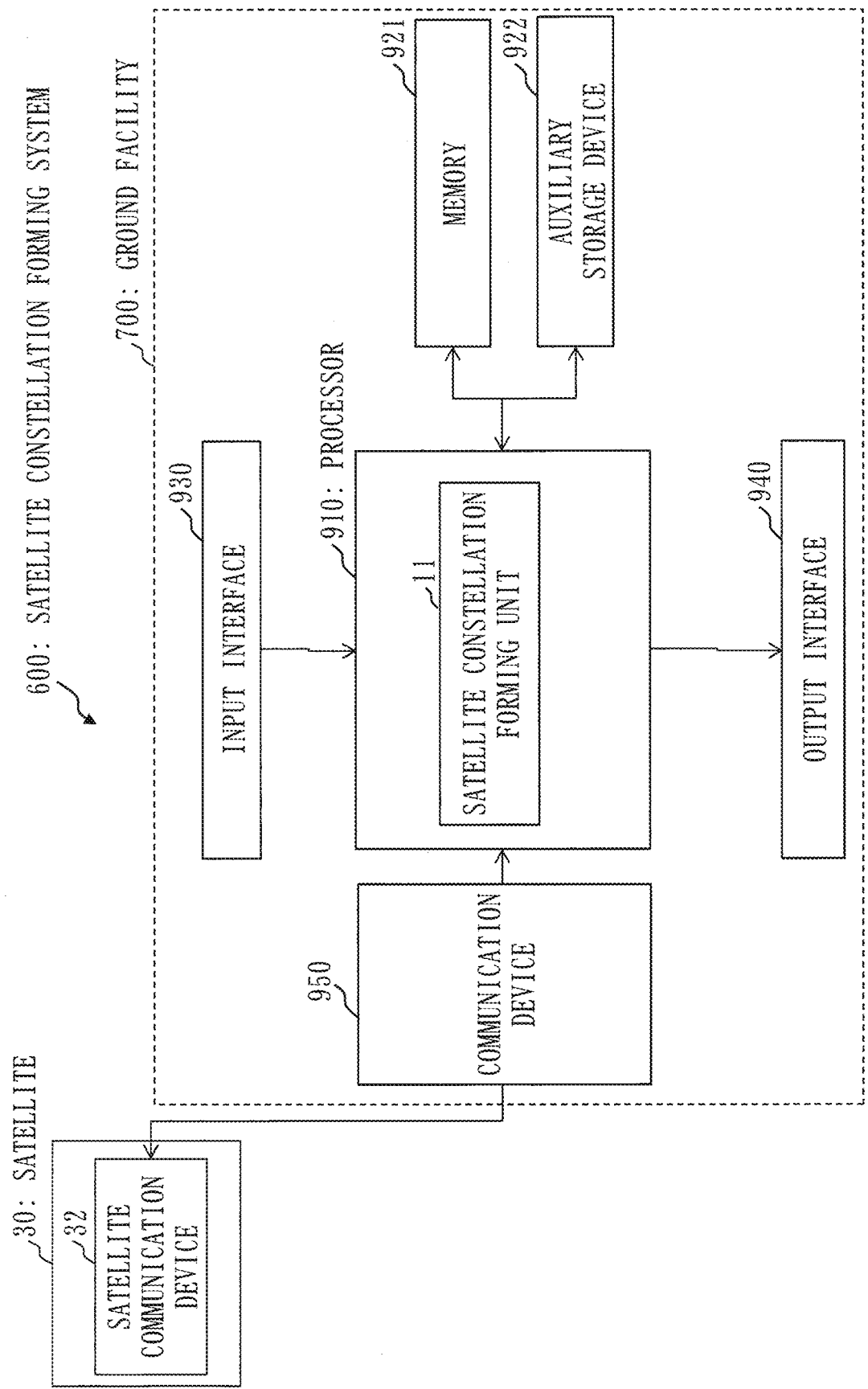
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in reality, a computer is provided in each satellite 30 of a plurality of satellites forming a satellite constellation 20 and the ground facility 700 that communicates with each satellite 30. The functions of the satellite constellation forming system 600 are realized by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of the collision avoidance assistance device 100 to be described later with reference to FIG. 9.

The satellite constellation forming system 600 includes a satellite constellation forming unit 11 as a functional element. The functions of the satellite constellation forming unit 11 are realized by hardware or software.

The satellite constellation forming unit 11 controls formation of a satellite constellation 20 while communicating with the satellite 30.

Figure 6:
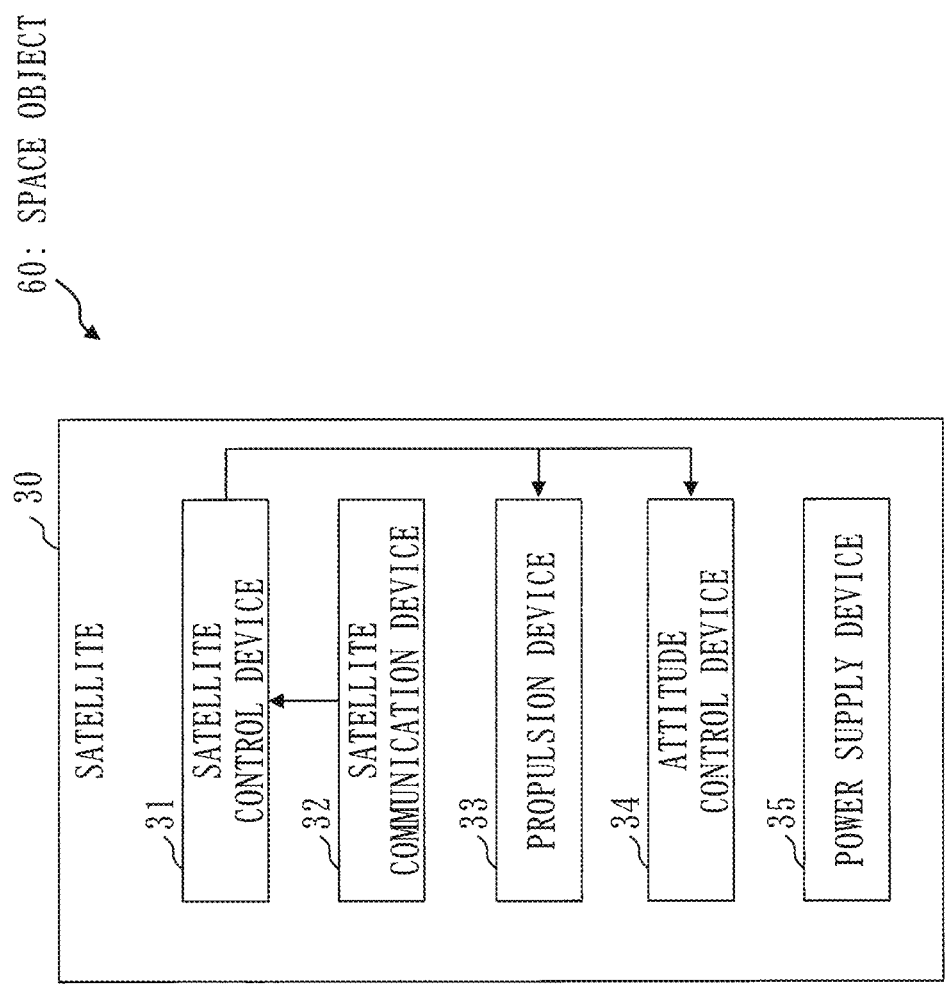
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, a satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an electronic thruster. Specifically, the propulsion device 33 is an ion engine or a Hall thruster.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
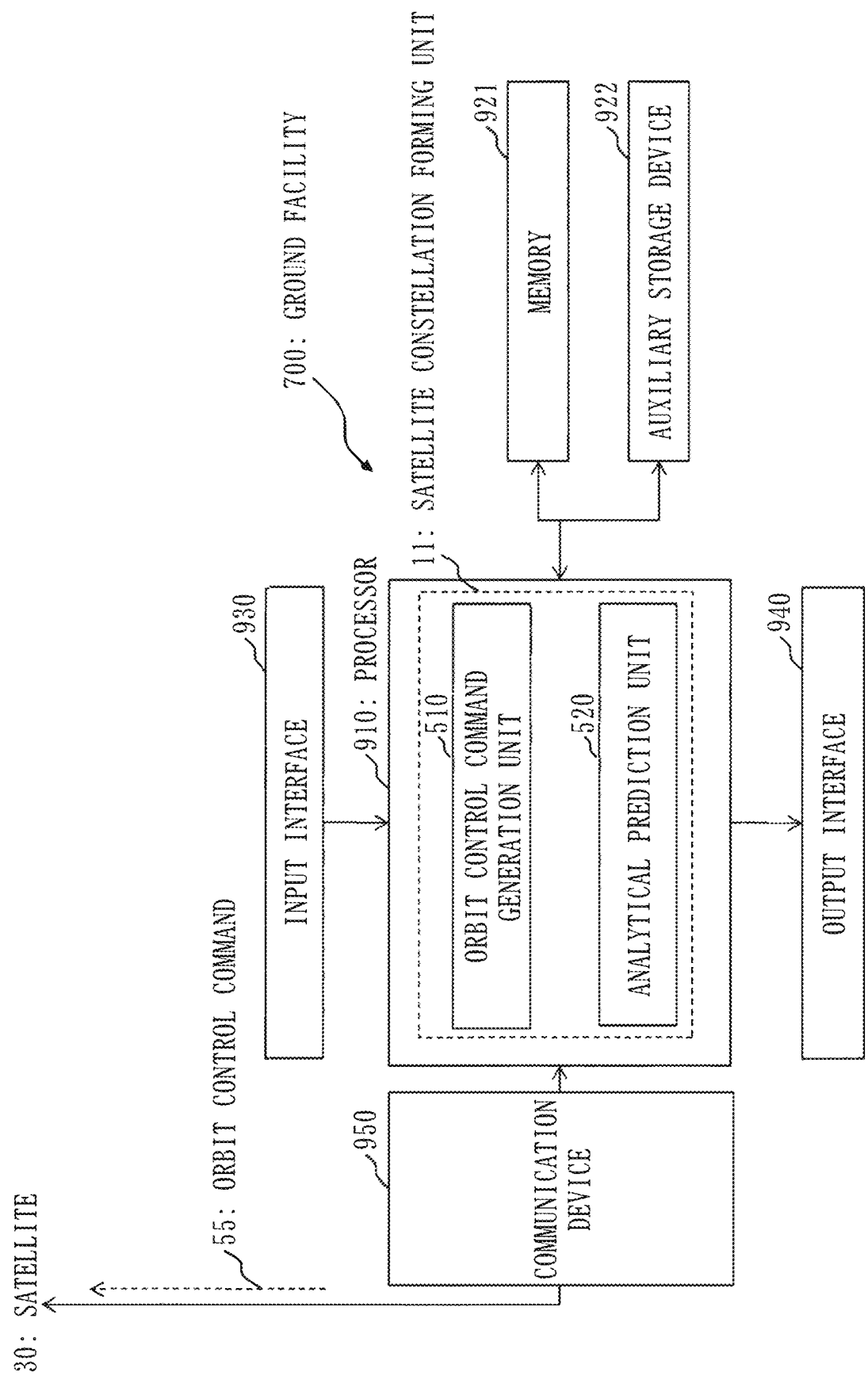
FIG. 7 is an example of a functional configuration of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms a satellite constellation 20 by communicating with each satellite 30. The ground facility 700 is provided in the collision avoidance assistance device 100. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 are substantially the same as the hardware components of the collision avoidance assistance device 100 to be described later with reference to FIG. 9.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
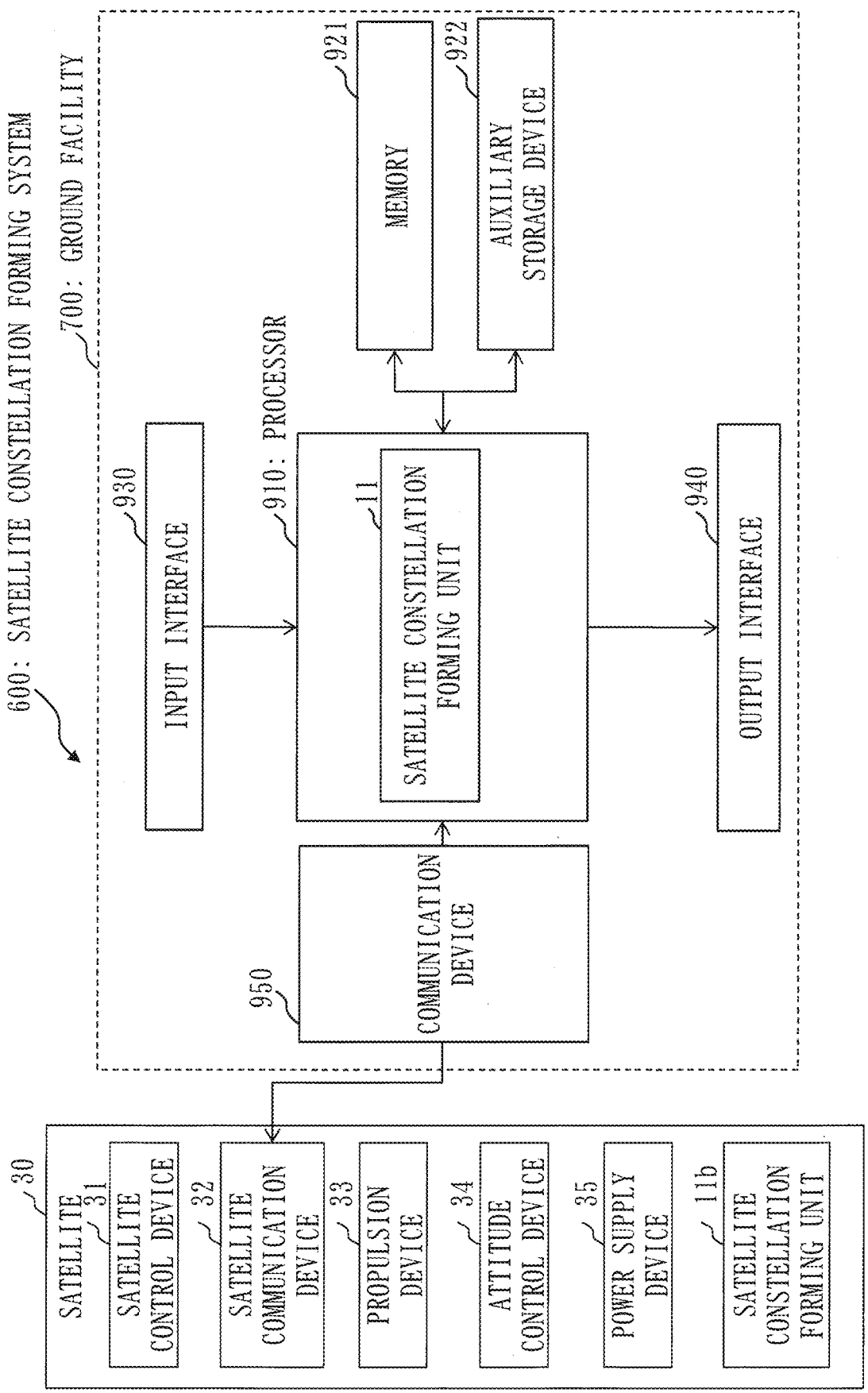
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form a satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

*Description of Configurations*

Figure 9:
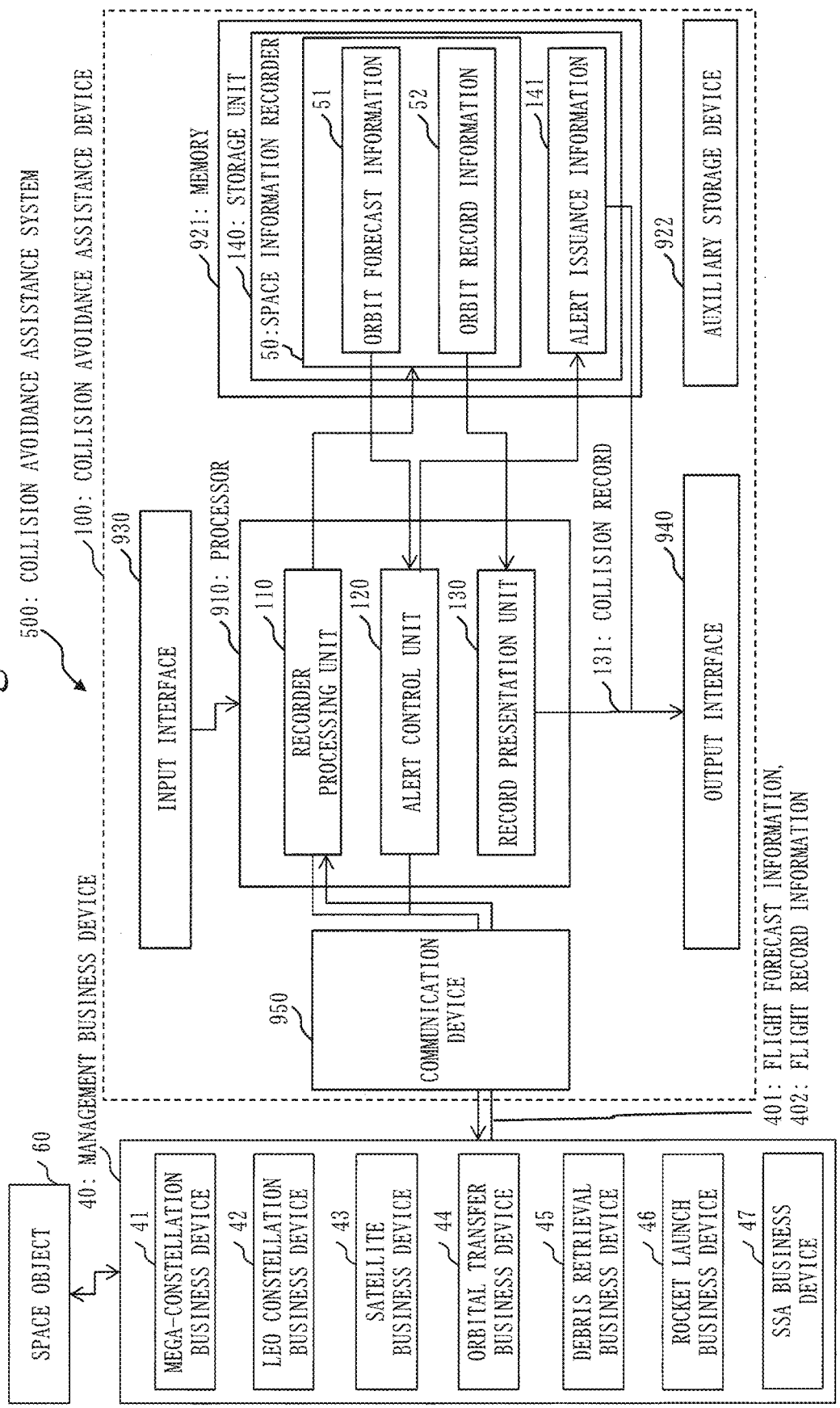
FIG. 9 is a configuration diagram of a collision avoidance assistance system according to Embodiment 1.

FIG. 9 is a configuration diagram of a collision avoidance assistance system 500 according to this embodiment.

The collision avoidance assistance system 500 includes a management business device 40 and the collision avoidance assistance device 100 that communicates with the management business device 40. The collision avoidance assistance device 100 may be installed in the ground facility. Alternatively, the collision avoidance assistance device 100 may be installed in the satellite 30. Alternatively, the collision avoidance assistance device 100 may be installed in the satellite constellation forming system 600. Alternatively, the collision avoidance assistance device 100 may be installed in at least one management business device 40.

The management business device 40 provides information related to the space objects 60 such as artificial satellites or debris. The management business device 40 is a computer of a business operator that collects information related to the space objects 60 such as satellites or debris.

The management business device 40 includes devices such as the mega-constellation business device 41, the LEO constellation business device 42, the satellite business device 43, an orbital transfer business device 44, a debris retrieval business device 45, a rocket launch business device 46, and an SSA business device 47. LEO is an abbreviation for Low Earth Orbit.

The mega-constellation business device 41 is a computer of a mega-constellation business operator that operates a large-scale constellation, that is, mega-constellation business.

The LEO constellation business device 42 is a computer of an LEO constellation business operator that operates a low Earth orbit constellation, that is, LEO constellation business.

The satellite business device 43 is a computer of a satellite business operator that handles one to several satellites.

The orbital transfer business device 44 is a computer of an orbital transfer business operator that assists orbital transfer of a satellite.

The debris retrieval business device 45 is a computer of a debris retrieval business operator that conducts a debris retrieval business.

The rocket launch business device 46 is a computer of a rocket launch business operator that conducts a locket launch business.

The SSA business device 47 is a computer of an SSA business operator that conducts an SSA business, that is, a space situation awareness business.

The management business device 40 may be a device other than the above, provided that it is the device that collects information on space objects such as artificial satellites or debris, and provides the collected information to the collision avoidance assistance device 100. When the collision avoidance assistance device 100 is installed on an SSA public server, the collision avoidance assistance device 100 may be configured to function as the SSA public server.

The information provided from the management business device 40 to the collision avoidance assistance device 100 will be described in detail later.

The collision avoidance assistance device 100 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The collision avoidance assistance device 100 includes, as functional elements, a recorder processing unit 110, an alert control unit 120, a record presentation unit 130, and a storage unit 140. In the storage unit 140, a space information recorder 50 and alert issuance information 141 are stored.

The functions of the recorder processing unit 110, the alert control unit 120, and the record presentation unit 130 are realized by software. The storage unit 140 is provided in the memory 921. Alternatively, the storage unit 140 may be provided in the auxiliary storage device 922. Alternatively, the storage unit 140 may be divided and provided in the memory 921 and the auxiliary storage device 922.

The processor 910 is a device that executes a collision avoidance assistance program. The collision avoidance assistance program is a program that realizes the functions of the recorder processing unit 110, the alert control unit 120, and the record presentation unit 130.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). The collision avoidance assistance device 100 communicates with the management business device 40 via the communication device 950.

The collision avoidance assistance program is read into the processor 910 and executed by the processor 910. The memory 921 stores not only the collision avoidance assistance program but also an operating system (OS). The processor 910 executes the collision avoidance assistance program while executing the OS. The collision avoidance assistance program and the OS may be stored in the auxiliary storage device 922. The collision avoidance assistance program and the OS that are stored in the auxiliary storage device 922 are loaded into the memory 921 and executed by the processor 910. Part or the entirety of the collision avoidance assistance program may be embedded in the OS.

The collision avoidance assistance device 100 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the collision avoidance assistance device may be interpreted as "process", "procedure", "means", "phase", or "step". "Process" of the recorder process and the alert control process may be interpreted as "program", "program product", or "computer readable recording medium recording a program".

The collision avoidance assistance program causes a computer to execute each process, each procedure, each means, each phase, or each step, where "unit" of each unit of the collision avoidance assistance device is interpreted as "process", "procedure", "means", "phase", or "step". A collision avoidance assistance method is a method performed by execution of the collision avoidance assistance program by the collision avoidance assistance device.

The collision avoidance assistance program may be stored and provided in a computer readable recording medium. Alternatively, each program may be provided as a program product.

\*\*\*Description of Operation\*\*\*

Referring to FIGS. 10 to 19, a collision avoidance assistance process by the collision avoidance assistance device 100 according to this embodiment will be described.

<Recorder Process (Orbit Forecast Information): S100>

Figure 10:
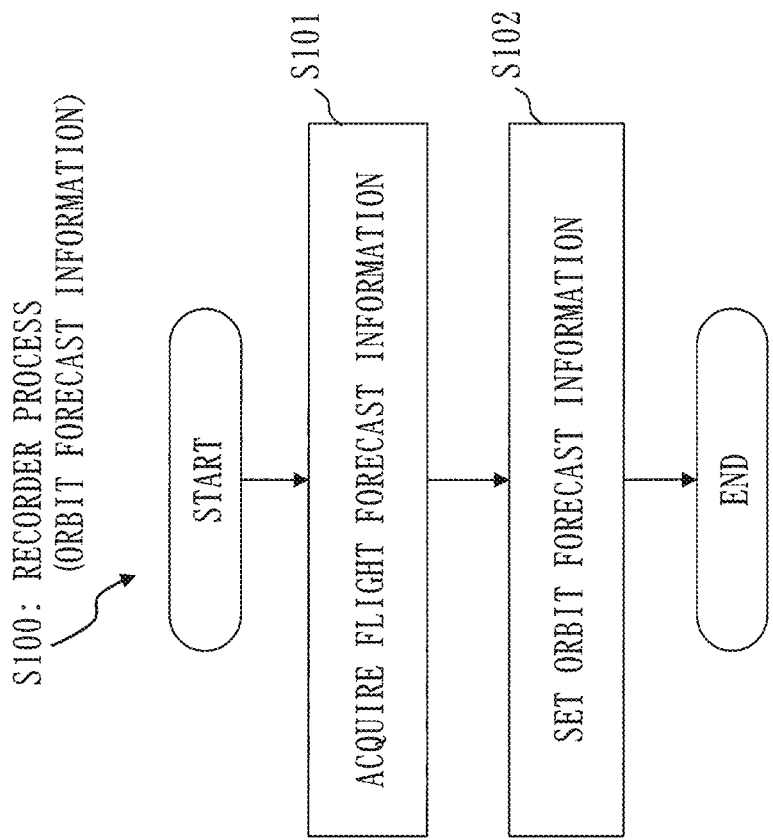
FIG. 10 is a flowchart of a recorder process of setting orbit forecast information according to Embodiment 1.

FIG. 10 is a flowchart of a recorder process of setting orbit forecast information 51 according to this embodiment. FIG. 11 is a diagram illustrating an example of the orbit forecast information 51 according to this embodiment.

In step S101, the recorder processing unit 110 acquires flight forecast information 401 indicating a fight forecast for each of a plurality of space objects 60 from the management business device 40 used by a management business operator that manages the plurality of space objects 60. As described above, the management business operator is a business operator that manages the space objects 60 that fly in outer space, such as a satellite constellation, various types of satellites, a rocket, and debris. As described above, the management business device 40 used by the management business operator is a computer, such as the mega-constellation business device 41, the LEO constellation business device 42, the satellite business device 43, the orbital transfer business device 44, the debris retrieval business device 45, the rocket launch business device 46, and the SSA business device 47.

In step S102, based on the acquired flight forecast information 401, the recorder processing unit 110 sets a forecast epoch 512 of the orbit of each of the plurality of space objects, forecast orbital elements 513 that identify the orbit, and a forecast error 514 that is forecast for the orbit, as orbit forecast information 51. Then, the recorder processing unit 110 stores the space information recorder 50 including the orbit forecast information 51 in the storage unit 140. The orbit forecast information 51 forecast values of the orbit of each of the plurality of space objects.

Based on the flight forecast information 401, the recorder processing unit 110 may set a forecast for the flight state of each of the plurality of space objects as a forecast flight state 515 in the orbit forecast information 51. In this case, the recorder processing unit 110 sets whether each of the plurality of space objects is in a steady operation state or a non-steady operation state in the forecast flight state 515 of each of the plurality of space objects. Specifically, the steady operation state is a state in which a satellite is flying in orbit in steady operation. The non-steady operation state includes states such as a launch transient state from launch to orbit insertion of each of the plurality of space objects and a post-deorbit transient state after deorbit until atmospheric entry or insertion into a disposal orbit of each of the plurality of space objects.

Referring to FIG. 11, an example of the orbit forecast information 51 according to this embodiment will be described.

In the orbit forecast information 51, a space object identifier (ID) 511, the forecast epoch 512, the forecast orbital elements 513, the forecast error 514, and the forecast flight state 515 are set.

The space object ID 511 is an identifier that identifies a space object 60. In FIG. 11, a satellite ID and a debris ID are set as the space object ID 511. Specifically, a space object is an object such as a rocket to be launched into outer space, an artificial satellite, a space station, a debris retrieval satellite, a planetary space probe, or a satellite or rocket that has become debris after completing a mission.

The forecast epoch 512 is an epoch that is forecast for the orbit of each of the plurality of space objects.

The forecast orbital elements 513 are orbital elements that identify the orbit of each of the plurality of space objects. The forecast orbital elements 513 are orbital elements that are forecast for the orbit of each of the plurality of space objects. In FIG. 11, the six Keplerian elements are set as the forecast orbital elements 513.

The forecast error 514 is an error that is forecast for the orbit of each of the plurality of space objects. In the forecast error 514, a travelling direction error, an orthogonal direction error, and a basis for the error are set. In this way, the forecast error 514 explicitly indicates the amount of error included in a record value together with the basis for the error. The basis for the error includes at least one or all of means for measurement, the content of data processing performed as means for improving the precision of location coordinate information, and a result of statistical evaluation on past data.

The forecast flight state 515 is a forecast for the flight state of each of the plurality of space objects. In the forecast flight state 515, whether the forecast flight state of each of the plurality of space objects is the steady operation state, the launch transient state, or the post-deorbit transient state is set. The forecast flight state 515 may include whether or not an avoidance operation can be performed and whether or not an autonomous avoidance operation can be performed.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 51.

As described above, the orbit forecast information 51 includes information on the orbit of each space object including the epoch and orbital elements or the time and location coordinates, and explicitly indicates forecast values of the space object 60 in the near future.

<Recorder Process (Orbit Record Information): S200>

FIG. 12 is a flowchart of a recorder process of setting orbit record information 52 according to this embodiment. FIG. 13 is a diagram illustrating an example of the orbit record information 52 according to this embodiment.

In step S201, the recorder processing unit 110 acquires flight record information 402 indicating a flight record of each of the plurality of space objects from at least one of each of the plurality of space objects and the management business device 40. Specifically, the recorder processing unit 110 acquires the flight record information 402 from the management business operator that manages the space object 60. Alternatively, the recorder processing unit 110 may acquire the flight record information 402 directly from the space object 60.

In step S202, based on the acquired flight record information 402, the recorder processing unit 110 sets a record epoch 522 of the orbit of each of the plurality of space objects, record orbital elements 523 that identify the orbit, and record location coordinates 242 of each of the plurality of space objects, as orbit record information 52. Then, the recorder processing unit 110 includes the orbit record information 52 in the space information recorder 50.

Based on the flight record information 402, the recorder processing unit 110 may set a record of the flight state of each of the plurality of space objects as a record flight state 525 in the orbit record information 52. In this case, the recorder processing unit 110 sets whether each of the plurality of space objects is in the steady operation state or the non-steady operation state in the record flight state 525 of each of the plurality of space objects. The non-steady operation state includes the launch transient state from launch to orbit insertion of each of the plurality of space objects and the post-deorbit transient state after deorbit until atmospheric entry or insertion into a disposal orbit of each of the plurality of space objects.

Referring to FIG. 13, an example of the orbit record information 52 according to this embodiment will be described.

In the orbit record information 52, a space object ID 521, the record epoch 522, the record orbital elements 523, a specific record 524, and the record flight state 525 are set. In the specific record 524, a specific time 241 and the record location coordinates 242 are set. That is, in the orbit record information 52, information on the space object 60 at the specific time 241 is set.

The space object ID 521 is an identifier that identifies the space object 60. The composition of the space object ID 521 is the same as that of the space object ID 511.

The record epoch 522 is the actual epoch of the orbit of each of the plurality of space objects.

The record orbital elements 523 are orbital elements that identify the orbit of each of the plurality of space objects. The record orbital elements 523 are the actual orbital elements of the orbit of each of the plurality of space objects. In FIG. 13, the six Keplerian elements are set as the record orbital elements 523 as in the case of the forecast orbital elements 513.

In the specific record 524, the specific time 241 is set and the location coordinates of the space object 60 corresponding to the specific time 241 are set as the record location coordinates 242. The orbit record information 52 thus includes the record location coordinates 242, which are the location coordinates of the space object 60 at the specific time 241.

The record flight state 525 is the actual flight state of each of the plurality of space objects. In the record flight state 525, whether the actual flight state of each of the plurality of space objects is the steady operation state, the launch transient state, or the post-deorbit transient state is set. The record flight state 525 may include whether or not an avoidance operation can be performed or whether or not an autonomous avoidance operation can be performed. The composition of the record flight state 525 is the same as that of the forecast flight state 515.

<Alert Control Process: S300>

Figure 14:
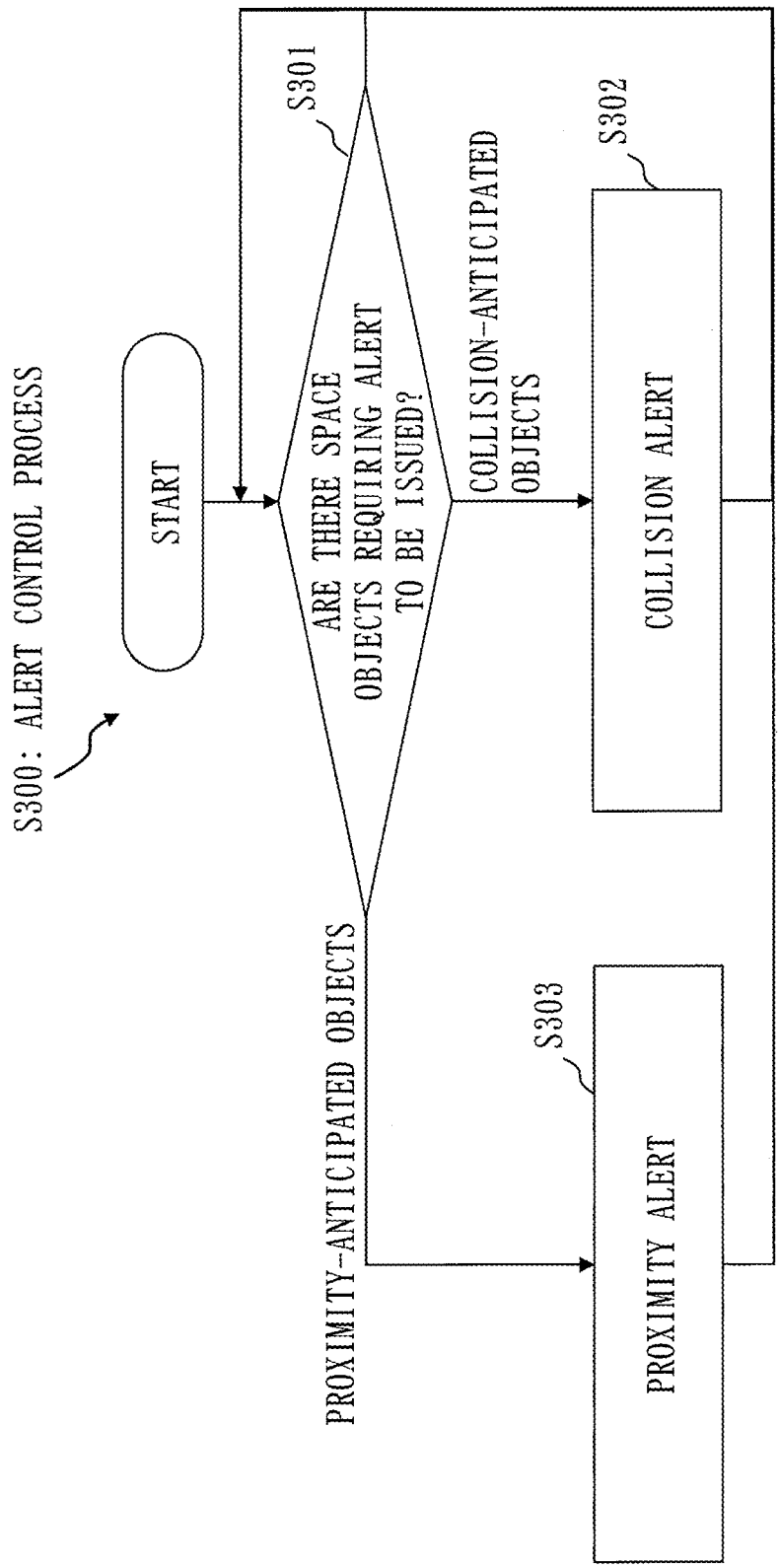
FIG. 14 is a flowchart of an alert control process by an alert control unit according to Embodiment 1.

FIG. 14 is a flowchart of an alert control process by the alert control unit 120 according to this embodiment.

In step S301, the alert control unit 120 determines whether there are space objects in a positional relationship which necessitates issuance of an alert, based on the orbit forecast information 51. Specifically, the alert control unit 120 determines whether space objects whose error ranges 502 at the same time overlap exist as collision-anticipated objects 601 among the plurality of space objects, based on the orbit forecast information 51. The alert control unit 120 determines whether space objects to be located at the same time in proximity to each other exceeding a proximity threshold exist as proximity-anticipated objects 602 among the plurality of space objects, based on the orbit forecast information 51. The collision-anticipated objects 601 and the proximity-anticipated objects 602 are examples of danger-anticipated objects 65, which are space objects whose locations at the same time are in a dangerous relationship among the plurality of space objects.

If the collision-anticipated objects 601 exist, the process proceeds to step S302. If the proximity-anticipated objects 602 exist, the process proceeds to step S303. If neither the collision-anticipated objects 601 nor the proximity-anticipated objects 602 exist, the process returns to step S301.

In step S302, the alert control unit 120 outputs a collision alert 23 indicating that the collision-anticipated objects 601 may collide with each other.

In step S303, the alert control unit 120 outputs a proximity alert 22 indicating that the proximity-anticipated objects 602 may come in proximity to each other.

Figure 15:
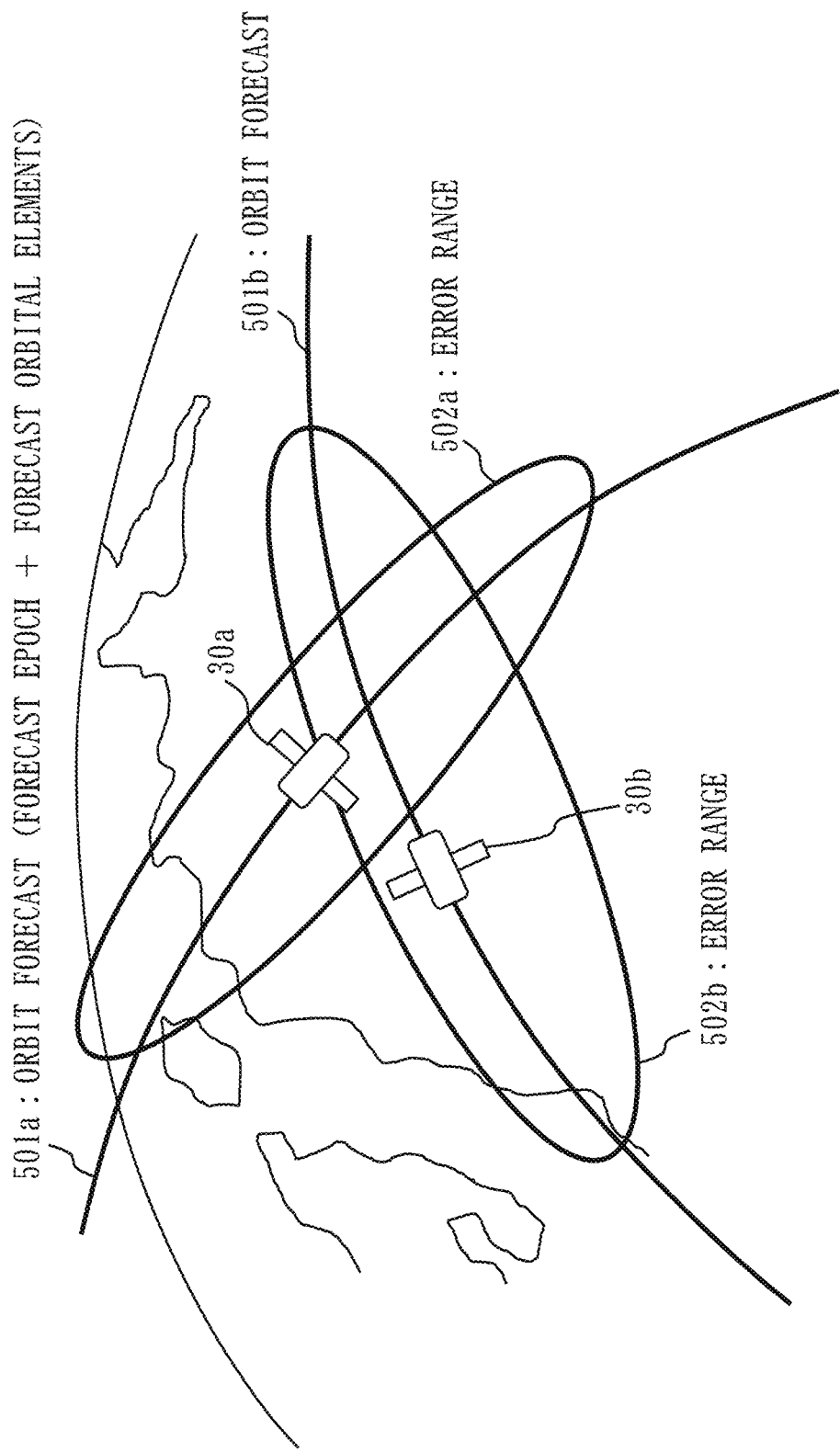
FIG. 15 is a diagram illustrating a representation of error ranges of two satellites that intersect with each other according to Embodiment 1.

FIG. 15 is a diagram illustrating a representation of error ranges 502a and 502b of two satellites 30a and 30b that intersect with each other according to this embodiment.

An orbit forecast 501a of the satellite 30a is obtained from the forecast epoch and forecast orbital elements corresponding to the satellite 30a in the orbit forecast information 51. The forecast epoch is also referred to as the epoch. The forecast orbital elements are also referred to as the six orbital elements. Similarly, an orbit forecast 501b of the satellite 30b is obtained from the forecast epoch and forecast orbital elements corresponding to the satellite 30b in the orbit forecast information 51.

The alert control unit 120 acquires the orbit forecasts 501a and 501b and the error ranges 502a and 502b of the satellites 30a and 30b based on the orbit forecast information 51. The suffix attached to each of the reference numerals of the orbit forecasts 501 and the error ranges 502 is used to distinguish correspondence to the satellite 30a or the satellite 30b.

Figure 16:
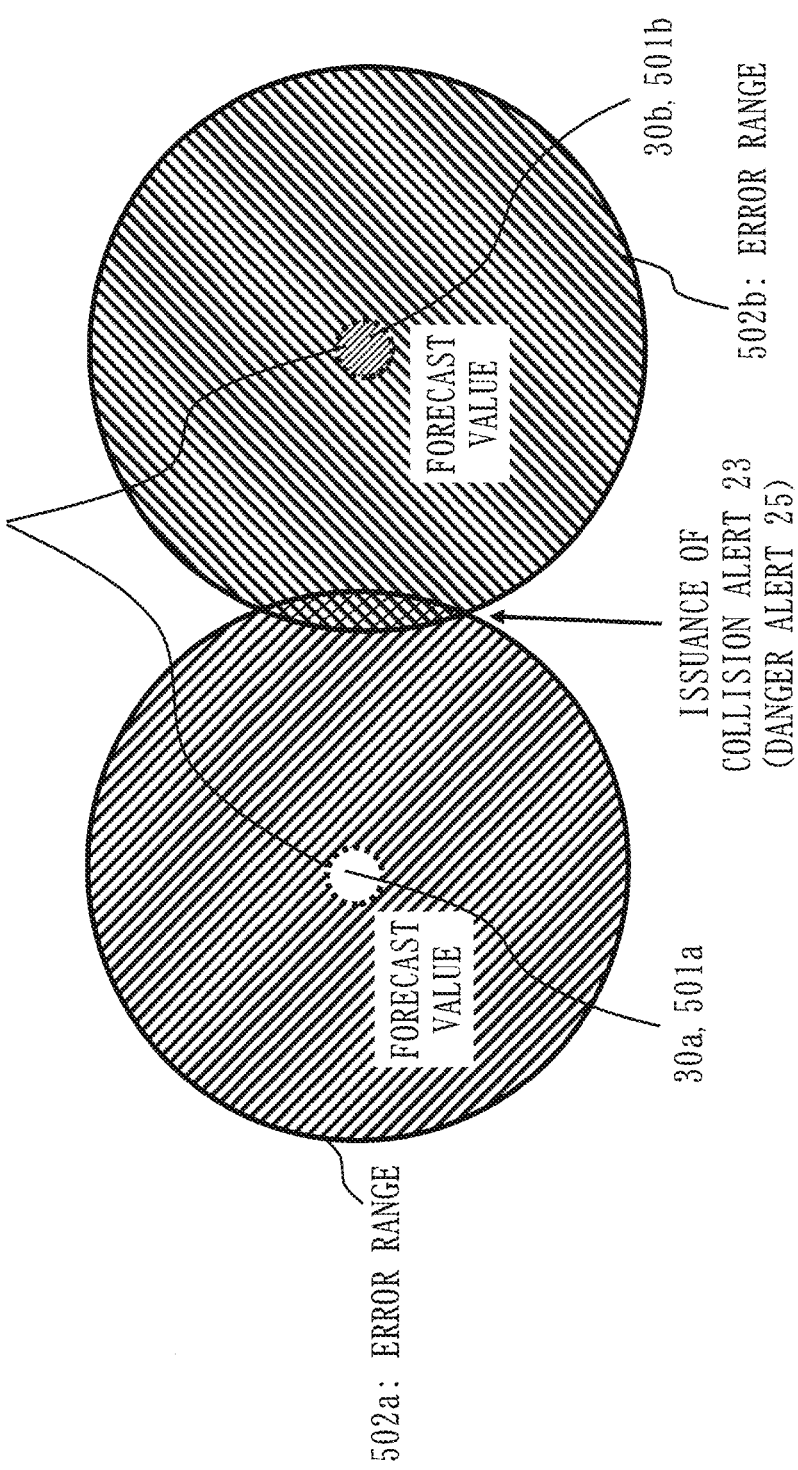
FIG. 16 is a diagram illustrating a state in which error ranges of two satellites overlap with each other according to Embodiment 1.

FIG. 16 is a diagram illustrating a state in which the error ranges 502a and 502b of the two satellites 30a and 30b overlap according to this embodiment.

The alert control unit 120 determines whether space objects whose error ranges 502 at the same time overlap exist as collision-anticipated objects 601, based on the orbit forecast information 51. In FIG. 16, the two satellites 30a and 30b are determined as the collision-anticipated objects 601.

Figure 17:
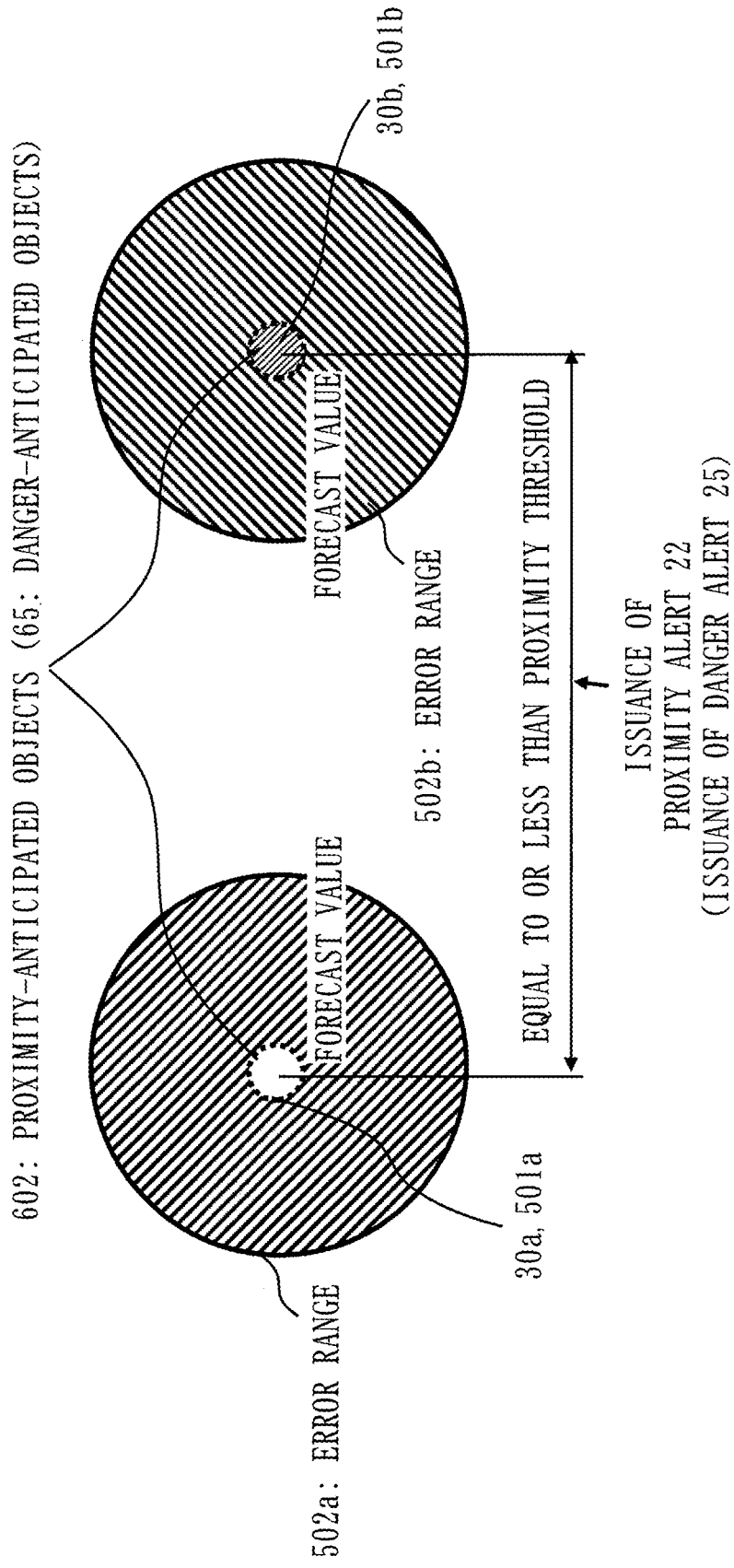
FIG. 17 is a diagram illustrating a state in which the distance between two satellites is equal to or less than a proximity threshold according to Embodiment 1.

FIG. 17 is a diagram illustrating a state in which the distance between two satellites 30 is equal to or less than the proximity threshold according to this embodiment.

The alert control unit 120 determines whether space objects to be located at the same time in proximity to each other exceeding the proximity threshold exist as proximity-anticipated objects 602, based on the orbit forecast information 51. The proximity threshold is a threshold for determining issuance of the proximity alert 22. In FIG. 17, the two satellites 30a and 30b are determined as the proximity-anticipated objects 602.

In this way, the alert control unit 120 issues the collision alert 23 at the stage when a contact or overlapping area of the error ranges 502 is found as a result of analysis. If two space objects come in proximity to each other within the proximity threshold or exceeding the proximity threshold, the alert control unit 120 judges that there is a risk of collision and issues the proximity alert 22.

FIG. 18 is a diagram illustrating the alert issuance information 141 according to this embodiment.

The alert issuance information 141 is transmitted to the management business device 40 and used for a collision avoidance operation.

In the alert issuance information 141, the identifiers of space objects for which the collision alert 23 or the proximity alert 22 has been issued, a time, and location coordinates at the time, an overlapping distance or a proximity distance of the error ranges are set.

The collision alert 23 or the proximity alert 22 is an example of a danger alert 25 indicating existence of the danger-anticipated objects 65, which are space objects whose locations at the same time are in a dangerous relationship.

<Record Presentation Process>

Figure 19:
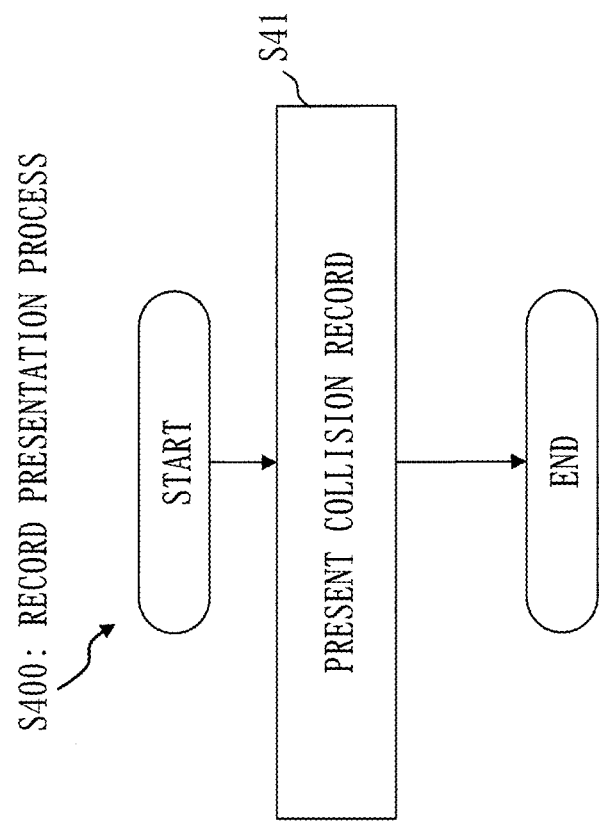
FIG. 19 is a flowchart of a record presentation process by a record presentation unit according to Embodiment 1.

FIG. 19 is a flowchart of a record presentation process by the record presentation unit 130 according to this embodiment.

In step S41, if space objects among the plurality of space objects have collided with each other, the record presentation unit 130 extracts the orbit record information 52 at the time of the collision between the space objects as a collision record 131 from the orbit record information 52. Then, the record presentation unit 130 presents the collision record 131 to an output device. Information as to occurrence of a collision between space objects among the plurality of space objects is notified from the management business operator, for example.

Specific examples of orbit information of satellites will be described below.

As illustrated in FIGS. 11 and 13, the orbital elements based on Kepler's laws (Keplerian elements) are used as orbit information of satellites. The orbital elements based on Kepler's laws are composed of the following elements.

Epoch (year and date)
Mean motion (m) (orbits/day) or Semi-major axis (km)
Eccentricity (no unit)
Inclination (i) (degrees)
Right ascension of ascending node (RAAN) ($\Omega$) (degrees)
Argument of perigee ($\omega$) (degrees)
Mean anomaly (M) (degrees)

Alternatively, a format called two-line elements (TLE) may be used.

In a positioning satellite, the time and location in orbit and timing to transmit positioning signals directly affect positioning precision. For this reason, satellite information such as almanac, ephemeris, or precise orbit ephemeris is used depending on the precision, distribution method, difference between the forecast value and the record value, or the like.

When attention is focused on the precision, the relationship is almanac (precision: several hundred m to several km)>ephemeris (precision: several m)>precise ephemeris (precision: several cm). When attention is focused on the distribution method, the almanac and the ephemeris are directly transmitted from satellites, and can also be obtained via the Internet or mobile phone lines. In positioning satellites that form a constellation with a large number of satellites, each satellite transmits information of all the satellites as the coarse-precision almanac, and only information of each satellite itself is transmitted as the fine-precision ephemeris.

For the launch transient state until satellites achieve steady operation and the transient state after deorbit to atmospheric entry or arrival at a disposal orbit, forecast values precise enough to be effective for avoiding collisions are not disclosed. Orbit forecast values in rocket launches are also not pubic information.

The location of a lift-off point, a lift-off scheduled time, and a scheduled flight route are disclosed at a minimum, and information precise enough to verify whether there is no risk of collision with satellites owned by satellite constellation business operators at altitudes of 600 km or lower is disclosed.

The orbit forecast information 51 (orbit forecast value public information) and the orbit record information 52 (precise orbit ephemeris record) do not need to be located at the same storage place. It is sufficient that the orbit record information 52 is in a state to be available when needed such as after a collision accident. For example, when it is used by an insurance business operator for an insurance business, the storage place may be disclosed from the business operator of the collision avoidance assistance device 100 only to the insurance business operator.

In this embodiment, the space information recorder such as the following has been described.

The space information recorder records space object information acquired from a management business device used by a management business operator that manages a plurality of space objects. The space object information includes orbit forecast information. The orbit forecast information includes a forecast epoch, forecast orbital elements, and a forecast error of each space object and an estimated time or time period of collision occurrence when a collision between a space object A and a space object B included in the plurality of space objects is foreseen.

The space object information includes orbit record information. The orbit record information includes a collision occurrence time, which is estimated by post-accident verification after occurrence of a collision accident between the space object A and the space object B included in the plurality of space objects, location information of the space object A at the time concerned or immediately before the time concerned, and location information of the space object B at the time concerned or immediately before the time concerned.

The space object information includes orbit forecast information including a forecast epoch, forecast orbital elements, a forecast error of each space object, and a launch scheduled time and orbit information of a rocket launch business operator.

The space object information includes orbit forecast information including a forecast epoch, forecast orbital elements, and a forecast error of each space object, and a deorbit scheduled time and orbit information of a space object business operator of a deorbit process or a debris removal business operator.

The space object information includes orbit forecast information including a forecast epoch, forecast orbital elements, and a forecast error of each space object, and an orbital transfer scheduled time and orbit information of a satellite business operator of an orbital transfer process.

The orbit forecast information includes a basis for calculating the amount of error of the forecast error. The orbit forecast information may include a verification record that has led to derivation of the forecast error. The orbit forecast information may include identification of steady operation or non-steady operation. The orbit forecast information may include whether or not an avoidance operation can be performed. The orbit forecast information may include whether or not an autonomous avoidance operation can be performed.

Description of Effects of this Embodiment

In the collision avoidance assistance device 100 according to this embodiment, the recorder processing unit 110 acquires the flight forecast information 401 indicating a flight forecast for each of a plurality of space objects from the management business device 40. Then, based on the flight forecast information 401, the recorder processing unit 110 sets forecast values, which are forecast values of the orbit of each space object and include forecast errors, as the orbit forecast information 51 in the space information recorder 50. Therefore, the collision avoidance assistance device 100 according to this embodiment has the effect of being able to precisely assist collision avoidance by using the orbit forecast information 51 that takes into account expected orbit errors for each of the plurality of space objects.

In the collision avoidance assistance device 100 according to this embodiment, the recorder processing unit 110 acquires the flight record information 402 indicating a flight record of each of the plurality of space objects from at least one of each of the plurality of space objects and the management business device 40. Then, based on the flight record information 402, the recorder processing unit 110 sets the orbit record information 52 in the space information recorder 50. Therefore, the collision avoidance assistance device 100 according to this embodiment has the effect of being able to immediately present the flight record requested by a management business operator.

In the collision avoidance assistance device 100 according to this embodiment, the flight record information 402 is acquired from the management business device 40. However, the collision avoidance assistance device may include measurement means to measure a flight state of a space object. That is, the collision avoidance assistance device may include means for measuring the time and orbit information of a satellite, and record an orbit history corresponding to orbit forecast information disclosed in advance.

In the collision avoidance assistance device 100 according to this embodiment, predicted orbit information of satellites at the launch scheduled time can be disclosed to a rocket launch business operator that is planning a new rocket launch, for example. This allows the rocket launch business operator to take measures to avoid collisions. Furthermore, the space information recorder 50 of the collision avoidance assistance device 100 according to this embodiment has the effect of allowing verification by comparison between the predicted orbit and the actual orbit history.

In the collision avoidance assistance device 100 according to this embodiment, measurement device information installed in a satellite may be used as means for measuring the flight record information 402, that is, a precise orbit ephemeris record.

The satellites constituting a mega-constellation can each perform inter-satellite communication or inter-satellite positioning with preceding and following satellites flying in the same orbital plane or satellites flying in an adjacent orbit. Therefore, when the measurement device information installed in the satellite is used in the collision avoidance assistance device 100 according to this embodiment, this has the effect of being able to measure high-precision orbit information including information such as measurement information of a GPS receiver provided in the satellite. This also has the effect of being able to improve precision by statistical processing by a large number of satellites.

The collision avoidance assistance device 100 according to this embodiment includes the space information recorder 50, and is installed in a ground facility.

An aircraft is equipped with a voice recorder for the purpose of verification in airplane accidents. An automobile is equipped with a drive recorder for the purpose of verification in automobile accidents.

With the emergence of mega-constellation business operators, a satellite constellation with as many as several thousand satellites formed at a low orbital altitude of about 600 km or lower has a high risk of collision in a new rocket launch. Therefore, for a similar purpose as that of the voice recorder or drive recorder described above, the "space information recorder", which should also be called a satellite drive recorder, is required.

Even if an aircraft accident is an explosive accident, there is a possibility that on-board equipment can be recovered after the accident. For this reason, the voice recorder is designed to be robust enough to withstand an explosion. Since there is a pilot in the aircraft, it is arranged that not only information on instruments but also a voice record is retained by recording the voice of the pilot so as to allow verification after an accident including the presence or absence of anomalies in the instruments. In contrast to this, in a satellite collision, the on-board instruments are scattered in outer space and it is difficult to recover them after the accident, and there is no pilot. For these reasons, a voice record is not required, and the main purpose is to record data of the on-board measurement instruments. Therefore, after a flight record is acquired, the data needs to be promptly transmitted to the ground or another satellite so that the data up to immediately before occurrence of a collision accident is stored in a different place.

If a collision accident occurs in outer space and a satellite is scattered in pieces, it is difficult to recover the on-board instruments. In the concept of satellite constellation, data communication between a satellite and the ground or between satellites can be carried out in real time. Therefore, flight record information, that is, satellite orbit history information can also be transmitted in real time. The orbit record information placed in the ground facility can be referred to after an accident, and has the effect of being effective as a basis for verifying the situation of the accident.

In the collision avoidance assistance device 100 according to this embodiment, measurement information of an SSA asset, which is a ground observation device, may be used as means for measuring flight record information, that is, a precise orbit ephemeris record.

Recently, the maintenance of the SSA asset using a ground-based telescope or radar has progressed, and its measurement precision has also improved. An SSA information provision business operator can also handle a satellite orbit history, which has the effect of allowing objective verification by a third party.

The collision avoidance assistance device 100 according to this embodiment includes an artificial space object equipped with an IC tag including a satellite ID, time, and location information and means for reading IC tag information of an artificial space object flying at a distance without contact, and the content is updated based on the IC tag information.

The satellite constellation is designed so that when satellites come in proximity of, for example, within 100 km to each other, the IC tags included in the satellites emit radio waves for near-field communication strong enough to be received with an omnidirectional antenna. This allows each of the satellites in proximity to each other to receive satellite information of the other satellite, and if there are many proximity opportunities in a mega-constellation, orbit record information that can be shared in orbit will increase over time. In particular, when the precision of in-orbit actual measurement information of the satellite itself is higher than that of the ground measurement means, the IC tag is effective as means for acquiring high-precision in-orbit information.

In the collision avoidance assistance device 100 according to this embodiment, orbit forecast information, that is, satellite orbit prediction information may be disclosed for a fee to a rocket launch business operator, an orbital insertion business operator, and a debris retrieval business operator.

In order for the rocket launch business operator to fulfil its obligation to secure flight safety, precise predicted orbit information of the satellites constituting a mega-constellation is required, so that there is an effect that the asset value of satellite orbit prediction information is highly evaluated, and it may become a source of revenue for satellite business operators.

In addition, while a satellite after completing a mission is deorbiting, there is a high risk of collision with a satellite in a mega-constellation, so that, similarly, it may be possible to seek liability of a business operator of a deorbiting satellite or a debris retrieval business operator that has failed to take collision avoidance measures for orbit information that has been disclosed. This has the effect that satellite orbit information becomes a source of revenue.

Furthermore, a business operator that inserts a geostationary satellite into orbit launches the geostationary satellite into a geostationary transfer orbit with a rocket, and then achieves orbital transfer to a geostationary orbit with the propulsion device included in the satellite, so that there is a risk of collision with a mega-constellation satellite in that process and similar effects are expected.

\*\*\*Other Configurations\*\*\*

Modification Example 1

The space information recorder may store orbit forecast information and orbit record information in a memory, and may include a processor that executes programs. For example, the space information recorder may have the functions described below.

The space information recorder includes insurance premium rate setting means of a space insurance program that makes an insurance payment from a pre-collected insurance premium when a collision has occurred between a space object A and a space object B among the plurality of space objects. The insurance premium rate setting means sets an insurance premium rate based on the forecast error included in the orbit forecast information.

The space information recorder includes insurance payment assessment means of a space insurance program that makes an insurance payment from a pre-collected insurance premium when a collision has occurred between a space object A and a space object B among the plurality of space objects. The insurance payment assessment means extracts orbit record information as of the time of the collision between the space objects as a collision record from the orbit record information, and extracts orbit forecast information as of the time of the collision between the space objects as pre-collision forecast information from the orbit forecast information. Then, the insurance payment assessment means assesses the insurance payment based on comparison between difference information A between a collision record and pre-collision forecast information of the space object A and difference information B between a collision record and pre-collision forecast information of the space object B.

The forecast error includes one or both of a basis for the forecast error and a verification record of the forecast error.

The space information recorder includes means for outputting a danger alert to the management business operator and an insurance business operator that makes an insurance payment from a pre-collected insurance premium when a collision has occurred between a space object A and a space object B among a plurality of space objects.

The space information recorder includes means for outputting the orbit record information to the management business operator and an insurance business operator that makes an insurance payment from a pre-collected insurance premium when a collision has occurred between a space object A and a space object B among the plurality of space objects.

The space information recorder includes means for outputting a danger alert indicating existence of space objects whose locations at the same time are in a dangerous relationship to a debris retrieval business operator that retrieves debris that is generated when a collision occurs between a space object A and a space object B among the plurality of space objects.

The space information recorder executes a collision avoidance assistance program to, before a collision occurs between space objects among the plurality of space objects, identify existence of danger-anticipated objects, based on the orbit forecast information, output a danger alert, and decide a space object to perform an avoidance operation. The space information recorder executes the collision avoidance assistance program including danger alert output means to determine whether the danger-anticipated objects exist among the plurality of space objects based on the orbit forecast information, and when it is determined that the danger-anticipated objects exist, output a danger alert indicating existence of the danger-anticipated objects. The space information recorder executes the collision avoidance assistance program including avoidance space object deciding means to decide a space object to perform an avoidance operation out of space objects included in the danger-anticipated objects after the danger alert is output.

The space information recorder includes a disclosure threshold for determining whether the orbit forecast information is to be disclosed to a different management business device when it is foreseen that space objects among the plurality of space objects will come in proximity to each other at a specific time, and information disclosure means to determine whether disclosure is to be performed.

Modification Example 2

In this embodiment, the functions of the collision avoidance assistance device 100 are realized by software. As a modification example, the functions of the collision avoidance assistance device 100 may be realized by hardware.

Figure 20:
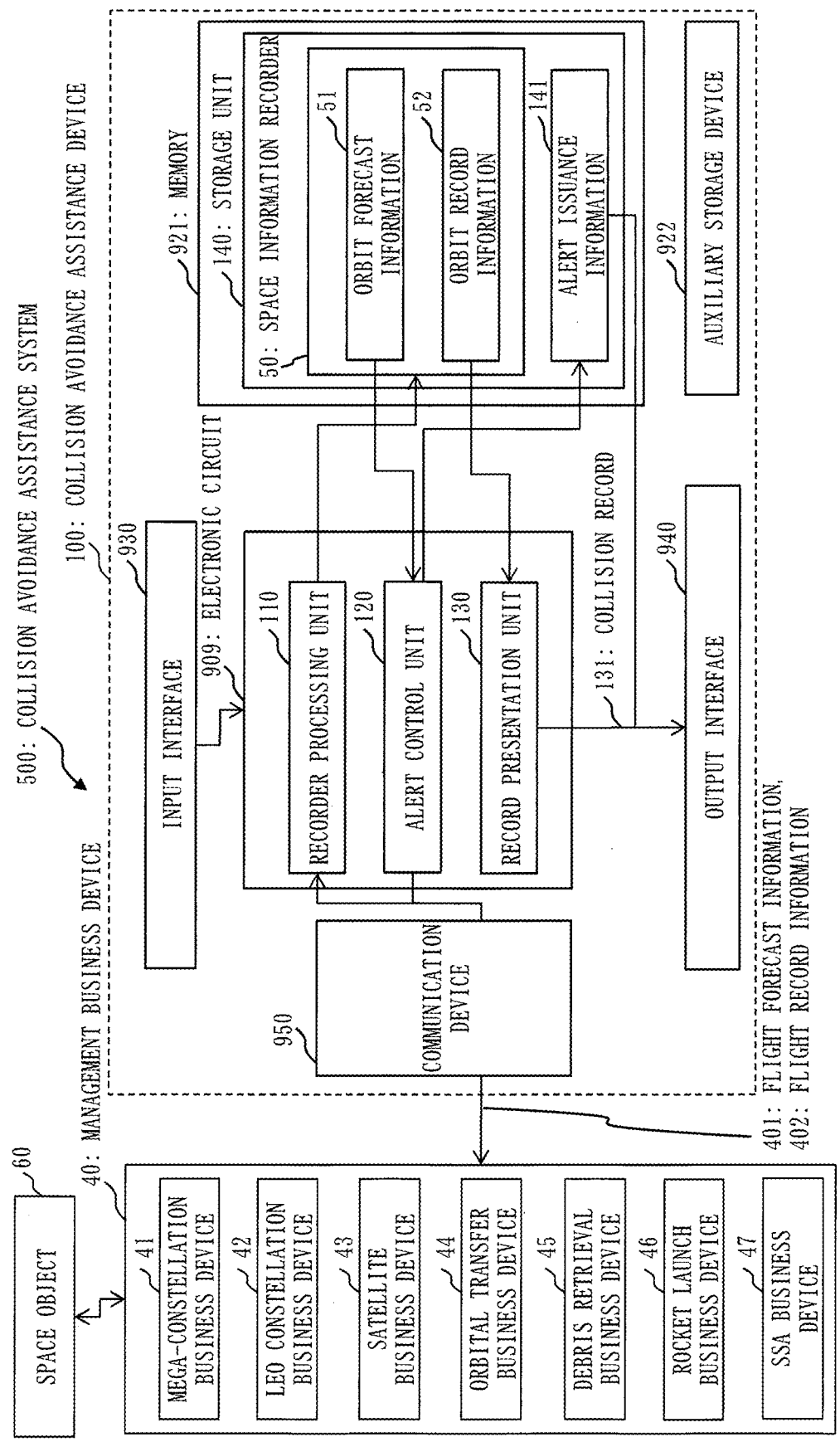
FIG. 20 is a configuration diagram of the collision avoidance assistance device according to a modification example of Embodiment 1.

FIG. 20 is a diagram illustrating a configuration of the collision avoidance assistance device 100 according to a modification example of this embodiment.

The collision avoidance assistance device 100 includes an electronic circuit in place of the processor 910.

The electronic circuit is a dedicated electronic circuit that realizes the functions of the collision avoidance assistance device 100.

Specifically, the electronic circuit is a single circuit, a composite circuit, a programmed processor, a parallel-programmed processor, a logic IC, a GA, an ASIC, or an FPGA. GA is an abbreviation for Gate Array.

The functions of the collision avoidance assistance device 100 may be realized by one electronic circuit, or may be distributed among and realized by a plurality of electronic circuits.

As another modification example, some of the functions of the collision avoidance assistance device 100 may be realized by the electronic circuit, and the rest of the functions may be realized by software.

Each of the processor and the electronic circuit is also called processing circuitry. That is, the functions of the collision avoidance assistance device 100 are realized by the processing circuitry.

Embodiment 2

In this embodiment, differences from Embodiment 1 will be mainly described. Components that are substantially the same as those in Embodiment 1 will be denoted by the same reference signs and description thereof may be omitted.

In this embodiment, a collision avoidance assistance device 100a will be described, which appropriately decides, when the danger alert 25 is issued, which space object of the danger-anticipated objects 65 should take an avoidance action, based on the orbit forecast information 51.

*Description of Configurations*

Figure 21:
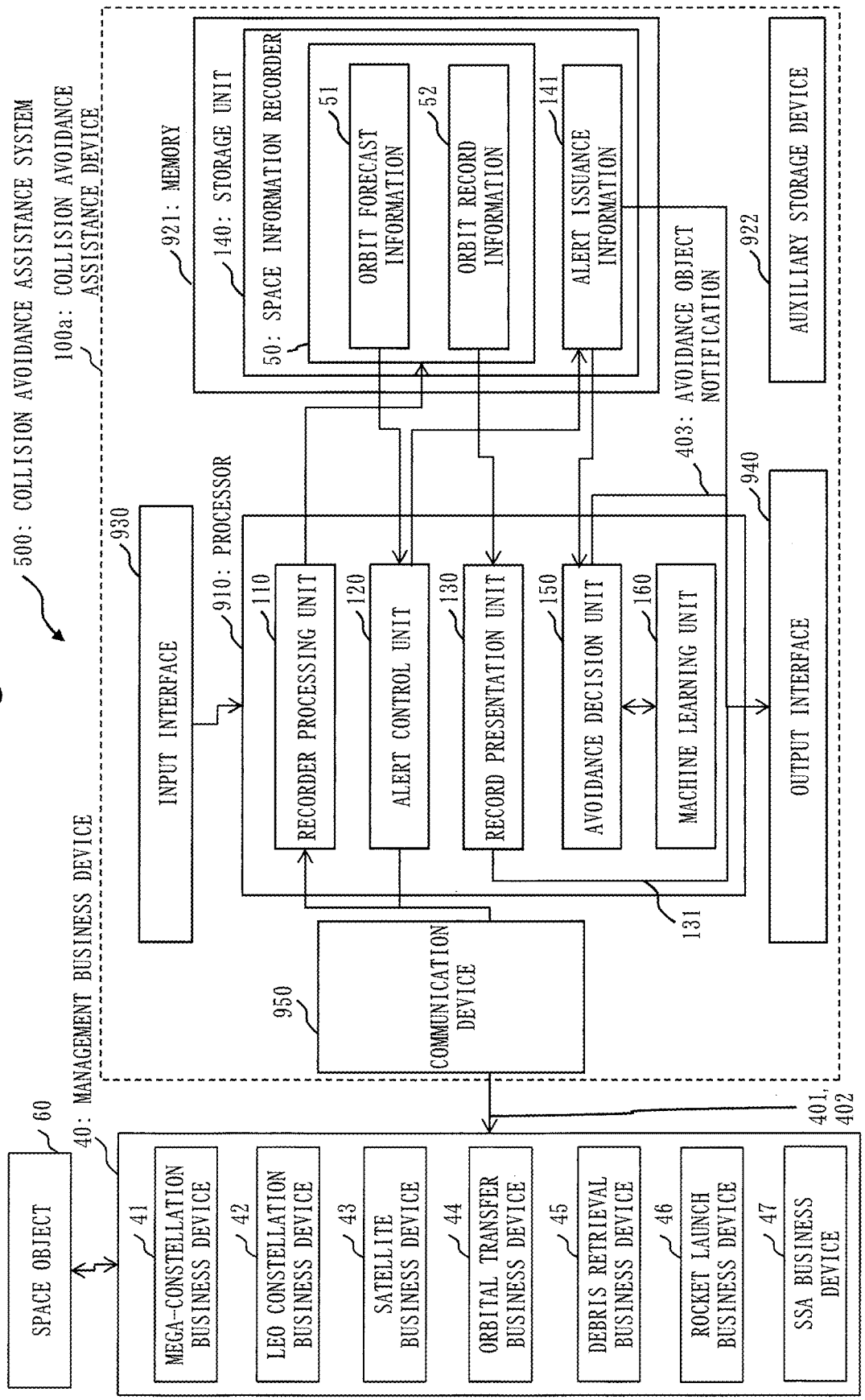
FIG. 21 is a configuration diagram of the collision avoidance assistance device according to Embodiment 2.

FIG. 21 is a configuration diagram of the collision avoidance assistance device 100a of the collision avoidance assistance system 500 according to this embodiment.

The collision avoidance assistance device 100a according to this embodiment includes an avoidance decision unit 150 and a machine learning unit 160 in addition to the functional elements of the collision avoidance assistance device 100 of Embodiment 1. The rest of the functional elements and the hardware configuration are substantially the same as those in Embodiment 1. A collision avoidance assistance program according to this embodiment is a program that realizes at least the functions of the alert control unit 120, the avoidance decision unit 150, and the machine learning unit 160. That is, the collision avoidance assistance program according to this embodiment causes a computer to execute at least an alert control process, an avoidance decision process, and a machine learning process.

The alert control unit 120 determines whether space objects whose locations at the same time are in a dangerous relationship exist as danger-anticipated objects 65 among a plurality of space objects, based on the orbit forecast information 51. If the presence of the danger-anticipated objects 65 is determined, the alert control unit 120 outputs a danger alert 25 indicating the presence of the danger-anticipated objects 65. The method by which the alert control unit 120 outputs the danger alert 25 is substantially the same as that described in Embodiment 1.

When the danger alert 25 is output, the avoidance decision unit 150 decides an avoidance space object 69, which is a space object to perform an avoidance operation among the space objects included in the danger-anticipated objects 65. The conditions used for deciding the avoidance space object 69 are, for example, as described below.

The avoidance decision unit 150 decides the avoidance space object 69 based on whether each space object included in the danger-anticipated objects 65 is a rocket to be launched.

The avoidance decision unit 150 decides the avoidance space object 69 based on whether each space object included in the danger-anticipated objects 65 belongs to a mega-constellation.

The avoidance decision unit 150 decides the avoidance space object 69 based on whether each space object included in the danger-anticipated objects 65 is in the steady operation state or the non-steady operation state.

The avoidance decision unit 150 decides the avoidance space object 69 based on whether each space object included in the danger-anticipated objects 65 is an orbital transfer satellite performing orbital transfer.

The avoidance decision unit 150 decides the avoidance space object 69 based on whether each space object included in the danger-anticipated objects 65 has a collision avoidance function.

The avoidance decision unit 150 decides the avoidance space object 69 based on whether each space object included in the danger-anticipated objects 65 is located in a congested orbit.

The avoidance decision unit 150 decides the avoidance space object 69 from the danger-anticipated objects 65 using one of the above conditions or a combination of two or more of the above conditions.

The machine learning unit 160 uses machine learning using a result of deciding the avoidance space object 69, that is, a result of decision by the avoidance decision unit 150, so as to update the algorithm of the avoidance decision process of deciding the avoidance space object 69.

*Description of Operation*

Referring to FIGS. 22 to 25, a collision avoidance assistance process by the collision avoidance assistance device 100a according to this embodiment will be described.

It is assumed here that a space object A and a space object B exist as the danger-anticipated objects 65, which are space objects whose locations at the same time are in a dangerous relationship.

<Avoidance Decision Process>

Figure 22:
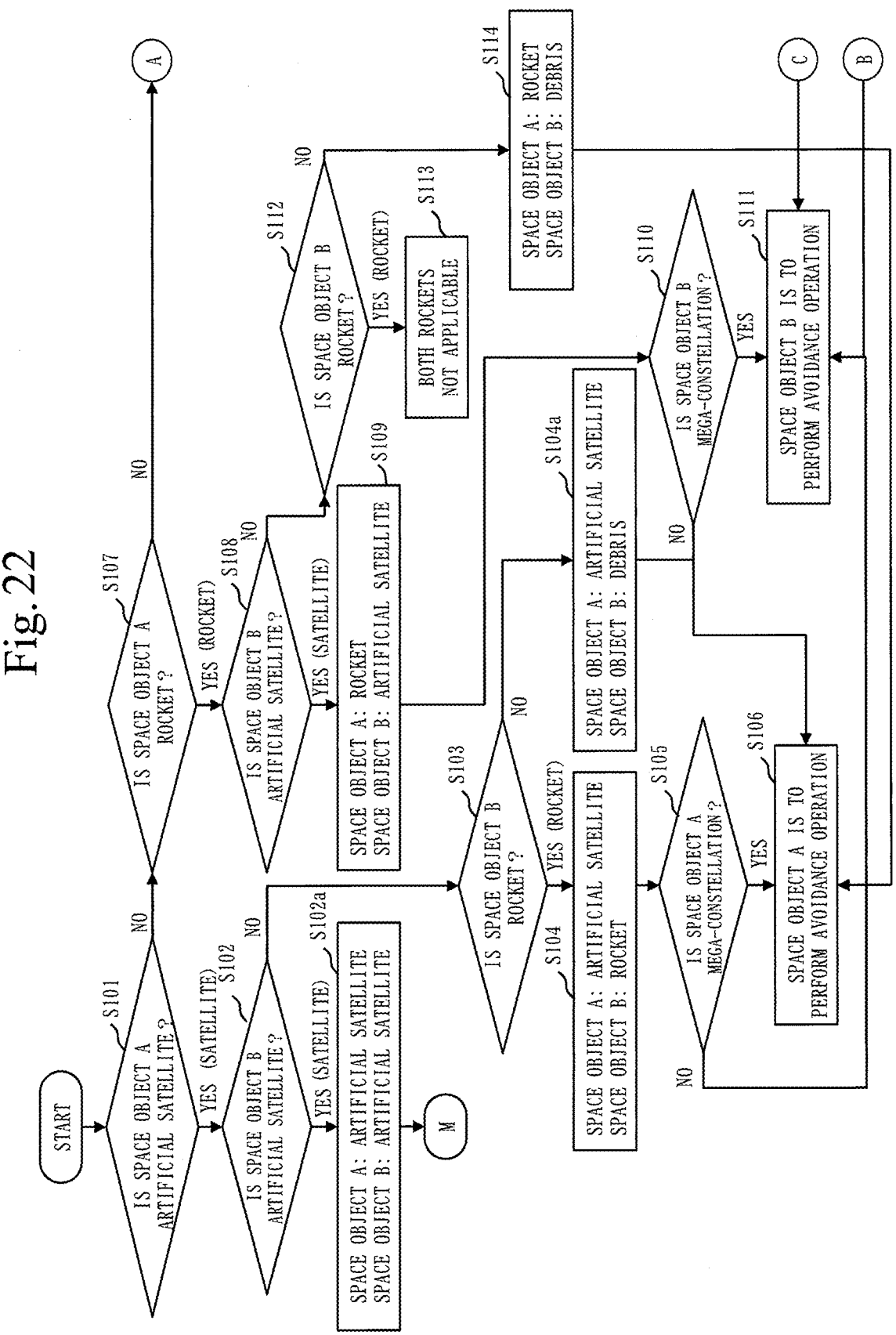
FIG. 22 is a flowchart illustrating an example of an avoidance decision process based on conditions such as whether a space object is a rocket according to Embodiment 2.
Figure 23:
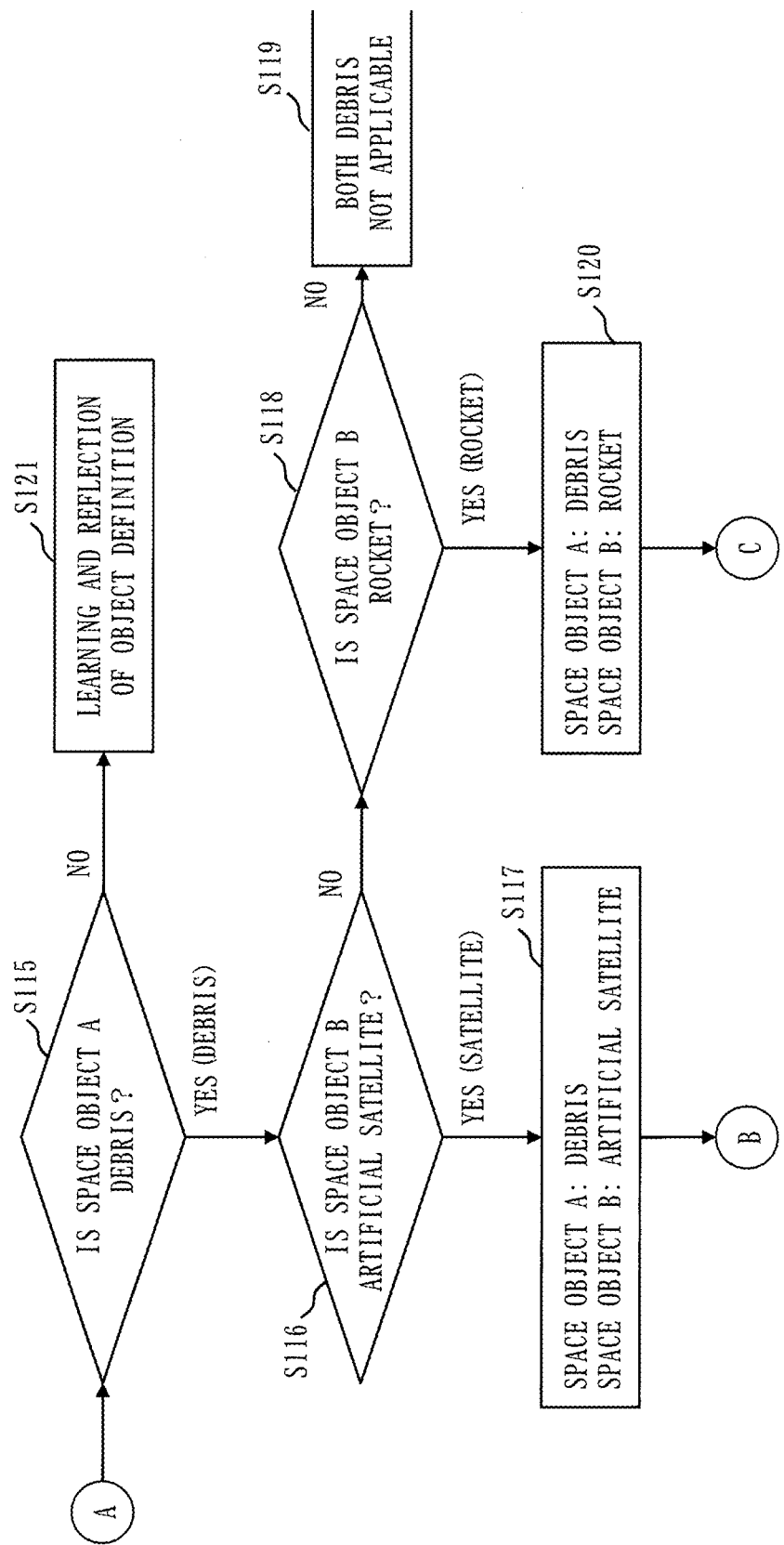
FIG. 23 is a flowchart illustrating an example of the avoidance decision process based on conditions such as whether a space object is a rocket according to Embodiment 2.

FIGS. 22 and 23 are a flowchart illustrating an example of the avoidance decision process based on the conditions such as whether each space object is a rocket according to this embodiment.

FIGS. 22 and 23 are an example of the process of deciding the avoidance space object 69 based on the conditions such as whether each space object is a rocket, whether each space object is an artificial satellite belonging to a mega-constellation, and whether each space object is debris.

In step S101, the avoidance decision unit 150 determines whether the space object A is an artificial satellite. Specifically, the avoidance decision unit 150 determines whether each space object is an artificial satellite, using the space object ID 511 in the orbit forecast information 51 illustrated in FIG. 11. For example, the collision avoidance assistance device 100 may have a management table in which each space object ID is associated with a type of space object. The avoidance decision unit 150 may use the space object ID to acquire the type of space object from the management table and determine whether each space object is an artificial satellite.

If the space object A is an artificial satellite, the avoidance decision unit 150 determines whether the space object B is an artificial satellite in step S102.

If both the space object A and the space object B are artificial satellites (YES in step S102), the process proceeds to at least one of M1 to M4.

If the space object B is not an artificial satellite, it is determined whether the space object B is a rocket in step S103. Specifically, the avoidance decision unit 150 determines whether the space object is a rocket, using the space object ID 511 in the orbit forecast information 51 illustrated in FIG. 11. For example, the collision avoidance assistance device 100 may have a management table in which each space object ID is associated with a type of space object. The avoidance decision unit 150 may use the space object ID to acquire the type of space object from the management table and determine whether the space object is a rocket.

If the space object A is an artificial satellite and the space object B is a rocket (step S104), the avoidance decision unit 150 determines whether the space object A belongs to a mega-constellation in step S105.

If the space object A is an artificial satellite and the space object B is not a rocket, that is, it is debris (step S104a), the process proceeds to step S106.

If the space object A belongs to a mega-constellation in step S105, the process proceeds to step S106.

If the space object A does not belong to a mega-constellation in step S105, the process proceeds to step S111.

If the space object A is not an artificial satellite in step S101, the avoidance decision unit 150 determines whether the space object A is a rocket in step S107.

If the space object A is a rocket in step S107, the avoidance decision unit 150 determines whether the space object B is an artificial satellite in step S108.

If the space object A is a rocket and the space object B is an artificial satellite (step S109), the avoidance decision unit 150 determines whether the space object B belongs to a mega-constellation in step S110.

If the space object B does not belong to a mega-constellation in step S110, the process proceeds to step S106.

If the space object B belongs to a mega-constellation in step S110, the process proceeds to step S111.

If the space object B is not an artificial satellite in step S108, the avoidance decision unit 150 determines whether the space object B is a rocket in step S112.

If the space object B is a rocket in step S112, then both the space object A and the space object B are rockets. In this case, in step S113, the avoidance decision unit 150 determines that the avoidance decision process is not applicable to the danger-anticipated objects 65.

If the space object B is not a rocket, that is, the space object B is debris in step S112, then the space object A is a rocket and the space object B is debris (step S114). In this case, the process proceeds to step S106.

In step S106, the avoidance decision unit 150 decides the space object A as the avoidance space object 69 to perform an avoidance operation out of the space objects included in the danger-anticipated objects 65.

In step S111, the avoidance decision unit 150 decides the space object B as the avoidance space object 69 to perform an avoidance operation out of the space objects included in the danger-anticipated objects 65.

If the space object A is not a rocket in step S107, the avoidance decision unit 150 determines whether the space object A is debris in step S115.

If the space object A is debris in step S115, the avoidance decision unit 150 determines whether the space object B is an artificial satellite in step S116.

If the space object B is an artificial satellite in step S116, then the space object A is debris and the space object B is an artificial satellite (step S117). In this case, the process proceeds to step S111.

If the space object A is not debris in step S115, the avoidance decision unit 150 performs an object definition learning process and an algorithm update process in step S121.

If the space object B is not an artificial satellite in step S116, it is determined whether the space object B is a rocket in step S118.

If the space object B is a rocket in step S118, then the space object A is debris and the space object B is a rocket (step S120). In this case, the process proceeds to step S111.

If the space object B is not a rocket in step S118, then both the space object A and the space object B are debris. In this case, in step S119, the avoidance decision unit 150 determines that the avoidance decision process is not applicable to the danger-anticipated objects 65.

Figure 24:
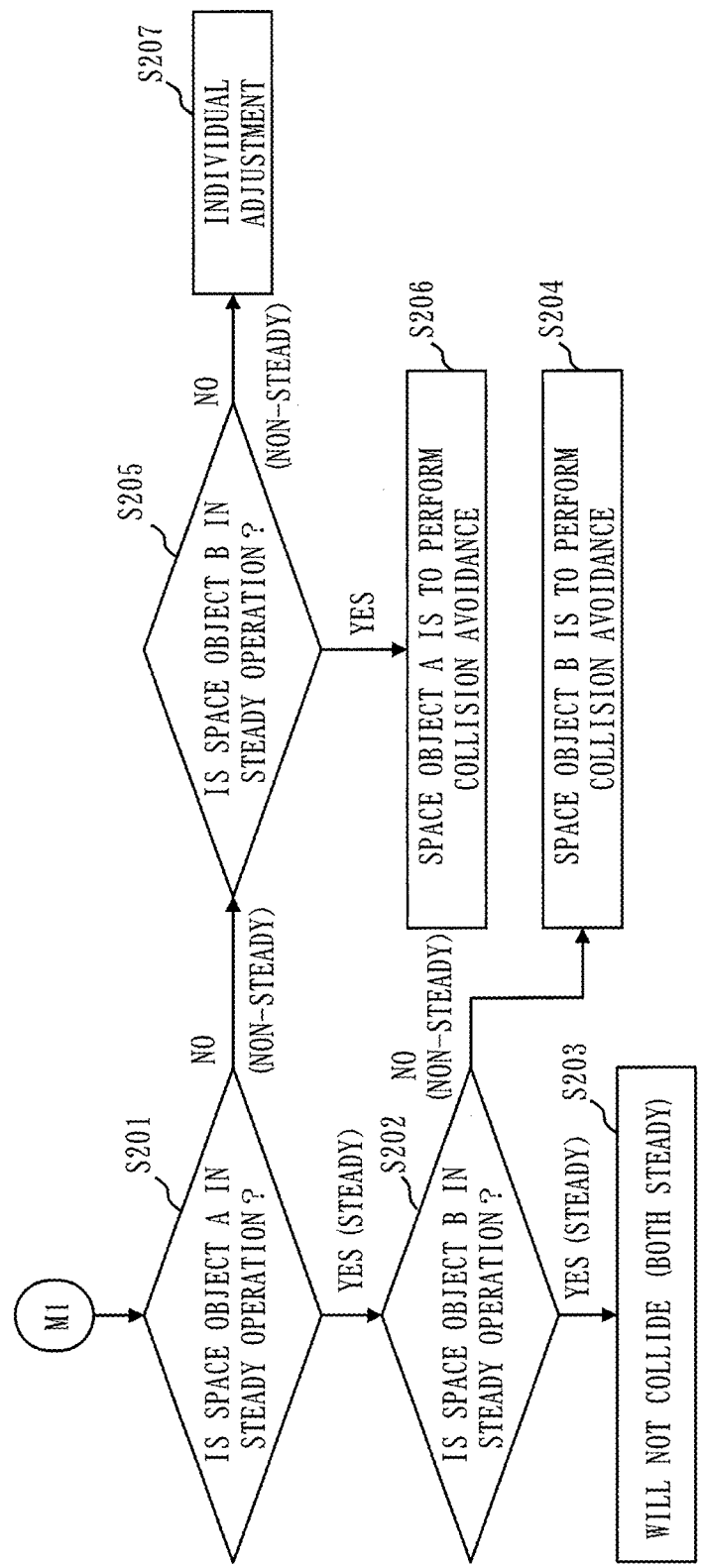
FIG. 24 is a flowchart of the avoidance decision process based on conditions such as whether a space object is in steady operation according to Embodiment 2.

FIG. 24 is a flowchart of the avoidance decision process based on the conditions such as whether each space object is in steady operation according to this embodiment.

FIG. 24 is an example of the process of deciding the avoidance space object 69 based on the conditions such as whether each space object is in steady operation or non-steady operation. The process of FIG. 24 is referred to as an M1 process. Specifically, the steady operation state is a state in which a satellite is flying in orbit in steady operation. The non-steady operation state includes the launch transient state from launch to orbit insertion of each of the plurality of space objects and the post-deorbit transient state after deorbit until atmospheric entry or insertion into a disposal orbit of each of the plurality of space objects.

In step S201, the avoidance decision unit 150 determines whether the space object A is in the steady operation state or the non-steady operation state. Specifically, the avoidance decision unit 150 determines whether the space object is in the steady operation state or the non-steady operation state, using the forecast flight state 515 in the orbit forecast information 51 illustrated in FIG. 11.

If the space object A is in the steady operation state in step S201, the avoidance decision unit 150 determines whether the space object B is in the steady operation state or the non-steady operation state in step S202.

If the space object B is in the steady operation state in step S202, then both the space object A and the space object B are in the steady operation state. In this case, the avoidance decision unit 150 determines that the space object A and the space object B will not collide with each other in step S203.

If the space object A is in the non-steady operation state in step S201, the avoidance decision unit 150 determines whether the space object B is in the steady operation state or the non-steady operation state in step S205.

If the space object B is in the steady operation state in step S205, then the space object A is in the non-steady operation state and the space object B is in the steady operation state. In this case, the avoidance decision unit 150 decides that the space object A, which is in the non-steady operation state, is the avoidance space object 69 to perform an avoidance operation in step S206.

If the space object B is in the non-steady operation state in step S205, then both the space object A and the space object B are in the non-steady operation state. In this case, the avoidance decision unit 150 dose not decide the avoidance space object 69 in step S207 because individual adjustment is to be made in this case.

In the space object B is in the non-steady operation state in step S202, then the space object A is in the steady operation state and the space object B is in the non-steady operation state. In this case, the avoidance decision unit 150 decides that the space object B, which is in the non-steady operation state, is the avoidance space object 69 to perform an avoidance operation in step S204.

Figure 25:
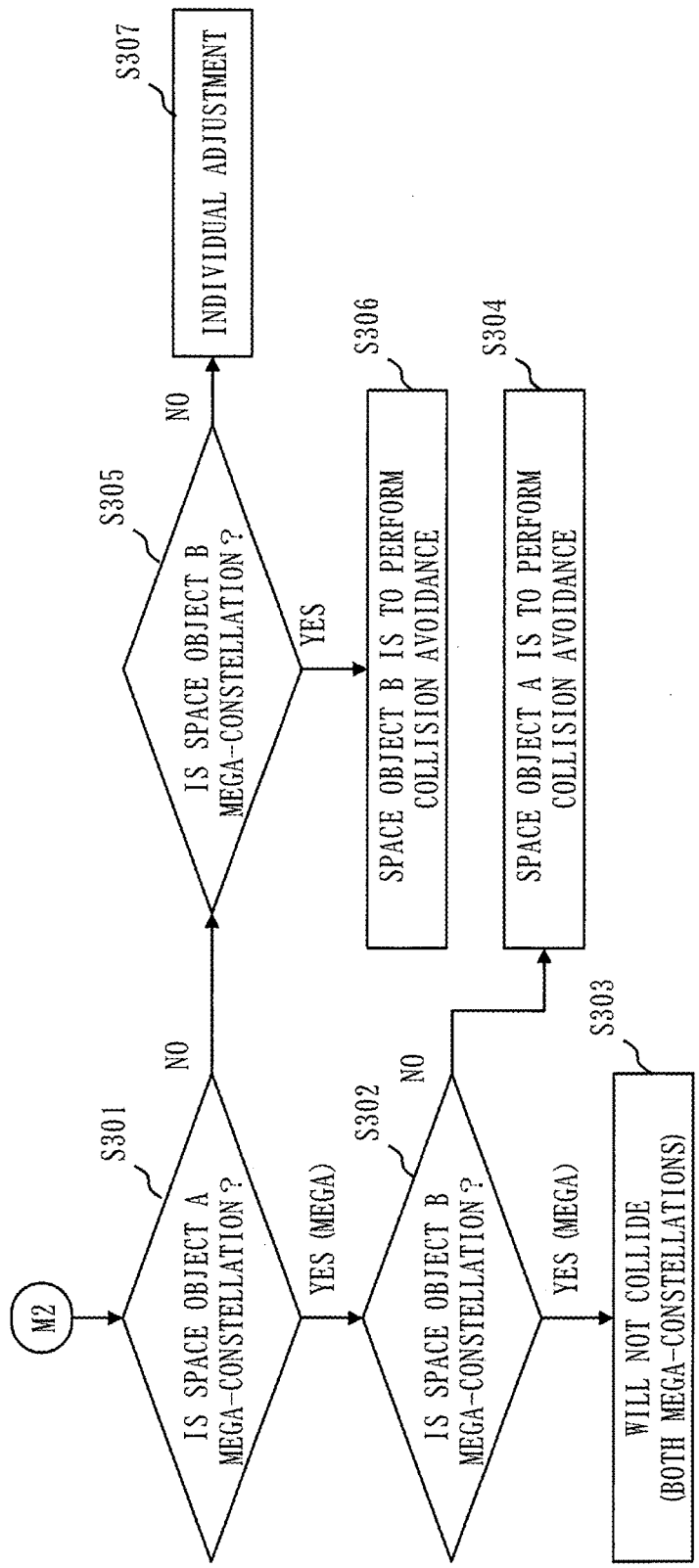
FIG. 25 is a flowchart of the avoidance decision process based on conditions such as whether a space object belongs to a mega-constellation according to Embodiment 2.

FIG. 25 is a flowchart of the avoidance decision process based on the conditions such as whether each space object belongs to a mega-constellation according to this embodiment.

FIG. 25 is an example of the process of deciding the avoidance space object 69 based on the conditions such as whether each space object belongs to a mega-constellation. The process of FIG. 25 is referred to as an M2 process.

In step S301, the avoidance decision unit 150 determines whether the space object A belongs to a mega-constellation. Specifically, the avoidance decision unit 150 determines whether the space object A belongs to a mega-constellation, using the space object ID 511 in the orbit forecast information 51 illustrated in FIG. 11. For example, the collision avoidance assistance device 100 may have a management table in which each space object ID is associated with a management business operator of a space object. The avoidance decision unit 150 may use the space object ID to acquire the management business operator of the space object from the management table, and determine whether the space object belongs to a mega-constellation.

If the space object A belongs to a mega-constellation in step S301, the avoidance decision unit 150 determines whether the space object B belongs to a mega-constellation in step S302.

If the space object B belongs to a mega-constellation in step S302, then both the space object A and the space object B belong to a mega-constellation. In this case, the avoidance decision unit 150 determines that the space object A and the space object B will not collide with each other in step S303.

If the space object A does not belong to a mega-constellation in step S301, the avoidance decision unit 150 determines whether the space object B belongs to a mega-constellation in step S305.

If the space object B belongs to a mega-constellation in step S305, then the space object A does not belong to a mega-constellation and the space object B belongs to a mega-constellation. In this case, the avoidance decision unit 150 decides that the space object B, which belongs to a mega-constellation, is the avoidance space object 69 to perform an avoidance operation in step S306.

If the space object B does not belong to a mega-constellation in step S305, then both the space object A and the space object B do not belong to a mega-constellation. In this case, the avoidance decision unit 150 dose not decide the avoidance space object 69 in step S307 because individual adjustment is to be made in this case.

If the space object B does not belong to a mega-constellation in step S302, then the space object A belongs to a mega-constellation and the space object B does not belong to a mega-constellation. In this case, the avoidance decision unit 150 decides that the space object A, which belongs to a mega-constellation, is the avoidance space object 69 to perform an avoidance operation in step S304.

Figure 26:
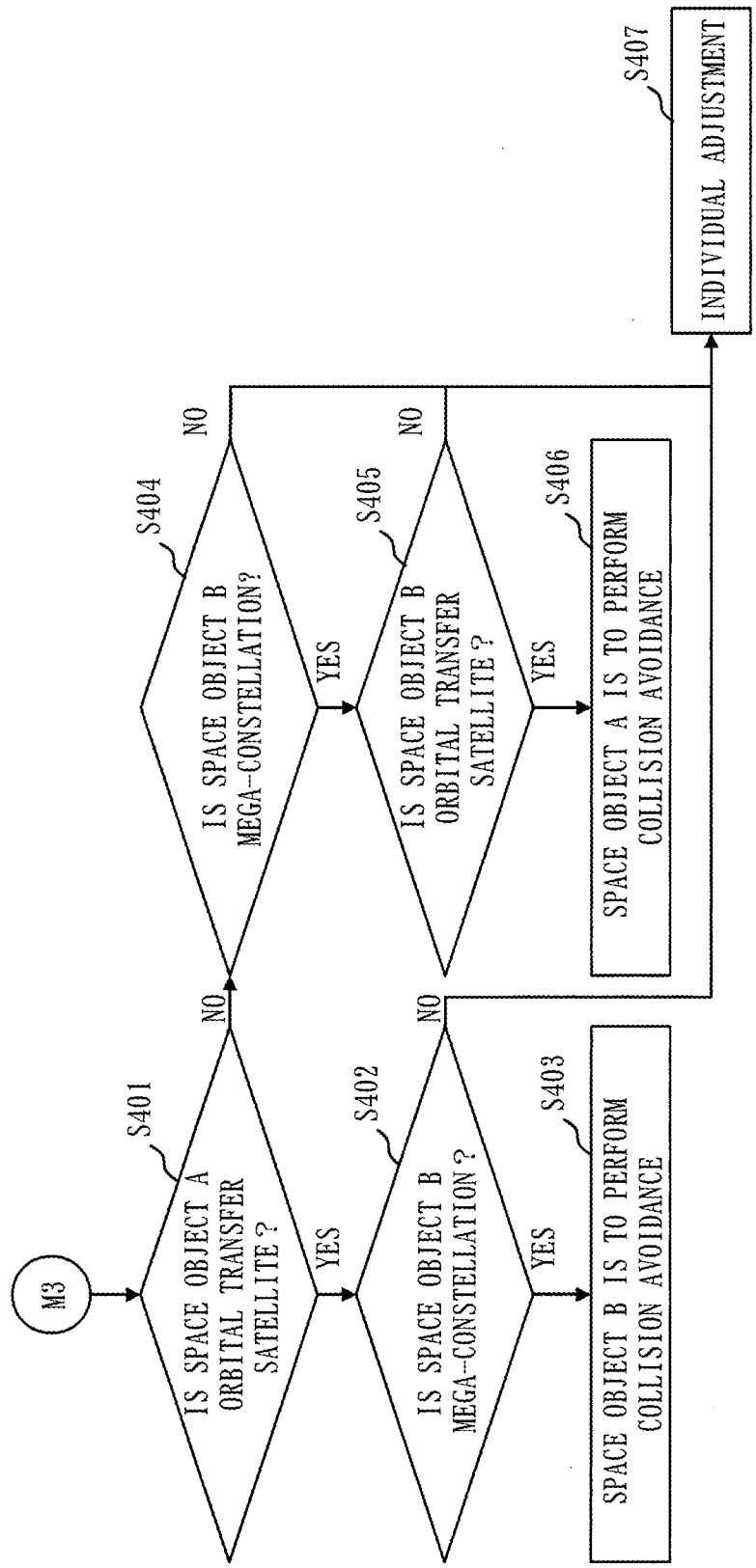
FIG. 26 is a flowchart of the avoidance decision process based on conditions such as whether a space object is an orbital transfer satellite according to Embodiment 2.

FIG. 26 is a flowchart of the avoidance decision process based on the conditions such as whether each space object is an orbital transfer satellite according to this embodiment.

FIG. 26 is an example of the process of deciding the avoidance space object 69 based on the conditions such as whether each space object is an orbital transfer satellite performing orbital transfer. The process of FIG. 26 is referred to asC an M3 process.

In step S401, the avoidance decision unit 150 determines whether the space object A is an orbital transfer satellite. Specifically, the avoidance decision unit 150 determines whether each space object is an orbital transfer satellite, using the forecast flight state 515 in the orbit forecast information 51 illustrated in FIG. 11.

If the space object A is an orbital transfer satellite in step S401, the avoidance decision unit 150 determines whether the space object B belongs to a mega-constellation in step S402.

If the space object B belongs to a mega-constellation in step S402, the avoidance decision unit 150 decides that the space object B, which belongs to a mega-constellation, is the avoidance space object 69 to perform an avoidance operation in step S403.

If the space object A is not an orbital transfer satellite in step S401, the avoidance decision unit 150 determines whether the space object B belongs to a mega-constellation in step S404.

If the space object B belongs to a mega-constellation in step S404, the avoidance decision unit 150 determines whether the space object B is an orbital transfer satellite in step S405.

If the space object B is an orbital transfer satellite in step S405, then the space object A is not an orbital transfer satellite and the space object B is an orbital transfer satellite belonging to a mega-constellation. In this case, the avoidance decision unit 150 decides that the space object A is the avoidance space object 69 to perform an avoidance operation in step S406.

If the space object B does not belong to a mega-constellation in step S402, then the space object A is an orbital transfer satellite and the space object B does not belong to a mega-constellation. In this case, the avoidance decision unit 150 does not decide the avoidance space object 69 in step S407 because individual adjustment is to be made in this case.

If the space object B does not belong to a mega-constellation in step S404, then the space object A is not an orbital transfer satellite and the space object B does not belong to a mega-constellation. In this case, the avoidance decision unit 150 does not decide the avoidance space object 69 in step S407 because individual adjustment is to be made in this case.

In step S405, the space object B belongs to a mega-constellation but is not an orbital transfer satellite, and the space object A is not an orbital transfer satellite. In this case, the avoidance decision unit 150 does not decide the avoidance space object 69 in step S407 because individual adjustment is to be made in this case.

Figure 27:
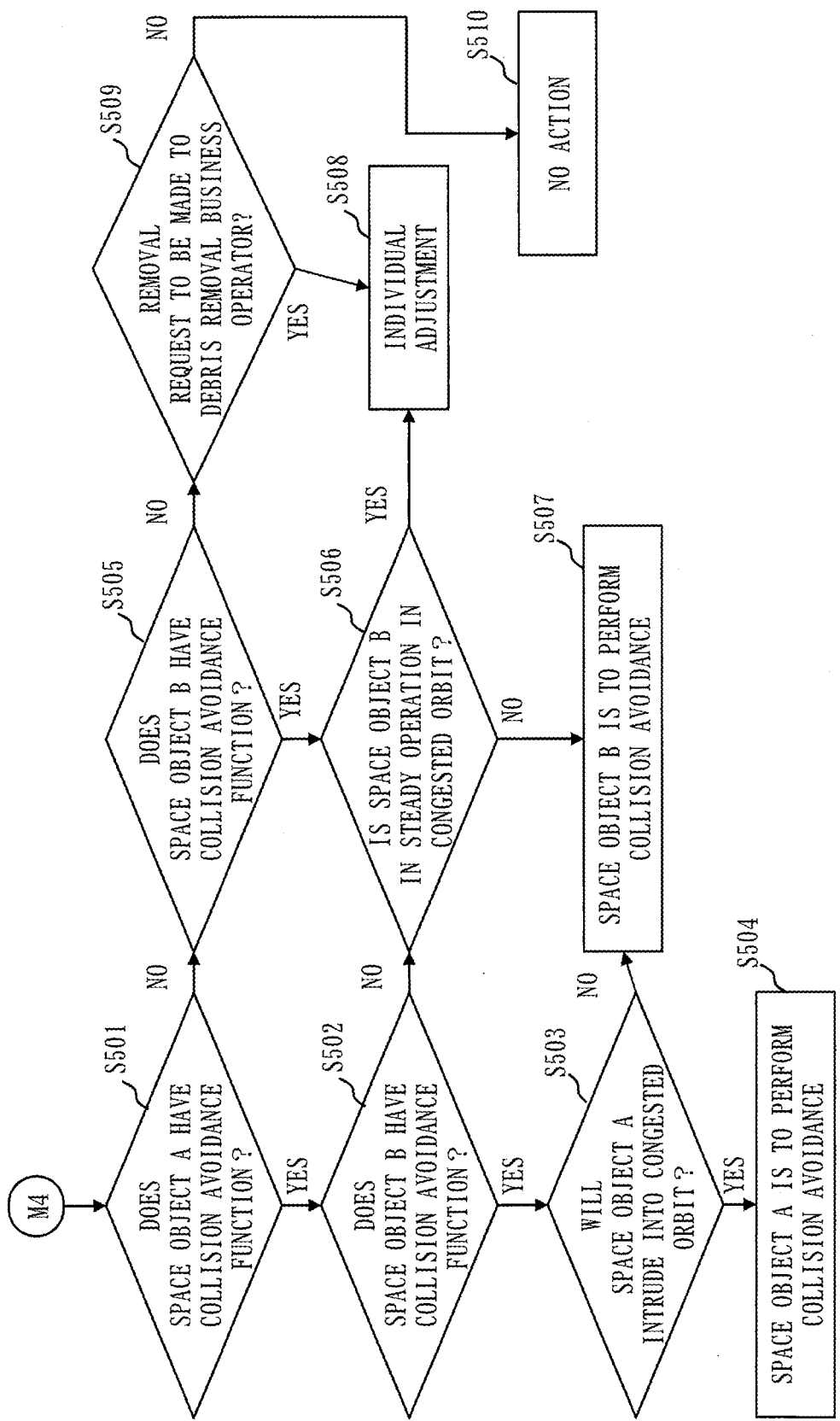
FIG. 27 is a flowchart of the avoidance decision process based on conditions such as whether a space object has a collision avoidance function according to Embodiment 2.

FIG. 27 is a flowchart of the avoidance decision process based on the conditions such as whether each space object has the collision avoidance function according to this embodiment.

FIG. 27 is an example of the process of deciding the avoidance space object 69 based on the conditions such as whether each space object has the collision avoidance function. The process of FIG. 27 is referred to as an M4 process.

In step S501, the avoidance decision unit 150 determines whether the space object A has the collision avoidance function. Specifically, the avoidance decision unit 150 determines whether the space object A has the collision avoidance function, using the space object ID 511 in the orbit forecast information 51 illustrated in FIG. 11. For example, the collision avoidance assistance device 100 may have a management table in which each space object ID is associated with the functions of a space object. The avoidance decision unit 150 may use the space object ID to acquire the functions of the space object from the management table and determine whether the space object has the collision avoidance function.

If the space object A has the collision avoidance function in step S501, the avoidance decision unit 150 determines whether the space object B has the collision avoidance function in step S502.

If the space object B has the collision avoidance function in step S502, the avoidance decision unit 150 determines whether the space object A will intrude into a congested orbit in step S503. Specifically, the avoidance decision unit 150 determines whether the space object A will intrude into a congested orbit, using the forecast flight state 515 in the orbit forecast information 51 illustrated in FIG. 11.

If the space object A will intrude into a congested orbit in step S503, then the space object A has the collision avoidance function and will intrude into a congested orbit. Therefore, the avoidance decision unit 150 decides that the space object A, which has the collision avoidance function and will intrude into a congested orbit, is the avoidance space object 69 to perform an avoidance operation in step S504.

If the space object A does not have the collision avoidance function in step S501, the avoidance decision unit 150 determines whether the space object B has the collision avoidance function in step S505.

If the space object B has the collision avoidance function in step S505, the avoidance decision unit 150 determines whether the space object B is in steady operation in a congested orbit in step S506.

If the space object B is not in steady operation in a congested orbit in step S506, the avoidance decision unit 150 decides that the space object B, which has the collision avoidance function, is the avoidance space object 69 to perform an avoidance operation in step S507.

If the space object B does not have the collision avoidance function in step S502, the process proceeds to step S506.

If the space object A will not intrude into a congested orbit in step S503, the process proceeds to step S507.

If the space object B does not have the collision avoidance function in step S505, the avoidance decision unit 150 determines whether to make a removal request to a debris removal business operator in step S509.

If a removal request is not to be made to a debris removal business operator in step S509, the avoidance decision unit 150 determines abandonment and does not decide the avoidance space object 69 in step S510.

If a removal request is to be made to a debris removal business operator in step S509, the avoidance decision unit 150 does not decide the avoidance space object 69 in step S508 because individual adjustment is required.

If the space object B is in steady operation in a congested orbit in step S506, the process proceeds to step S508.

The avoidance decision unit 150 outputs an avoidance object notification 403 to make a notification about the avoidance space object 69. Specifically, when the avoidance space object 69 is decided, the avoidance decision unit 150 outputs the avoidance object notification 403 to make a notification about the avoidance space object 69. The avoidance decision unit 150 may transmit the avoidance object notification 403 to the management business device 40 of the management business operator corresponding to the avoidance space object 69.

If the avoidance space object 69 is not decided due to a determination of individual adjustment or an unapplicable case, the avoidance decision unit 150 may output the avoidance object notification 403 including content that the avoidance space object 69 is not to be decided.

FIG. 28 is an example of a summary of the avoidance decision process according to this embodiment.

The rationale for the examples of the avoidance decision process illustrated in FIGS. 22 to 27 is to decide the appropriate avoidance space object 69 while overcoming the following possibilities.

If a collision occurs in a mega-constellation, there is a risk of chain reaction.

Areas such as the vicinity of LEO sun-synchronous LST 10:30 or the polar regions are congested regions congested with a large number of satellites of multiple business operators, and if a collision occurs, there is a risk of chain reaction.

High-precision orbit information of mega-constellations are held by mega-constellation business operators and is not always disclosed as forecast values.

For a rocket launch business operator and a business operator that performs orbital transfer of a geostationary satellite from the perigee in a geostationary transfer orbit (GTO) to a geostationary orbit have a risk of collision with a mega-constellation, but the timing to pass through a dangerous region cannot always be selected arbitrarily.

If multiple business operators in a congested orbit take avoidance actions without coordination, there is a risk of collision in places reached as a result of avoidance.

There is a possibility that satellites without any collision avoidance action function may be included in a congested orbit.

<Machine Learning Process>

A machine learning process will now be described, by which the machine learning unit 160 updates an algorithm of the avoidance decision unit 150 by machine learning using decision results of the avoidance decision unit 150.

A specific example of the machine learning process by the machine learning unit 160 is as described below.

If the results of the M1 process to the M4 process are the same, the machine learning unit 160 confirms the algorithm as fixed. If the processing results of the M1 process to the M4 process are contradictory, the machine learning unit 160 makes individual adjustment.

FIG. 29 is an example of input information in the machine learning process according to this embodiment.

The machine learning unit 160 performs AI machine learning to make it a judgment process to be added when modifying the flowchart in the future according to the content of individual adjustment that will occur in the future, judgment processes, and judgment results, and performs processes such as optimizing the execution order of the M1 process to the M4 process, adding new judgment criteria, and optimizing the flow of the flowchart.

<Avoidance Action Process by the Satellite Constellation Forming System>

The satellite constellation forming system 600 when the avoidance object notification 403 output from the collision avoidance assistance device 100a is acquired will now be described.

The satellite constellation forming system 600 forms a mega-constellation, for example. The satellite constellation forming system 600 carries out an avoidance action for the avoidance space object 69 if the avoidance space object 69 is a satellite included in the mega-constellation, based on the avoidance object notification 403 output from the collision avoidance assistance device 100*a*.

Specifically, the satellite constellation forming unit illustrated in FIGS. 5, 7, and 8 generates an orbit control command 55 for the satellite notified as the avoidance space object 69 to carry out an avoidance action. Then, the satellite constellation forming unit transmits the orbit control command 55 to the satellite.

An example of an algorithm in a case in which a collision alert or a proximity alert is issued to a mega-constellation will be presented below. For example, this is the algorithm of the satellite constellation forming unit that generates an orbit control command.

The following information is set as input conditions.
Presence or absence of passage through the orbital altitude at which the constellation is in operation
Incidence angle with respect to this orbital altitude
Information on the collision opponent or proximity opponent By setting the above information as the input conditions, whether or not an avoidance action should be taken and the subject that should take the avoidance action are output as judgment results based on the following judgment criteria.

The judgement rationale for individual judgment matters is as described below.
It is foreseen that a huge number of alerts will be issued in the mega-constellation, and it is difficult to take avoidance actions for all alerts.
If some of the satellites constituting the mega-constellation take avoidance actions, there is a risk of collision with other satellites.
It is necessary to judge whether or not an avoidance action is to be taken by comparing the risk when the avoidance action is taken with the risk when the avoidance action is not taken.
If only the mega-constellation business operator has high-precision orbit information forecast values and kept them private, a highly precise collision prediction analysis can be performed only by the mega-constellation business operator.
It is necessary to share information about results of risk analysis by the mega-constellation business operator and the policy as to whether or not an avoidance action is to be taken with the stakeholder on the collision opponent side.
There is a possibility of overturning the primary judgment result obtained by the algorithm and making an alternative proposal.

Figure 48:
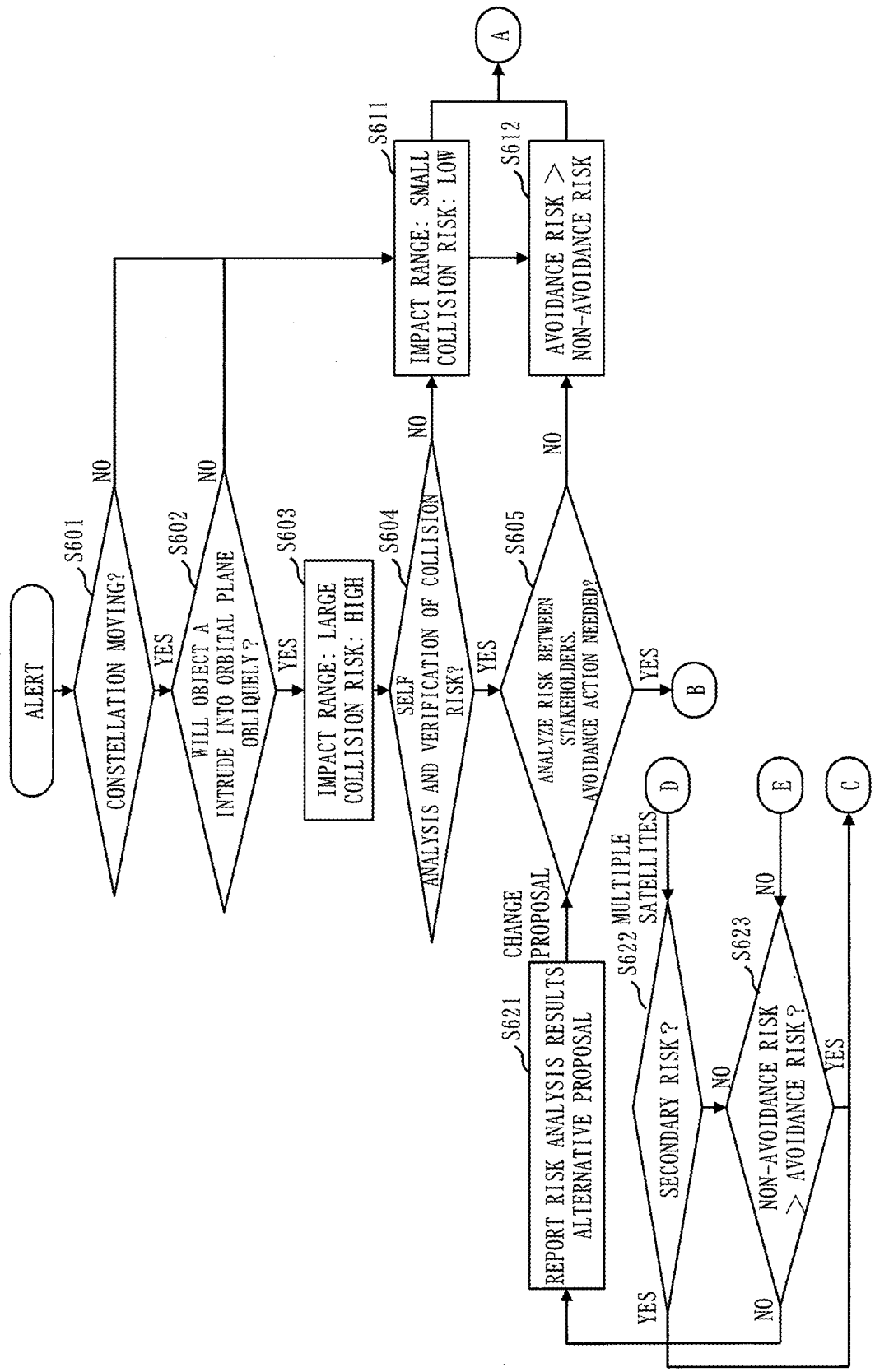
FIG. 48 is a flowchart illustrating a process of updating a collision avoidance algorithm by machine learning effects according to Embodiment 2.
Figure 49:
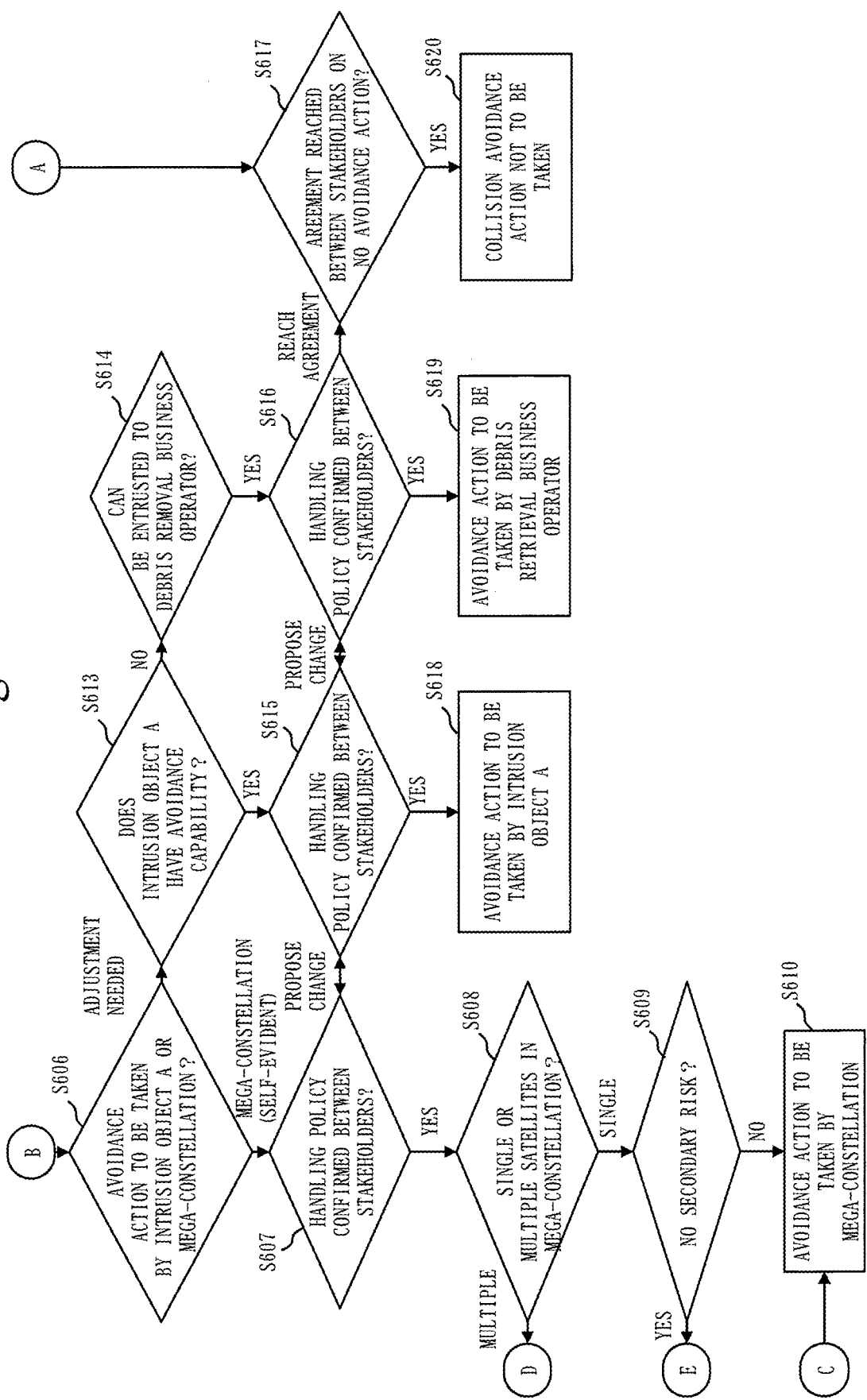
FIG. 49 is a flowchart of a process of updating the collision avoidance algorithm by machine learning effects according to Embodiment 2.

FIGS. 48 and 49 are a flowchart indicating a process of updating a collision avoidance algorithm by machine learning effects according to this embodiment.

The collision avoidance assistance device 100*a* updates the collision avoidance algorithm by machine learning effects.

Until the process is established, it will be necessary to reconcile opinions between the stakeholders, so that the algorithm implemented in a computer will be a part of this. Machine learning is performed to obtain a judgment process to be added when modifying the flowchart in the future according to the content of reconciliation about the handling policy between the stakeholders, judgment processes, and judgment results in the future. By machine learning, the execution order of the M1 process to the M4 process is optimized, new judgment criteria are added, and the flow of the flowchart is optimized.

In a situation where the number of collision alerts issued daily is too large to handle every alert, the mega-constellation business operator may conclude that "even if there is a risk of collision, no avoidance action will be taken". The collision opponent may insist indomitably that the mega-constellation business operator should take an avoidance action. In this case, it is highly likely that opinions are reconciled through discussion so as to draw a conclusion on a per case basis. As a result of accumulation of a large number of results of reconciliation between such contradictory opinions, a new pattern may emerge in the judgment process leading to a conclusion. By learning new patterns of the judgment process like this by machine learning, modifications or additions can be made to the flow of the process.

In this embodiment, the collision avoidance assistance program that realizes the functions such as the following has been described.

The collision avoidance assistance program causes a computer to execute a danger alert output process of identifying existence of danger-anticipated objects based on orbit forecast information before a collision occurs between space objects among a plurality of space objects and outputting a danger alert. The danger alert output process outputs the danger alert to an insurance business operator of a space insurance program that makes an insurance payment from a pre-collected insurance premium when a collision has occurred between the space object A and the space object B among the plurality of space objects and a space object management business operator that manages at least one of the plurality of space objects.

The collision avoidance assistance device includes the space information recorder including orbit forecast information.

The danger alert output process determines whether danger-anticipated objects exist based on the orbit forecast information included in the space information recorder, and when it is determined that danger-anticipated objects exist, outputs a danger alert.

The collision avoidance assistance program causes a computer to execute an avoidance space object decision process of deciding an avoidance space object when a danger alert is output. The avoidance space object decision process decides the space object to perform an avoidance operation out of space objects included in the danger-anticipated objects, based on the orbit forecast information included in the space information recorder.

Description of Effects of this Embodiment

The collision avoidance assistance device according to this embodiment can present the basis and result of identification of a space object that should take an avoidance action to the jurisdiction holder of each of a plurality of space objects that are danger-anticipated objects, and request and assist the avoidance action. Therefore, the collision avoidance assistance device according to this embodiment has the effect of being able to appropriately avoid a collision between space objects.
\*\*\*Other Configurations\*\*\*

Modification Examples

The collision avoidance system acquires space object information from a space information recorder that records space object information acquired from a management business device used by a management business operator that manages a plurality of space objects, and assists avoidance of a collision between space objects among the plurality of space objects.

The collision avoidance system according to this embodiment may include a database to store the space object information acquired by the space information recorder and a server including avoidance business operator deciding means to decide a collision avoidance business operator to execute collision avoidance. The server realizes the following phases (referred to also as means or units) by processing circuitry such as a processor or an electronic circuit.

Specifically, the database may be a memory, an auxiliary storage device, or a file server. Specifically, the server is the collision avoidance assistance device. A specific example of the avoidance business operator deciding means is the avoidance decision unit. The database may be provided in the server, or may be a device separate from the server.

The server includes the following phases.
A phase of being notified by the space information recorder that a collision between a space object A and a space object B included in the plurality of space objects is foreseen.
A phase of acquiring an estimated time or time period of the foreseen collision, orbit forecast information of the space object A, and orbit forecast information of the space object B from the space information recorder.
A phase of notifying a danger alert, which is a collision alert or a proximity alert for the estimated time or time period, to all or at least one of a business operator of the space object A, a business operator of the space object B, and a debris removal business operator.
A phase of selecting a collision avoidance business operator.
A phase of requesting the selected collision avoidance business operator to take a collision avoidance action.

The space object information includes information indicating presence or absence of the collision avoidance function in each space object.

When one of the space object A and the space object B has the collision avoidance function, the avoidance business operator deciding means selects the management business operator that manages the space object with the collision avoidance function as the collision avoidance business operator.

When both the space object A and the space object B have the collision avoidance function, the avoidance business operator deciding means selects the collision avoidance business operator, using whether the space object is a steady operation object or a non-steady space object as an evaluation criterion.

When both the space object A and the space object B have the collision avoidance function, the avoidance business operator deciding means selects the collision avoidance business operator, using whether or not the space object is a mega-constellation satellite as an evaluation criterion for selection.

When both the space object A and the space object B do not have the collision avoidance function, the avoidance business operator deciding means selects the debris removal business operator as the collision avoidance business operator.

The space object information includes a history of past space collision accidents.

The avoidance business operator deciding means adds evaluation criteria used to decide the collision avoidance business operator in the past space collision accidents to the evaluation criteria for selection, and selects a collision avoidance business operator.

The space information recorder includes orbit forecast information and orbit record information indicating flight record values of space objects.

The server includes a phase of notifying a danger alert, which is a collision alert or a proximity alert, to a space insurance business operator that applies an insurance payment system that assesses accident liability and an insurance payment according to a difference between the orbit forecast information and the orbit record information.

This has the effect of encouraging stakeholders to make efforts to reduce accident liability and thus being able to avoid a collision.

The database acquires, from the space information recorder, a launch scheduled time and launch forecast information of a space object C acquired by the space information recorder from a rocket launch business operator.

The server includes the following phases.
A phase of notifying the launch forecast information in the launch scheduled time information to a mega-constellation business operator that manages a mega-constellation satellite with a risk of colliding with the space object C. •A phase of requesting the mega-constellation business operator to take a collision avoidance action or provide information necessary for collision avoidance in the rocket launch by the avoidance business operator deciding means.
A phase of notifying the space object information of the mega-constellation satellite with the risk of colliding with the space object C to the rocket launch business operator.

The database acquires, from the space information recorder, an orbital transfer scheduled time and transfer forecast information of a space object D acquired by the space information recorder from an orbital transfer satellite business operator.

The server includes the following phases.
A phase of notifying transfer forecast information as of the orbital transfer scheduled time to a mega-constellation business operator that manages a mega-constellation satellite with a risk of collision with the space object D.
A phase of requesting the mega-constellation business operator to take a collision avoidance action or provide information necessary for collision avoidance in orbital transfer by the avoidance business operator deciding means.
A phase of notifying space object information of the mega-constellation satellite with the risk of collision with the space object D to the orbital transfer satellite business operator.

The database acquires, from the space information recorder, a deorbit scheduled time and deorbit forecast information of a space object E acquired by the space information recorder from a satellite business operator to perform deorbit or a debris retrieval business operator.

The server includes the following phases.
A phase of notifying the deorbit forecast information as of the deorbit scheduled time to a mega-constellation business operator that manages a mega-constellation satellite with a risk of collision with the space object E.
A phase of requesting the mega-constellation business operator to take a collision avoidance action or provide information necessary for collision avoidance in the deorbit by the avoidance business operator deciding means.

A phase of notifying space object information of the mega-constellation satellite with the risk of collision with the space object E to the satellite business operator to perform the deorbit or the debris retrieval business operator.

The server includes a phase of notifying launch forecast information to a space insurance business operator that operates an insurance payment system that allows a contract to be made when a collision risk in a rocket launch is foreseen.

The server includes a phase of notifying transfer forecast information to a space insurance business operator that operates an insurance payment system that allows a contract to be made when a collision risk during orbital transfer is foreseen.

The server includes a phase of notifying deorbit forecast information to a space insurance business operator that operates an insurance payment system that allows a contract to be made when a collision risk during deorbit of a space object is foreseen.

This has the effect of encouraging stakeholders to make efforts to reduce accident liability and thus being able to avoid a collision.

The server includes a phase of providing the launch time information that allows flight safety in a rocket launch to be secured.

The server includes a phase of providing the transfer time information that allows flight safety in orbital transfer to be secured.

The server includes a phase of providing the deorbit time information that allows flight safety in deorbit to be secured.

Embodiment 3

In this embodiment, differences from Embodiments 1 and 2 will be mainly described. Components that are substantially the same as those in Embodiments 1 and 2 are denoted by the same reference signs and description thereof may be omitted.

Figure 30:
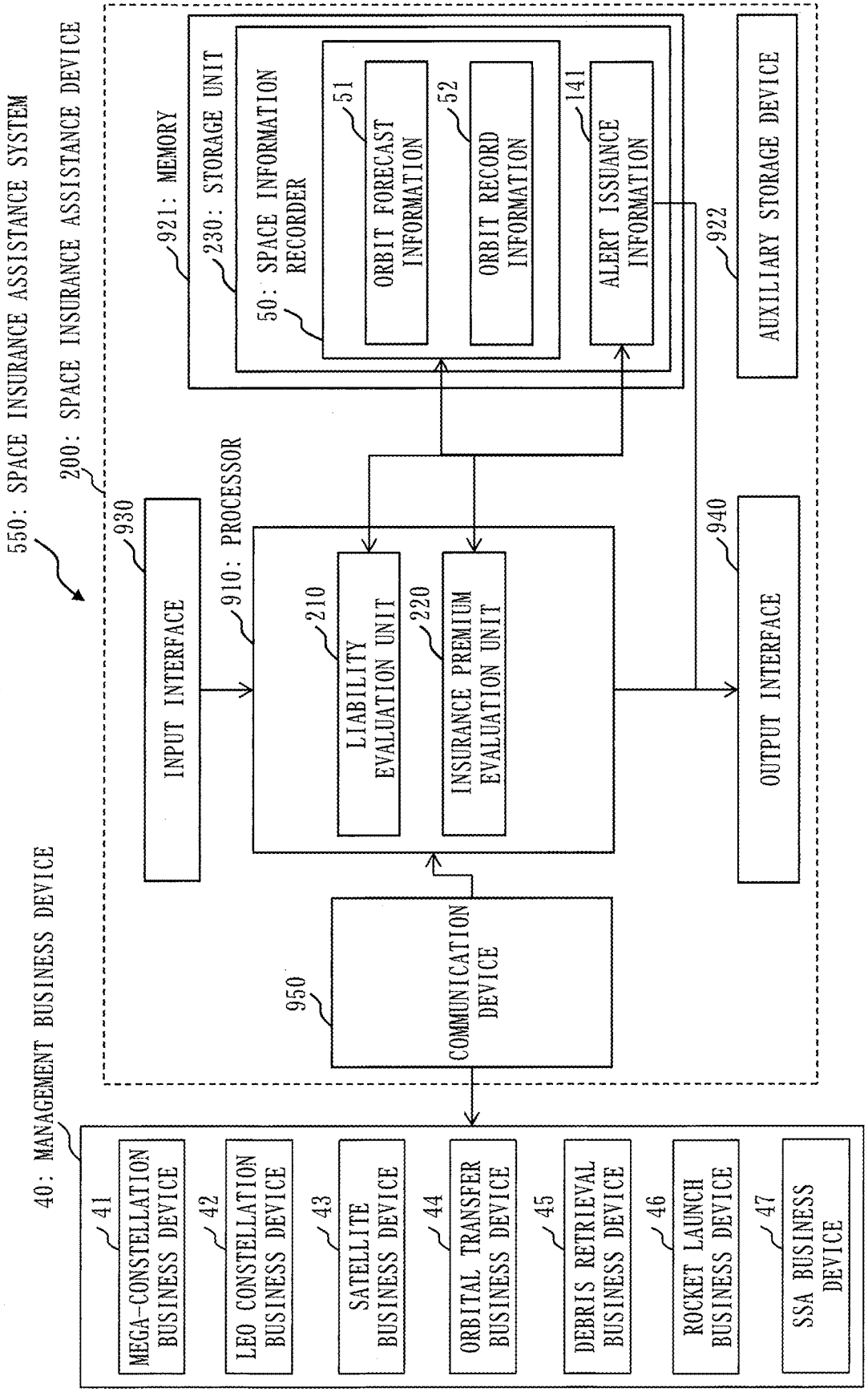
FIG. 30 is a configuration diagram of a space insurance assistance system and a space insurance assistance device according to Embodiment 3.

In this embodiment, a space insurance assistance system 550 and a space insurance assistance device 200 that assist operation of space insurance that compensates for damage caused by a collision between space objects among a plurality of space objects flying in space will be described.
*Description of Configuration*
FIG. 30 is a configuration diagram of the space insurance assistance system 550 and the space insurance assistance device 200 according to this embodiment.

The space insurance assistance device 200 includes, as functional elements, a liability evaluation unit 210, an insurance premium evaluation unit 220, and a storage unit 230. In the storage unit 230, the space information recorder 50 and the alert issuance information 141 are stored.

The functions of the liability evaluation unit 210 and the insurance premium evaluation unit 220 are realized by software. The storage unit 230 is provided in the memory 921. Alternatively, the storage unit 230 may be provided in the auxiliary storage device 922. Alternatively, the storage unit 230 may be divided and stored in the memory 921 and the auxiliary storage device 922.

Figure 31:
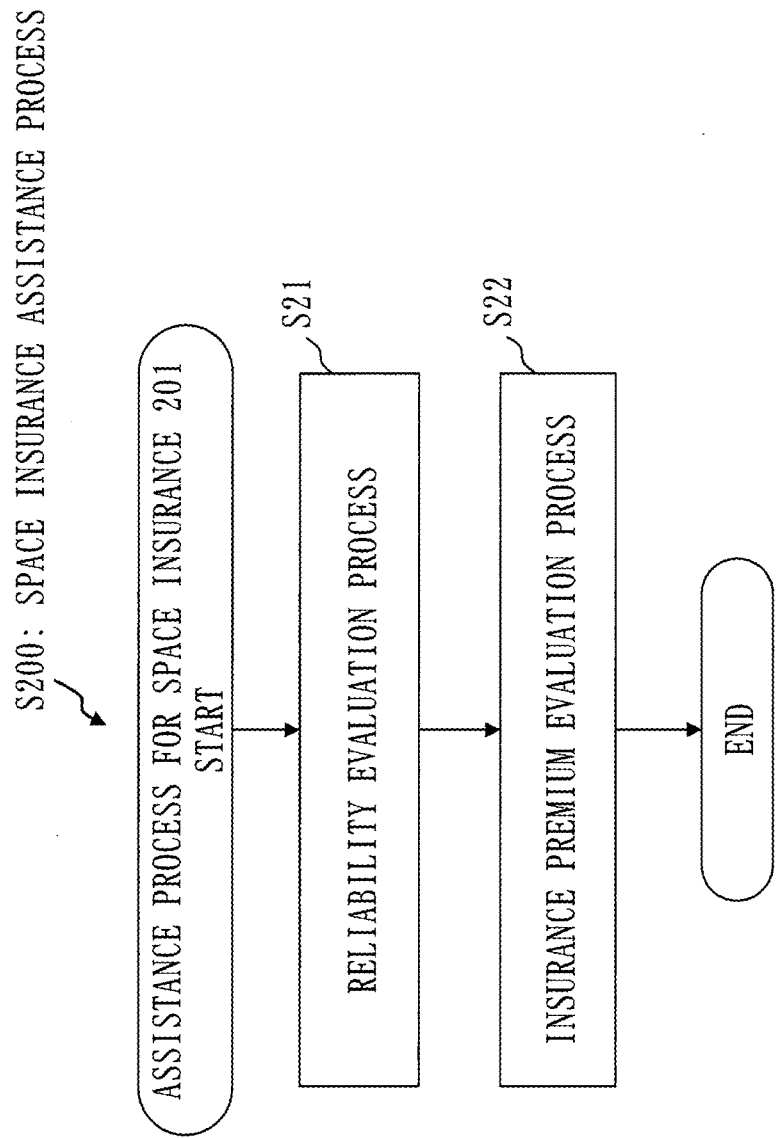
FIG. 31 is a flowchart of a space insurance assistance process by the space insurance assistance device according to Embodiment 3.

The hardware configuration of the space insurance assistance device 200 is substantially the same as that of the collision avoidance assistance device 100 in Embodiment 1. A space insurance assistance program according to this embodiment is a program that realizes the functions of the liability evaluation unit 210 and the insurance premium evaluation unit 220. That is, the space insurance assistance program according to this embodiment causes a computer to execute a liability evaluation process and an insurance premium evaluation process.
*Description of Operation*
Referring to FIG. 31, a space insurance assistance process by the space insurance assistance device 200 according to this embodiment will be described.
<Space Insurance Assistance Process: S200>
In step S21, the liability evaluation unit 210 evaluates accident liability and liability for damages when a collision has occurred between danger-anticipated objects 65 without issuance of a danger alert 25 to be generated based on the orbit forecast information 51. The liability evaluation unit 210 evaluates accident liability and liability for damages based on orbit forecast values in each of the danger-anticipated objects 65 and orbit record values in each of the danger-anticipated objects 65.

Specifically, the liability evaluation unit 210 evaluates accident liability and liability for damages for each management business operator that owns each space object of the danger-anticipated objects 65. The liability evaluation unit 210 evaluates accident liability and liability for damages based on the space information recorder 50 including the orbit forecast information 51 and the orbit record information 52 in which orbit record values are set.

In step S22, the insurance premium evaluation unit 220 evaluates an insurance premium for the management business operator that manages each of a plurality of space objects based on the forecast error 514. Specifically, the insurance premium evaluation unit 220 evaluates the insurance premium for the management business operator so that the smaller the forecast error 514, the lower the insurance premium rate.

The order of step S21 and step S22 does not matter. The order of step S21 and step S22 may be reversed, or step S21 and step S22 may be performed in parallel.

Specific examples of the space insurance assistance process will be described below.
<Space Insurance 201>
Space insurance 201 to be assisted by the space insurance assistance device 200 according to this embodiment is insurance in which liability for accident occurrence and liability for damages are judged using the orbit records of collided space objects as the basis for judgment, and insurance premiums are used for damage compensation. In particular, the space insurance 201 is insurance in which liability for accident occurrence and liability for damages are judged when a collision accident has occurred even though the forecast values of the orbit of each space object have been disclosed as the orbit forecast information 51 and it could have been possible to foresee that no collision would occur, and insurance premiums are used for damage compensation.

Figure 32:
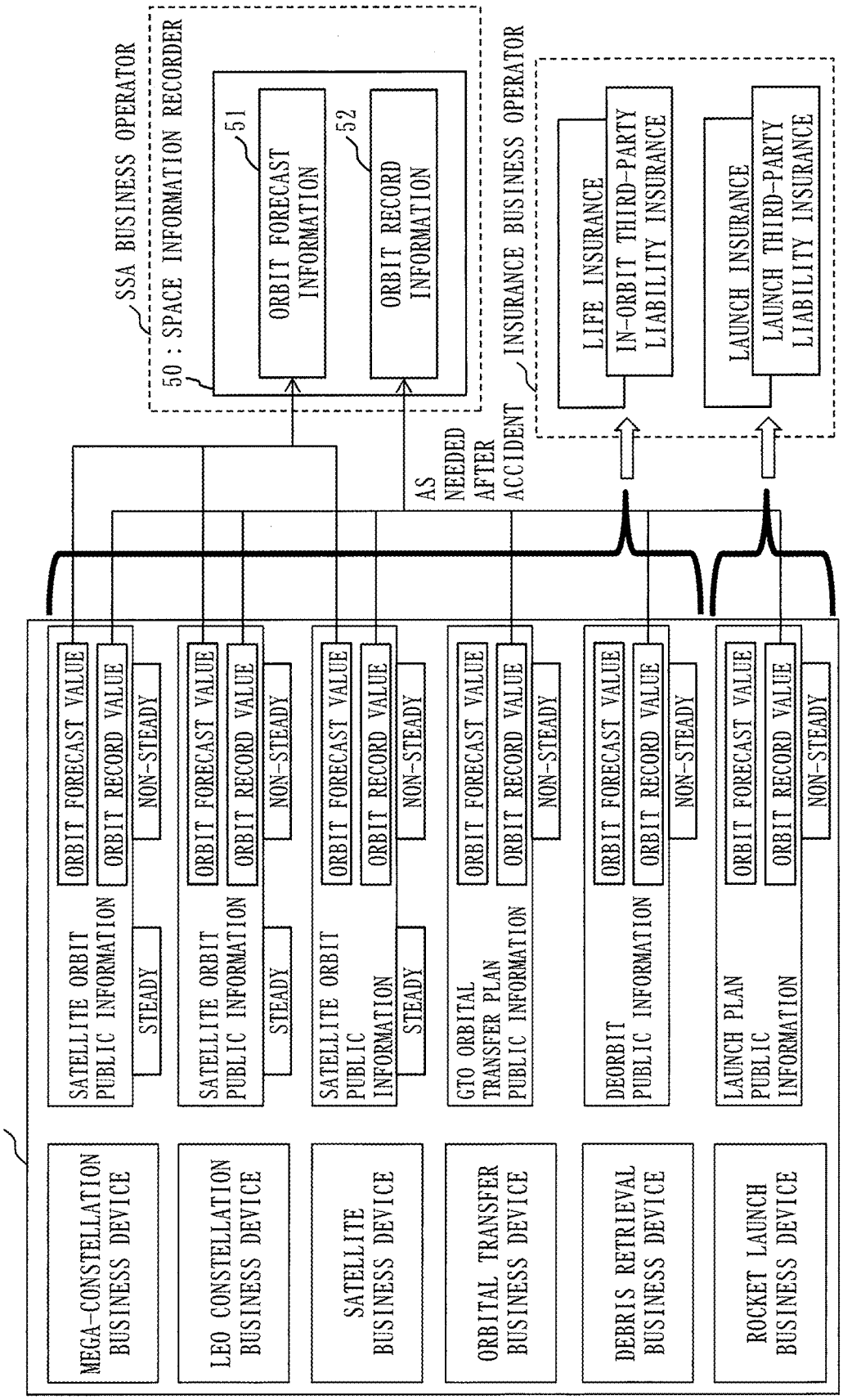
FIG. 32 is an example of information disclosure of management business operators and an example of types of space insurance corresponding to the management business operators according to Embodiment 3.

FIG. 32 is a diagram illustrating an example of information disclosure of management business operators and types of space insurance corresponding to the management business operators.

As stakeholders in businesses in outer space, the management business operators are divided broadly into satellite business operators and rocket business operators.

Mega-constellation business operators deploy satellites comprehensively in the sky. Among the mega-constellation business operators, there are business operators with plans to deploy several hundred to several thousand satellites at altitudes of 1000 km or higher or business operators with plans to deploy several satellites at orbital altitudes of about 300 km to 600 km.

There are also LEO constellation business operators that operate a plurality of Earth observation satellites in a specific orbital plane of a low Earth orbit. There are also satellite business operators that conduct commercial activities with a single satellite. Debris retrieval business operators for retrieving debris are also expected to emerge.

The space objects owed by these management business operators have risks of colliding with each other. In particular, there is a high risk of collision during non-steady operation such as an orbit insertion phase or deorbit after completion of a mission. The business operator that inserts a geostationary satellite into a geostationary orbit achieves transfer to the geostationary orbit with the propulsion device included in the satellite itself after launching the satellite with a rocket, so that there is a risk of collision with a satellite in a transient orbit in this process.

It is effective as a collision avoidance measure to mutually disclose the forecast values of the time and orbit information of each space object held by each business operator to make it possible to foresee that no collision will occur mutually. In the event of a collision by misfortune, if the evidence for deviation from the forecast value on the part of the other party that caused the collision with the object operating as originally forecast can be clarified using the orbit ephemeris record corresponding to the forecast value as the basis for judgment, it is effective in clarifying the liability for the accident and damages. As means for damage compensation in monetary terms, means of compensation out of the insurance premiums of the space insurance is effective.

<Space Information Recorder 50>

In the space insurance 201, the space information recorder 50 including the orbit forecast information 51, in which the forecast values of the time and orbit information of each space object is pubic information, and the orbit record information 52 are used as sources of evidence for application of the space insurance.

A voice recorder is installed in an aircraft for the purpose of verifying an aircraft accident. A drive recorder is installed in an automobile for the purpose of verifying an automobile accident and being used as sources of evidence.

A satellite constellation with as many as several thousand satellites formed at orbital altitudes of about 600 km or lower has a high risk of collision in a new rocket launch. Therefore, it is considered that for a similar purpose as that of the voice recorder and the drive recorder, the "space information recorder", which should also be called a satellite drive recorder, is required.

As a difference between an aircraft accident and a satellite collision, even if the aircraft accident is an explosive accident, there is a possibility that on-board equipment can be recovered after the accident, so that the voice recorder is designed to be robust enough to withstand an explosion. Since there is a pilot in the aircraft, it is arranged that not only information on instruments but also a voice record is retained by recording the voice of the pilot so as to allow verification after an accident including the presence or absence of anomalies in the instruments. In contrast to this, in the satellite collision, the on-board instruments will be scattered in outer space and it is difficult to recover them after the accident, and there is no pilot. For these reasons, a voice record is not required, and the main purpose is to record data of the on-board measurement instruments, and it is necessary to promptly transmit the acquired data to the ground or another satellite so that the data up to immediately before occurrence of a collision accident is stored in a different place.

As a difference between an automobile accident and a satellite collision, the main aim of the drive recorder of the automobile is to record the operating conditions of the automobile and the surrounding situation at the time of the accident, so as to be used for verification of where accident liability lies or to be used as sources of evidence. In the event of a frontal collision accident, if information on the location where the accident occurred is recorded, the lane in which the accident occurred can be verified, and it is easier to clarify where accident liability lies. On the other hand, it is not aimed to transmit future forecast information of the automobile itself in advance. In addition, due to existence of the concept of negligence liability of the driver, it is highly effective as sources of evidence for clarifying where liability lies and for damage compensation. In contrast to this, in the satellite collision, there is no concept equivalent to the lane and there is also no driver, so that negligence liability is not pursued and the concept of the party at fault and victim has not existed.

At present, international rules for identification of liability and liability for damages in the event of a collision accident have not been established. However, as means for avoiding collision accidents in the future, it is rational to share the orbit forecast values of space objects among the stakeholders involved in the space objects in advance, and take avoidance measures if a collision risk is foreseen. As the avoidance measures, an avoidance action taken by one of the parties involved in the foreseen collision is effective, and if the both parties are going to take avoidance actions, mutual coordination is essential. A risk of collision as a result of autonomous collision avoidance operations performed by the both parties should be avoided. It is also important to avoid a risk of collision with another satellite when a collision avoidance operation is performed.

In the event of a collision accident despite taking collision avoidance measures, it is important to identify whether or not the cause is deviation from the disclosed predicted orbit on the satellite side. Therefore, the orbit history information in the space information recorder is important as objective evidence.

Figure 33:
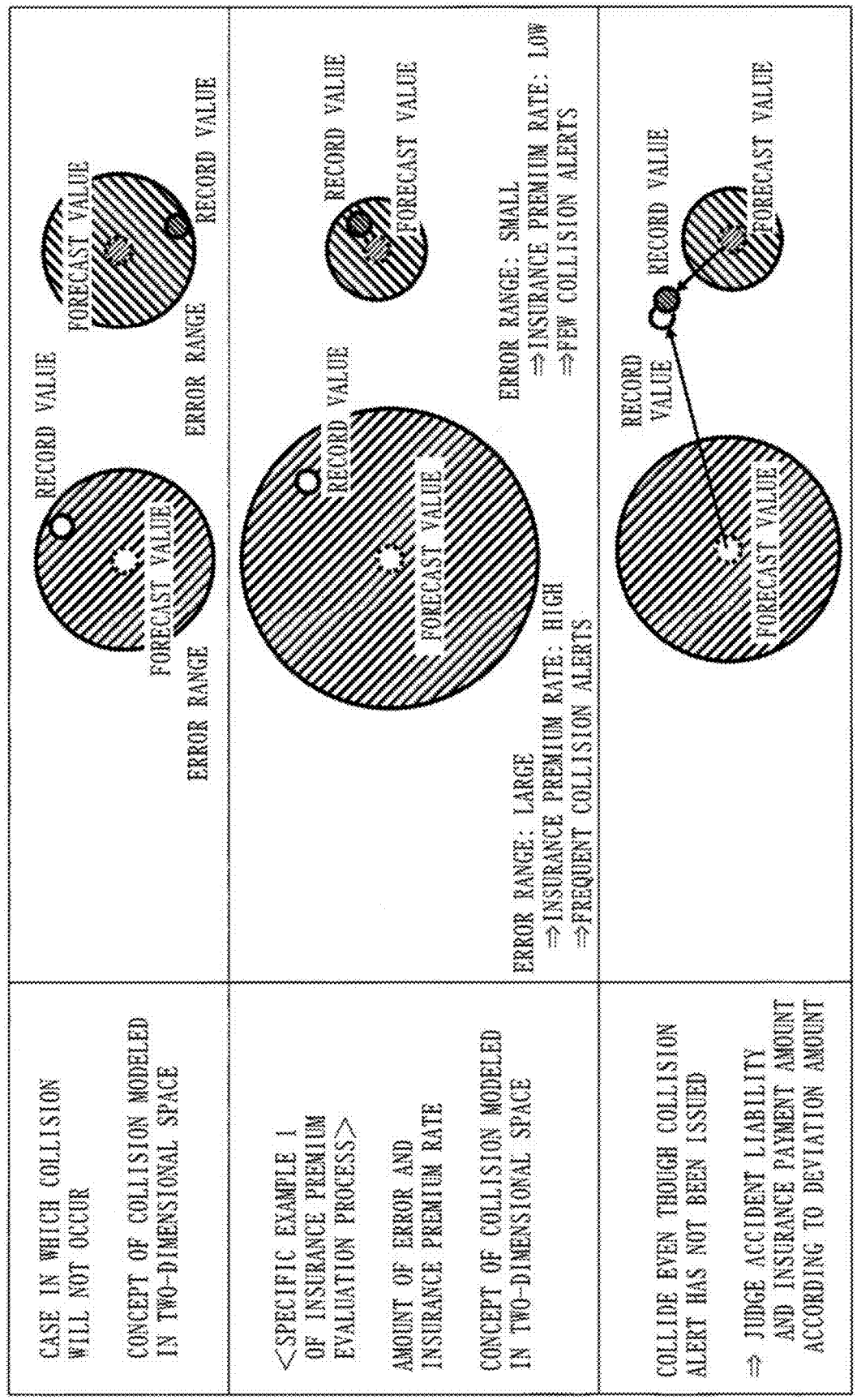
FIG. 33 is a specific example of an insurance premium evaluation process and a liability evaluation process according to Embodiment 3.
Figure 34:
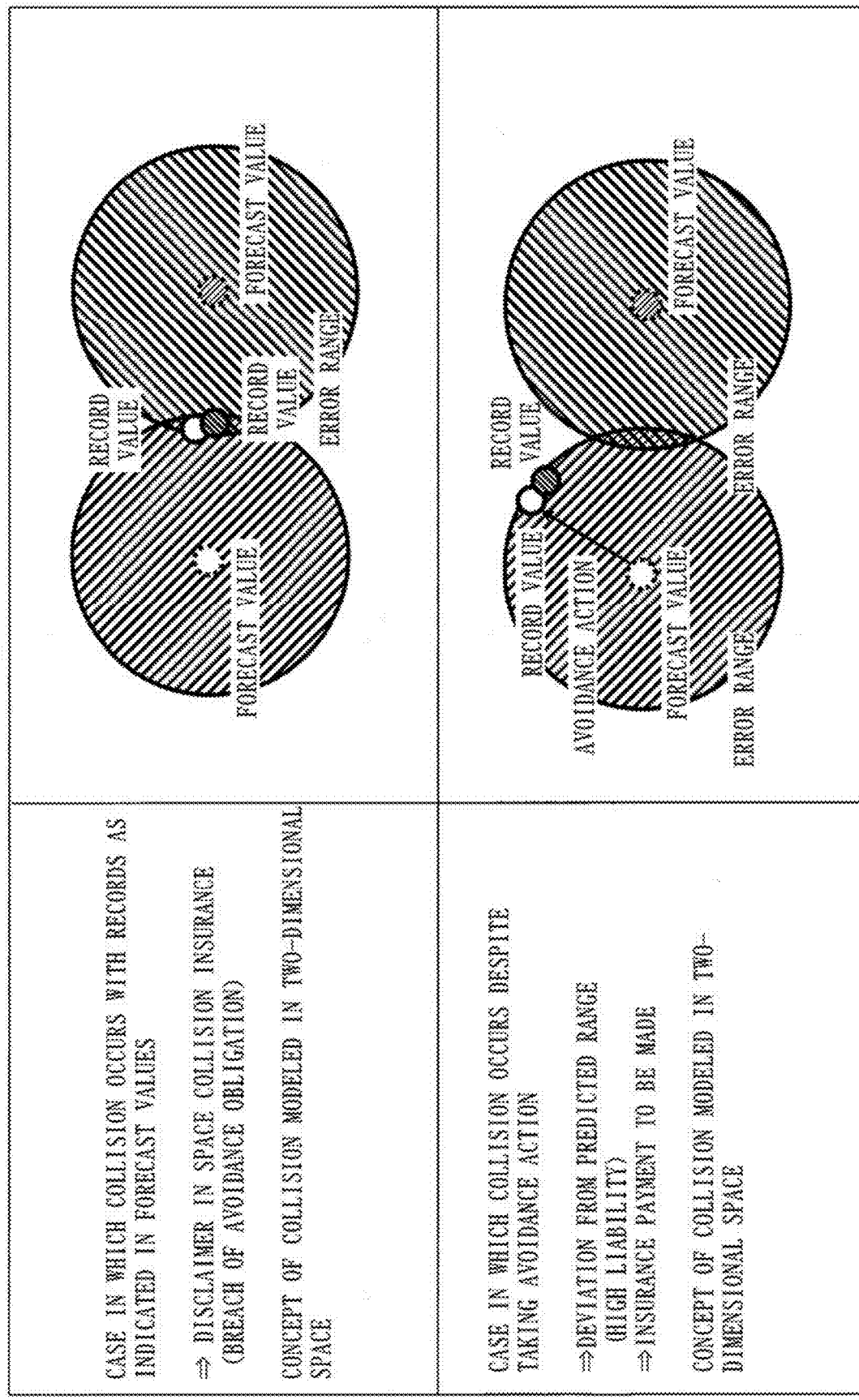
FIG. 34 is a specific example of the insurance premium evaluation process and the liability evaluation process according to Embodiment 3.

FIGS. 33 and 34 are diagrams illustrating some of specific examples of the insurance premium evaluation process and the liability evaluation process according to this embodiment.

Specific Example 1 of the Insurance Premium Evaluation Process

The insurance premium evaluation unit 220 evaluates the insurance premium for the management business operator so that the smaller the forecast error 514, the lower the insurance premium rate.

The orbit forecast values of a space object include a time error and a location estimation error. Since the satellite flies at approximately 7 km to 10 km per second, the distance associated with the time error in the satellite traveling direction becomes large. When this is expressed geometrically, a space shaped like an elliptic cone is created with the space object in the center, and this is called an error bubble. The error range 502 of FIG. 15 is an example of the error bubble.

The location estimation error has various causes such as measurement data such as reception of GPS provided in the satellite itself or positioning data from a ground-based telescope, and the amount of error also varies in many ways. Normally, the satellite business operator has highly precise forecast values and orbit ephemeris record for its own satellites. The precision of the orbit information held by the SSA business operator, which distributes measurement information from other business operators and the ground, involves large errors.

In predicting the risk of collision based on the orbit forecast values, large error bubbles with a large amount of error have a high possibility of coming into contact with each other, so that the risk of collision is high. As illustrated in the top part of FIG. 33, if the amount of error is small, the collision risk is also small. In addition, the smaller the amount of error, the smaller the difference between the orbit forecast value and the orbit ephemeris record. If the orbit ephemeris record of a business operator with a small estimated amount of error deviates from this, this case may be treated as a disclaimer of the insurance business operator.

Therefore, since the business operator with a smaller estimated amount of error has a lower risk of causing an accident, it is rational for the insurance business operator to set the insurance premium rate to a low value.

Specific Example 2 of the Insurance Premium Evaluation Process

The insurance premium evaluation unit 220 evaluates the insurance premium based on the orbit forecast information 51 and the orbit record information 52 including the orbit record values of each of the danger-anticipated objects 65 so that the smaller the difference between the orbit forecast value and the orbit record value, the lower the insurance premium rate.

The forecast error 514 is a self-reported value of each management business operator. Since the evaluation criteria vary among management business operators, other means for evaluating the objective appropriateness of the insurance premium rate is also effective. By statistically analyzing past records in terms of the difference between the forecast value and the orbit ephemeris record, the amount of error included in the forecast value can be evaluated objectively, and it is effective for ensuring fairness in setting the insurance premium rate.

Specific Example 3 of the Insurance Premium Evaluation Process

The insurance premium evaluation unit 220 evaluates an insurance payment so that the smaller the difference between the orbit forecast value and the orbit record value, the higher the insurance payment to be made.

If a collision occurs between space objects with no collision risk in the forecast values, this means that there is a difference between the forecast value and the orbit ephemeris record. However, it is reasonable to judge that the smaller this difference, the lighter the liability for the collision accident. In a case where the accident liability of the party at fault and the victim cannot be determined to be 100 to 0, and contingency cannot be ruled out although the both parties have some liability, so that an insurance payment needs to be made, it is rational to arrange that the smaller the difference between the forecast value and the orbit ephemeris record, the higher the amount of the insurance payment to be made.

Specific Example 1 of the Liability Evaluation Process

The liability evaluation unit 210 evaluates accident liability and liability for damages so that the smaller the difference between the orbit forecast value and the orbit record value, the lighter the accident liability and liability for damages in the event of a collision. That is, in the space insurance 201, the smaller the difference between the forecast value and the orbit ephemeris record in the space information recorder, the more it serves as the basis for judging lighter accident liability and liability for damages in the event of a collision accident.

It is effective as an objective criterion when it is necessary to clarify accident liability and liability for damages in a situation where international STM rules have not been established.

Specific Example 2 of the Liability Evaluation Process

The liability evaluation unit 210 evaluates accident liability and liability for damages so that an accident that has occurred even though a collision accident could have been foreseen in advance based on the orbit forecast values is treated as a disclaimer.

In foreseeing a collision accident, means of issuing a collision alert by the SSA business operator is effective in addition to the effort made by each business operator itself. A business operator that does not avoid a foreseen collision is in beach of its obligations to secure safety, so that it is rational for the insurance business operator to treat such a case as a disclaimer.

If a business operator with forecast values with a large estimated amount of error owns a large number of satellites, collision alerts will be issued frequently, and if an avoidance operation is not performed, an insurance payment will not be made even if a collision occurs. This arrangement has the effect of encouraging business operators to make efforts to improve the precision of forecast values and, consequently, has the effect of reducing collision alerts.

Specific Example 3 of the Liability Evaluation Process

The liability evaluation unit 210 evaluates accident liability and liability for damages so that in third-party liability insurance in which the insured is a rocket launch business operator that conducts a rocket launch business, only the parties involved in a collision accident are eligible for damage compensation, and higher-order damage is treated as a disclaimer.

In a mega-constellation composed of as many as several thousand satellites formed at altitudes of 600 km or lower, it can be easily assumed that the debris scattered due to a collision accident will collide with other satellites flying in the same orbital plane, at a nearby altitude, or in a nearby orbital plane. Therefore, higher-order damage associated with occurrence of a chain-reaction accident cannot be asserted as contingent. In addition, there is a risk that the total amount of damages will skyrocket, and there is validity in treating higher-order damage as a disclaimer in the launch third-party liability insurance, and the total amount of damages will be within the scale that can be expected. Thus, it is effective in securing the sustainability of the space insurance system.

A satellite constellation with a total of 2400 satellites is assumed here, in which there are 40 orbital planes at an orbital altitude of about 340 km that pass through the polar regions, and 60 satellites are placed in each orbital plane. Since all the satellites pass through the polar regions, it is necessary to perform extremely strict timing management for all the satellites to avoid collisions in a time division manner. The satellite at an altitude of 340 km orbits Earth about 15.7 times, one orbit takes about 90 minutes, the satellite velocity is about 7.7 km/sec, and the inter-satellite distance in one orbital plane is about 700 km. Thus, the waiting time after passage of a satellite in a specific orbital plane until arrival of a following satellite is about 90 seconds. The time for the satellite in each of the 40 planes to pass during this period is about 2 seconds, which is 90 seconds/40 planes. This is an extremely strict management requirement from the viewpoint of the technical level of satellite development, and there is enough possibility for an error factor to cause a collision due to an unexpected in-orbit malfunction.

The above is an example involving a polar orbit, that is, an orbital inclination of 90 degrees, and in reality, the congestion in the polar regions can be avoided by setting the orbital inclination to other than 90 degrees. However, for example, when the orbital inclination is about 50 degrees, there are many intersections between orbital planes not only at high latitudes but also at mid-latitudes, so that if passage timings are shifted at all the intersections, there is a risk of collision.

If an orbit error occurs due to a collision in the mega-constellation that requires such strict operation timing management, there is a sufficiently high possibility that a chain-reaction collision will occur. Since the debris scattered due to a collision scatter at various speeds and in various directions, it can be easily inferred that if a collision accident occurs in the region congested with several thousand satellites, higher-order damage will occur.

Specific Example 4 of the Liability Evaluation Process

The liability evaluation unit 210 evaluates accident liability and liability for damages so that higher-order damage caused by the debris scattered due to a collision is covered by life insurance or in-orbit liability insurance.

For a satellite in steady operation in an approximately circular orbit, a rocket in a rocket launch or a debris retrieval satellite that intrudes into the same orbital plane in a non-steady manner under orbital conditions with a different circumference ratio such as an elliptic orbit poses a risk of collision accident. In the event of a collision, reasonable liability is present. However, if the cause of higher-order damage due to scattered debris is a congested situation such as a mega-constellation, it is hardly rational to cover damage compensation by launch insurance or launch third-party liability insurance. Therefore, it is rational to cover the higher-order damage by life insurance or in-orbit third-party liability insurance of the satellite concerned.

<Specific Example 5 of the Liability Evaluation Process>

The liability evaluation unit 210 evaluates accident liability and liability for damages so that any party other than the party that has purchased life insurance as an individual satellite or a satellite group is treated as a disclaimer.

Since the risk of chain-reaction collision is assumed in advance in a mega-constellation, it is not rational to attribute the liability for damages for higher-order damage entirely to the initial collision.

It may also be more rational to insure a satellite group rather than insuring several thousand satellites individually.

If the mega-constellation business operator pays the insurance premium with acknowledgement of the risk of chain-reaction collision and compensates for damage with the insurance in the event of an accident, the insurance premium rate can be set depending on the accident occurrence probability, higher-order damage prediction, and the scale of the total amount of insurance premium to be paid. Therefore, this has the effect of allowing the insurance model to be built without adversely affecting the entire space insurance system.

Specific Example 6 of the Liability Evaluation Process

Figure 35:
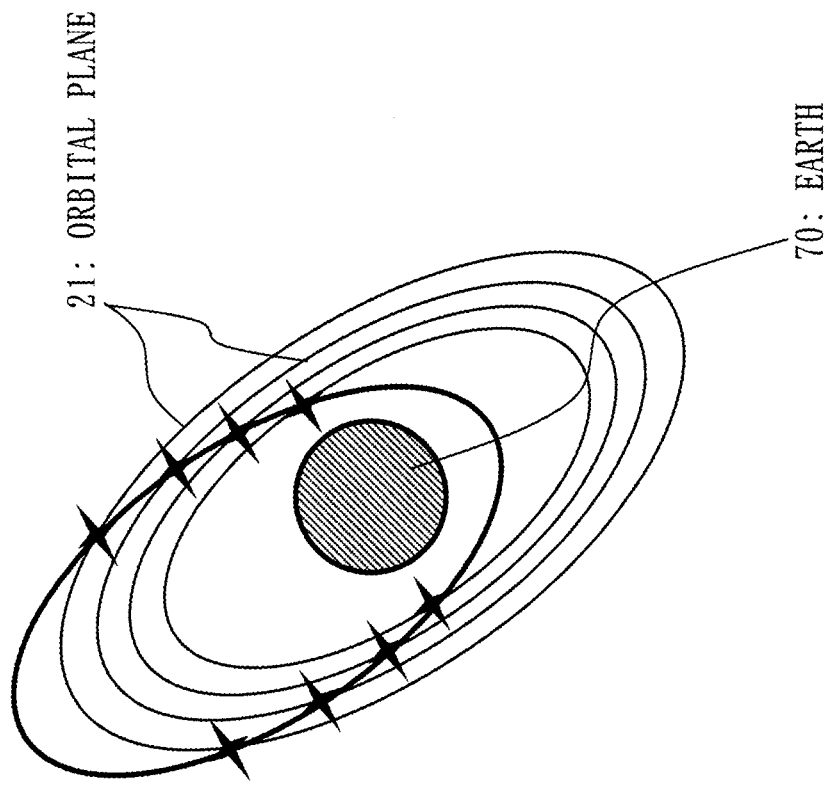
FIG. 35 is an example of a risk of collision between a space object in steady operation and a space object in non-steady operation.

FIG. 35 is a diagram illustrating a risk of collision between a space object in steady operation and a space object in non-steady operation.

If the space object in steady operation and the space object in non-steady operation collide with each other, the liability evaluation unit 210 evaluates accident liability and liability for damages so that heavier accident liability and liability for damages are attributed to the management business operator of the space object in non-steady operation.

The operation of the satellite that continues in orbit over a period of several to more than 10 years until the end of life is called steady operation. The satellite orbit in steady operation maintains constant reproducibility that relies on physical phenomena. In many cases, long-term operation is performed in an approximately circular orbit. Collisions do not occur in a satellite group in steady operation while maintaining constant phase intervals at the same altitude in the approximately circular orbit, even if several tens of satellites are flying simultaneously in the same orbital plane.

In non-steady operation such as in the transient state in orbit up to orbital insertion or in a rocket launch, intrusion is made into the same orbital plane in a non-steady manner under orbital conditions with a different circumference ratio such as an elliptic orbit, so that there is a risk of causing a collision accident. In particular, if intrusion into the orbital plane is made at a shallow relative angle, there is a risk of collision with many satellites. For this reason, the idea of setting accident liability and liability for damages heavily is rational.

Specific Example 7 of the Liability Evaluation Process

Figure 36:
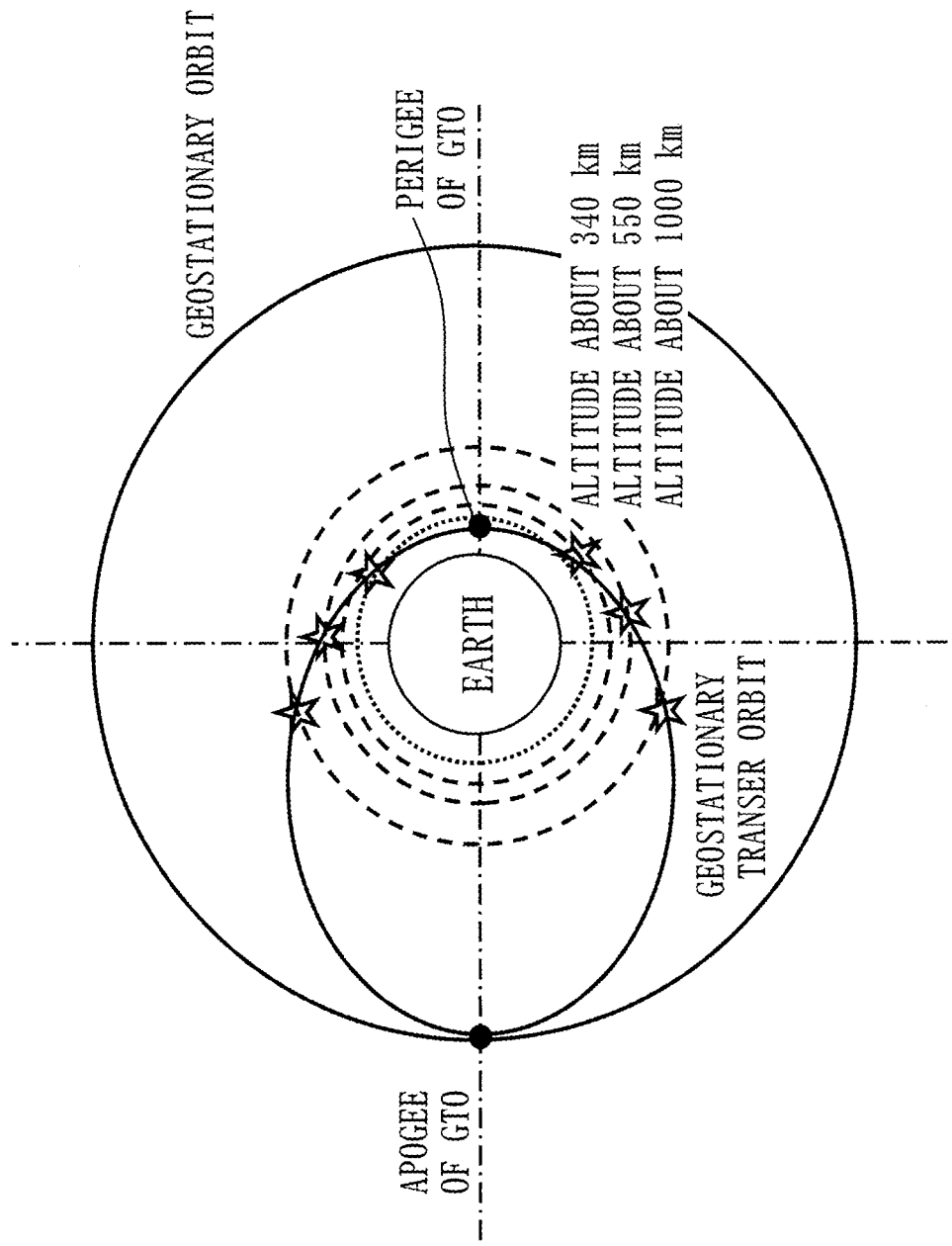
FIG. 36 is an example of a risk of collision between a satellite during orbital transfer in a geostationary orbit and a space object in steady operation.

FIG. 36 is a diagram illustrating a risk of collision between a satellite during orbital transfer in a geostationary orbit and a space object in steady operation.

If a satellite during orbital transfer in a geostationary orbit and a space object in steady operation collide with each other, the liability evaluation unit 210 evaluates accident liability and liability for damages so that heavier accident liability and liability for damages are attributed to the management business operator of the space object in steady operation.

The geostationary satellite is usually launched into a geostationary transfer orbit (GTO) with a rocket, and then orbital transfer to a geostationary orbit is achieved by operating the propulsion device included in the geostationary satellite. At this time, in the method of operating a chemical propulsion device called an apogee kick motor at the apogee, for example, the timing to operate the chemical propulsion device cannot be arbitrarily selected, so that it is difficult for the geostationary orbital insertion business operator to avoid a collision. Unlike the rocket launch business operator, it is difficult to avoid a collision by considering all information on all the satellites in the mega-constellation including uncertainty over time after launch.

It is obvious to the mega-constellation business operator that the satellite to be inserted into a geostationary orbit will make orbital transfer over the equator, and the feasibility of the autonomous collision avoidance function is being asserted widely, so that it is rational to consider collision avoidance as obligatory.

Specific Example 8 of the Liability Evaluation Process

Figure 37:
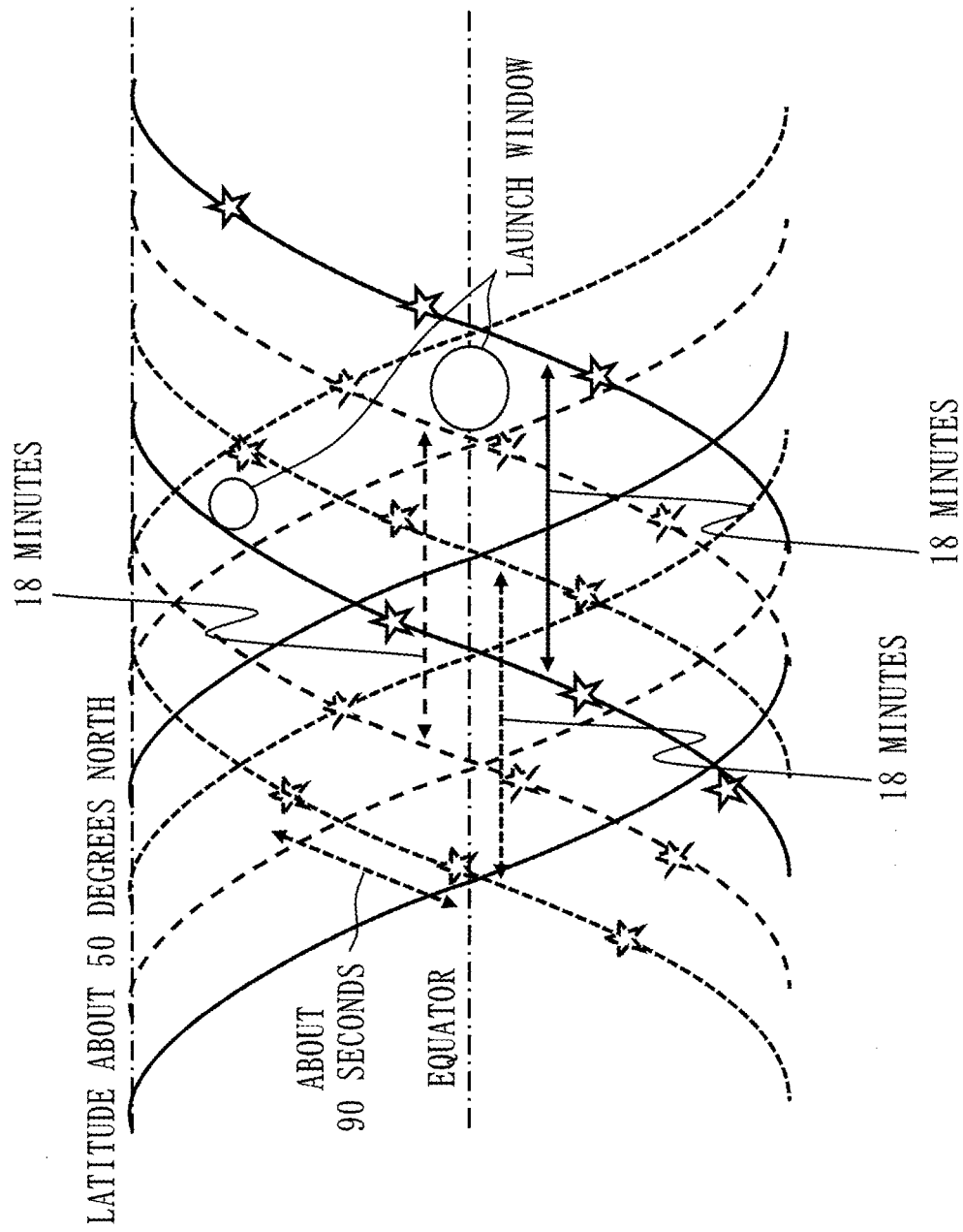
FIG. 37 is an example of a risk of collision between a launched rocket and a mega-constellation.

FIG. 37 is a diagram illustrating a risk of collision between a launched rocket and a mega-constellation.

The liability evaluation unit 210 evaluates accident liability and liability for damages so that a collision with a mega-constellation, which is a large-scale satellite constellation formed at orbital altitudes of 600 km or lower, is treated as a disclaimer.

There is a mega-constellation concept that deploys about 2500 satellites at each of three different altitudes in the vicinity of altitude 340 km, but there are many restrictions for avoiding collisions in rocket launches, which may be excessive risks for the insurance business operator.

For example, when it is assumed that about 60 satellites are placed in each orbital plane of about 40 orbital planes in the vicinity of altitude 340 km, if the inter-satellite distance in the same orbital plane is about 700 km and the satellite velocity is about 7.7 km/sec, satellites arrive one by one at time intervals of about 90 seconds. The time from passage of an adjacent orbital plane to arrival of the next orbital plane is about 18 minutes. In the case of three types of different altitudes in proximity to one another, each orbital plane gradually moves in the longitude direction without synchronization. In this situation, in the case of a rocket to be launched from Guiana near the equator, it is necessary to launch the rocket in the interval after passage of the three types of orbital planes until arrival of the next orbital plane, so that the available time is only about several minutes.

If a collision occurs in this situation, it can hardly be considered as a contingent accident, so that it is rational to treat the collision as a disclaimer.

As a result, this has the effect that it is possible to prevent an increase in the scale of insurance payments due to collision accidents in a low-Earth-orbit mega-constellation with a risk of frequent collision accidents, and the sustainability of the space insurance can be secured.

Specific Example 9 of the Liability Evaluation Process

The liability evaluation unit 210 evaluates accident liability and liability for damages so that a case in which a collision avoidance operation measure has been taken without notice in a collision accident between space objects each having the function to perform a collision avoidance operation is treated as a disclaimer.

At space stations or in geostationary orbit satellites, collision avoidance operations are often performed based on danger alerts. In low-Earth-orbit satellites, the distance between satellites is much shorter than that in a geostationary orbit, and there are also satellites without the function to perform a collision avoidance operation, such as a CubeSat. Thus, when a danger alert is issued for low Earth orbit satellites in a specific congested orbital plane, if some of the satellites perform collision avoidance operations without coordinating with nearby satellites, a risk of collision with another nearby satellite occurs.

Management business operators that declare that they have autonomous collision avoidance operation means have also emerged. If satellites of multiple business operators perform autonomous avoidance operations without coordination with nearby satellites, there is a risk of collision at different orbit locations as a result of avoidance.

Therefore, since Specific Example 9 of the liability evaluation process aims to include the countermeasures against risks in the prerequisites of the contract of the insurance business operator, a disclaimer is one of reasonable measures.

If it is not treated as a disclaimer, it is necessary to create international rules that contribute to collision avoidance operations in congested orbits.

Embodiment 4

In this embodiment, differences from Embodiments 1 to 3 will be mainly described. Components that are substantially the same as those in Embodiments 1 to 3 are denoted by the same reference signs and description thereof may be omitted.

In this embodiment, a collision insurance execution device that executes operation of space collision insurance 202 that compensates for damage caused by a collision between space objects among a plurality of space objects flying in space will be described.

With the emergence of mega-constellation business operators, the possibility of a collision accident between space objects occurring not contingently but due to a predominant incidence or a human judgment error is increasing. Although the space insurance assumes contingent accidents, there is need for insurance that covers accidents with a significantly higher risk of occurrence compared with a statistical contingent accident occurrence probability, that is, collision accidents that cannot be regarded as contingent. As there is, for example, non-refundable insurance that applies only to the flight concerned when boarding an aircraft, the space collision insurance 202 that can be purchased as non-refundable insurance after a satellite collision is foreseen is promising as a business model. The space collision insurance 202 is also referred to as space object collision insurance.

*Description of Configurations*

Figure 38:
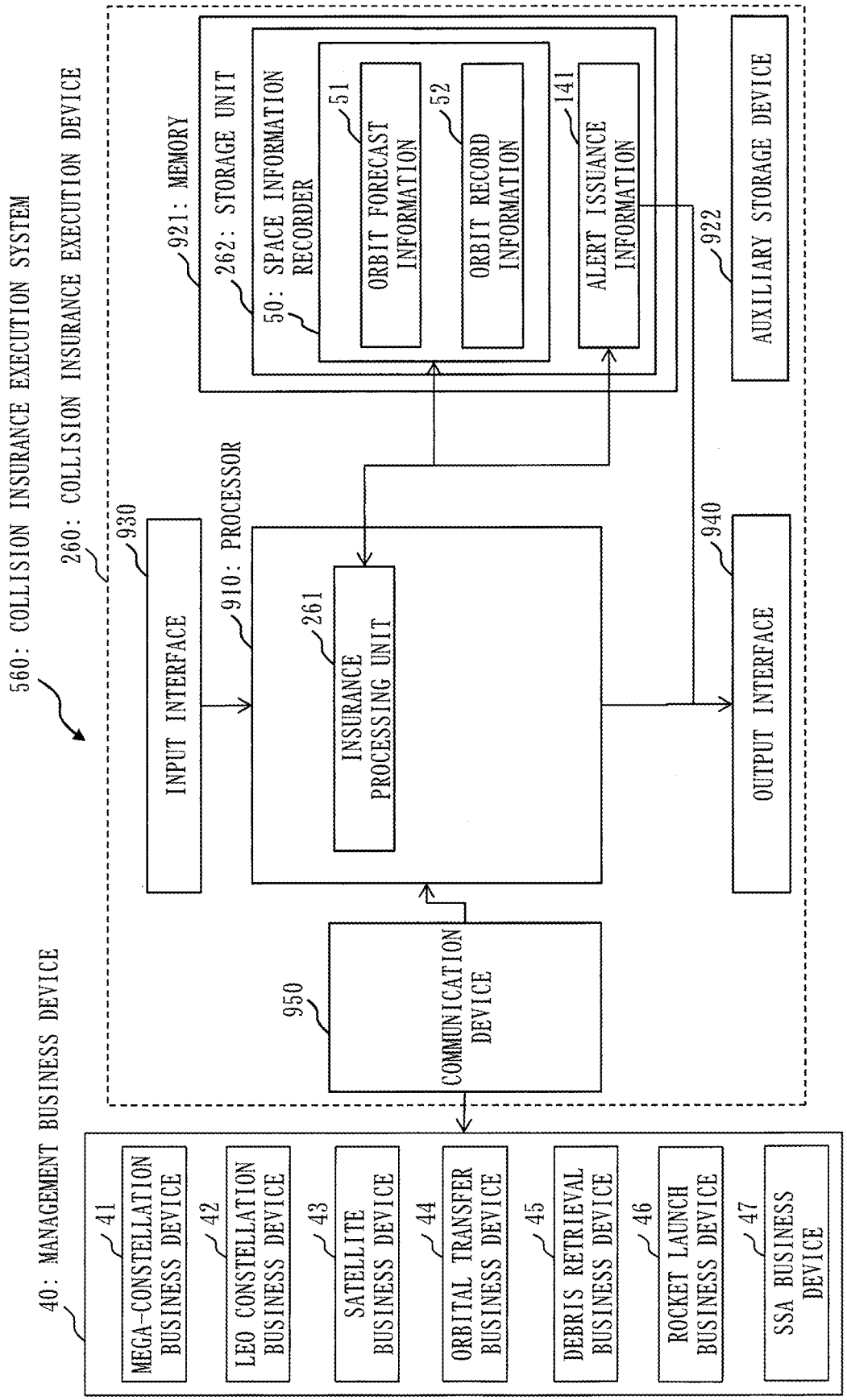
FIG. 38 is a configuration diagram of a collision insurance execution system and a collision insurance execution device according to Embodiment 4.

FIG. 38 is a configuration diagram of a collision insurance execution system 560 and a collision insurance execution device 260 according to this embodiment.

The collision insurance execution device 260 includes, as functional elements, an insurance processing unit 261 and a storage unit 262. In the storage unit 262, the space information recorder 50 and the alert issuance information 141 are stored.

The functions of the insurance processing unit 261 are realized by software. The storage unit 262 is provided in the memory 921. Alternatively, the storage unit 262 may be provided in the auxiliary storage device 922. Alternatively, the storage unit 262 may be divided and provided in the memory 921 and the auxiliary storage device 922.

The hardware configuration of the collision insurance execution device 260 is substantially the same as that of the collision avoidance assistance device 100 in Embodiment 1. A collision insurance execution program according to this embodiment is a program that realizes the functions of the insurance processing unit 261. That is, the collision insurance execution program according to this embodiment causes a computer to execute an insurance process by the insurance processing unit 261.

\*\*\*Description of Operation\*\*\*

Figure 39:
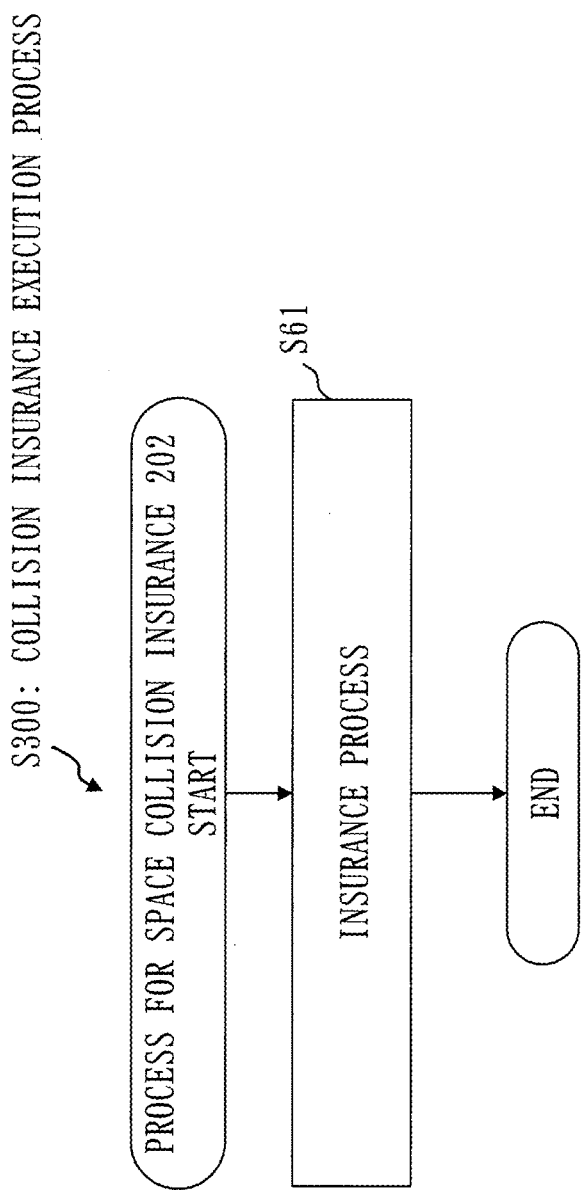
FIG. 39 is a flowchart of a collision insurance execution process by the collision insurance execution device according to Embodiment 4.

Referring to FIG. 39, a collision insurance execution process by the collision insurance execution device 260 according to this embodiment will be described.

<Collision Insurance Execution Process: S300>

In step S61, the insurance processing unit 261 executes operation of the space collision insurance 202.

The space collision insurance 202 is purchased by the management business operator that owns a space object for which a collision is foreseen based on the orbit forecast information 51. In the space collision insurance 202, an insurance payment is made when the foreseen collision accident has actually occurred, and the contract is terminated when the danger time period for which a danger alert to notify a danger of collision is issued has elapsed without any accident.

The insurance processing unit 261 executes operation of the space collision insurance that can be purchased by a management business operator after a danger alert has been issued. The insurance processing unit 261 executes operation of the space collision insurance 202 that can be purchased by a mega-constellation business operator that owns a mega-constellation, which is a large-scale satellite constellation, on a per satellite group basis, and allows the mega-constellation business operator to receive an insurance payment in the event of a collision accident. The insurance processing unit 261 executes operation of the space collision insurance 202 that covers higher-order damage associated with a chain-reaction collision caused by a foreseen collision accident. In the space collision insurance 202, the insurance premium and the insurance premium rate vary depending on the records of past similar collision accidents.

Specific examples of the space collision insurance 202 executed in the collision insurance execution process will be described below.

Specific Example 1 of the Space Collision Insurance 202

The space collision insurance 202 is space insurance that can be purchased, after a collision alert is issued, by the stakeholder that owns a space object for which a collision is foreseen based on public information of space object orbit information forecast values. In the space collision insurance 202, an insurance payment is made when the foreseen collision accident has actually occurred, and the contract is terminated when the danger time period for which the alert is issued has elapsed without any accident.

The space collision insurance 202 can be purchased, after a collision alert has been issued, by the stakeholder that owns a space object for which a collision is foreseen based on public information of space object orbit information forecast values in the launch insurance, life insurance, launch third-party liability insurance, and in-orbit third-party liability insurance described in Embodiment 3. In the space collision insurance 202, an insurance payment is made when the foreseen collision accident has actually occurred, and the contract is terminated when the danger time period for which the alert is issued has elapsed without any accident.

A danger alert such as a collision alert may be issued by the SSA business operator based on orbit forecast value public information, or may be issued separately by a business operator that conducts a business of space object collision avoidance consultancy.

The insurance payment to be made after occurrence of a collision is set based on the precise orbit ephemeris record in the "space information recorder" so that the insurance payment is high when errors in forecast values and record values are small.

If both of the parties concerned do not take any avoidance action even though a collision alert has been issued, this case is treated as a disclaimer and no insurance payment is made.

Specific Example 2 of the Space Collision Insurance 202

The space collision insurance 202 is space insurance that can be purchased on an ad hoc basis in anticipation of a collision accident even when a collision alert has not been issued. In the space collision insurance 202, an insurance payment is made when a foreseen collision accident has actually occurred, and the contract is terminated when the danger time period for which an alert is issued has elapsed without any accident.

A launched rocket, a space object during deorbit, a space object flying in an elliptic orbit during orbital transfer, and the like have a risk of collision with mega-constellation satellites flying all over the sky. However, if forecast values are not disclosed or even if they have been disclosed, the SSA business operator or an orbital analysis service business operator may not be able to issue a collision alert with appropriate timing. In this case, it is rational to be able to purchase ad-hoc insurance at the discretion of a business operator without a collision alert. The contract is terminated after passage through the danger orbit without any accident.

Specific Example 3 of the Space Collision Insurance 202

Figure 40:
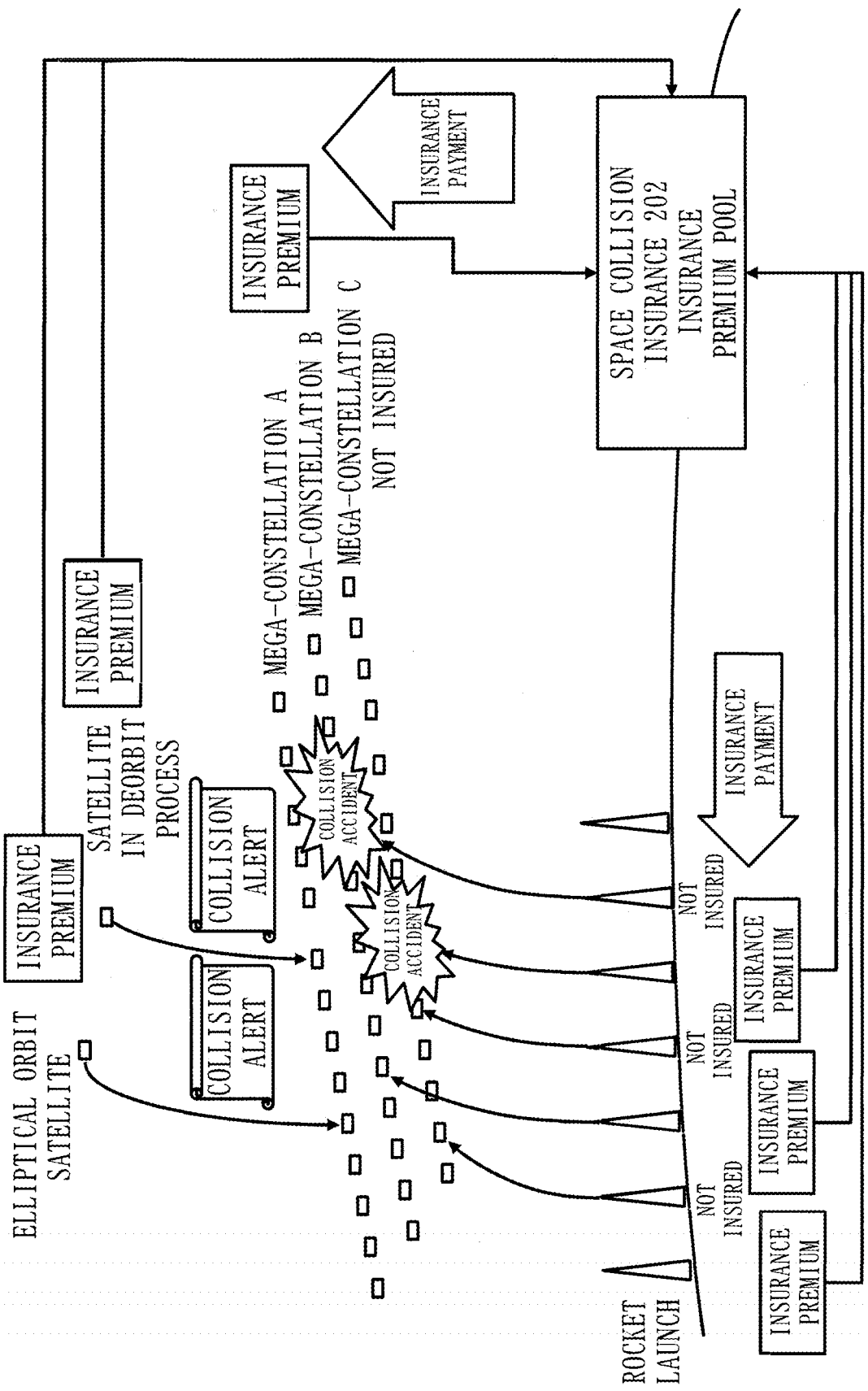
FIG. 40 is a diagram representing space collision insurance according to Embodiment 4.

FIG. 40 is a diagram representing the space collision insurance 202 according to this embodiment.

The space collision insurance 202 can be purchased by a mega-constellation business operator on a per satellite group basis, and allows the mega-constellation business operator to receive an insurance payment in the event of a collision accident resulting from a collision alert or an ad-hoc collision risk.

The mega-constellation business operator is expected to have a large number of collision risks in the future, and it is possible to choose whether to use life insurance or third-party liability insurance of the space insurance as financial resources, or use the ad-hoc space collision insurance 202 as financial resources. Since it is irrational to purchase insurance on a per satellite basis in the satellite group of several thousand satellites, it is rational to offer insurance collectively for the satellite group at specific altitudes that carries out a series of services in cooperation, and allow an insurance payment to be received individually for each constituent satellite.

When the ad-hoc space collision insurance 202 is used as financial resources, it is appropriate to terminate the contract for a rocket, a space object during deorbit, or the like after passage through the danger region. However, it is rational that there is a system that allows the mega-constellation business operator to purchase insurance collectively by including ad-hoc collision risks that occur one after another.

The insurance premium should be set depending on the scale of the satellite group, frequency of ad-hoc collision risks that are foreseen, and the contract period.

Specific Example 4 of the Space Collision Insurance 202

The space collision insurance 202 covers higher-order damage associated with a chain-reaction collision caused by an ad-hoc collision accident that has been foreseen in advance.

In the satellite group of a mega-constellation, if a single constituent satellite is destroyed explosively or loses orbit control capability due to a failure, there is a risk of chain-reaction collision with another satellite flying in the same orbital plane or another satellite flying in a nearby orbit. If many pieces of debris are scattered, there is a risk that they will spread over a long period of time and violate nearby orbital altitudes in their entirety, and there is a concern that this will bring huge damage to the mega-constellation business operator.

When these higher-order damages that are foreseen in advance are covered by the insurance, the space collision insurance 202 may be feasible if the mega-constellation business operator pays a high insurance premium.

Specific Example 5 of the Space Collision Insurance 202

The space collision insurance 202 does not cover higher-order damage associated with a chain-reaction collision caused by an ad-hoc collision accident that has been foreseen in advance.

The space collision insurance 202 covers only the collided satellite when the party concerned in a collision alert is a constellation business operator, and damage associated with a chain-reaction accident is excluded from consideration.

In the space collision insurance 202 of Specific Example 4 that covers higher-order damage, it is difficult to estimate the scale of higher-order damage, and there is a concern about a risk of soaring insurance premium rates after occurrence of an accident and a risk to the sustainability of the insurance business itself. In a situation where the mega-constellation business operator refuses to pay a sufficient insurance premium, it is rational to treat higher-order damage that can be foreseen in advance as a disclaimer to be excluded from the coverage of insurance payments.

Specific Example 6 of the Space Collision Insurance 202

In the space collision insurance 202, the insurance premium and insurance premium rate vary depending on the records of past similar collision accidents.

In the space collision insurance 202, the insurance premium and insurance premium rate vary based on information from similar space object collision accidents that have occurred in the past. The information from similar space object collision accidents that have occurred in the past includes the orbit forecast information 51 and the orbit record information 52 in the space information recorder 50, a history of damage compensation and lawsuits in the accidents, occurrence frequency of similar accidents, and results of analysis of past information on insurance payment records.

In Embodiments 1 to 4 above, each unit of the collision avoidance assistance device, the space insurance assistance device, and the collision insurance operation device is described as an independent functional block. However, the configurations of the collision avoidance assistance device, the space insurance assistance device, and the collision insurance operation device may be different from the configurations described in the above embodiments. The functional blocks of the collision avoidance assistance device, the space insurance assistance device, and the collision insurance operation device may be arranged, in any configuration, provided that the functions described in the above embodiments can be realized. Each of the collision avoidance assistance device, the space insurance assistance device, and the collision insurance operation device may be one device or a system composed of a plurality of devices.

*Other Configurations*

Modification Examples

Modification examples in Embodiments 3 and 4 will now be described.

The space insurance assistance system and the collision insurance execution system are referred to also as an insurance payment system.

The insurance payment system includes a database in which contract information for an insurance payment is recorded on a per insurance contract basis and a server in which space object information is recorded.

Specifically, the database is a memory or an auxiliary storage device. Specifically, the server is the space insurance assistance device or the collision insurance operation device. The space insurance assistance device and the collision insurance operation device may cooperatively realize the functions of the server. The server realizes phases (referred to also as means or units) described below with processing circuitry such as a processor or an electronic circuit.

A specific example of the insurance premium rate setting means is the insurance premium evaluation unit. A specific example of the insurance payment assessment means is the insurance processing unit.

The contract information includes an insurance premium rate, an accident liability assessment, and an insurance payment assessment amount.

The space object information includes orbit forecast information of each of a space object A and a space object B between which a collision accident has occurred and orbit record information of each of the space object A and the space object B in the time period during which the collision has occurred.

The server includes the following phases.
  A phase of, after occurrence of a collision accident, assessing accident liability of each of the space object A and the space object B that have collided with each other, based on a difference between record orbit information and forecast orbit information.
  A phase of assessing an insurance payment based on a difference between record orbit information and forecast orbit information.
  A phase of making an insurance payment.

The space object information includes a space object collision alert acquired from a satellite information management business operator.

The server includes the following phases.
  A phase of, after occurrence of a collision accident, assessing accident liability of each of the space object A and the space object B that have collided with each other, based on a difference between record orbit information and forecast orbit information.
  A phase of assessing an insurance payment, based on a difference between record orbit information and forecast orbit information.
  A phase of making an insurance payment.

The server includes the following phases.
  A phase of accepting a contract after a space object collision alert has been acquired.
  A phase of deciding an insurance premium rate, based on the error information of forecast orbit information recorded in the space object information.

A phase of, after occurrence of a collision accident, assessing accident liability of each of the space object A and the space object B that have collided with each other, based on a difference between record orbit information and forecast orbit information.

A phase of assessing an insurance payment based on a difference between record orbit information and forecast orbit information.

A phase of making an insurance payment.

A phase of completing the payment and terminating the contract, a phase of terminating the contract due to a disclaimer, or a phase of terminating the contract without occurrence of a collision accident alerted by the space object collision alert.

The server includes the following phases.

A phase of accepting a contract after a forecast of a rocket launch, orbital transfer of a satellite, or passage of a satellite during deorbit has been acquired.

A phase of deciding an insurance premium rate, based on the error information of forecast orbit information recorded in the space object information.

A phase of, after occurrence of a collision accident, assessing accident liability of each of the space object A and the space object B that have collided with each other, based on a difference between record orbit information and forecast orbit information.

A phase of assessing an insurance payment, based on a difference between record orbit information and forecast orbit information.

A phase of making an insurance payment.

A phase of completing the payment and terminating the contract, a phase of terminating the contract due to a disclaimer, or a phase of terminating the contract without occurrence of a collision accident alerted by the space object collision alert.

In the insurance payment system, in the phase of, after occurrence of a collision accident, assessing accident liability of the space object A and the space object B that have collided with each other, based on a difference between record orbit information and forecast orbit information, it is arranged that the larger the difference between the record orbit information and the forecast orbit information, the heavier the assessment of accident liability.

In the insurance payment system, in the phase of, after occurrence of a collision accident, assessing an insurance payment for the space object A and the space object B that have collided with each other, based on a difference between record orbit information and forecast orbit information, it is arranged that the smaller the difference between the record orbit information and the forecast orbit information, the higher the assessment of the insurance payment.

In the insurance payment system, in the phase of deciding an insurance premium rate based on the error information of forecast orbit information recorded in the space object information, it is arranged that the smaller the estimated amount of error, the lower the insurance premium rate.

The insurance payment system treats the following collision accident as a disclaimer: a collision has occurred without any collision avoidance action by both the management business operator of the space object A and the management business operator of the space object B, even though a space object collision alert acquired from a satellite information management business operator and orbit forecast information of each of the space object A and the space object B, between which a collision had been foreseen, had been acquired.

In the insurance payment system, the contract information includes information stating that only a collision accident of space objects identified by a space object collision alert acquired from a satellite information management business operator is included in the insurance payment coverage, and higher-order damage due to a chain-reaction accident is treated as a disclaimer.

In the insurance payment system, the contract information includes information stating that in addition to a collision accident of space objects identified by a space object collision alert acquired from a satellite information management business operator, damage compensation for higher-order damage caused by a chain-reaction accident is included in the insurance payment coverage.

In the insurance payment system, in the phase of, after occurrence of a collision accident, assessing an insurance payment for each of the space object A and the space object B that have collided with each other, based on a difference between record orbit information and forecast orbit information, damage compensation for higher-order damage caused by a chain-reaction accident is included in the coverage of insurance payment assessment.

In the insurance payment system, the contract information includes information stating that higher-order damage caused by debris scattered due to a collision in a rocket launch, a collision of a debris removal satellite, or the like is treated as a disclaimer.

In the insurance payment system, the contract information includes information stating that a case in which the party involved in a collision between space objects is a mega-constellation business operator and has not paid an insurance premium as a satellite group is treated as a disclaimer.

In the insurance payment system, in the phase of, after occurrence of a collision accident between a space object in steady operation and a space object in non-steady operation, assessing accident liability of each of the space object A and the space object B that have collided with each other, based on a difference between record orbit information and forecast orbit information, heavier accident liability is assessed for the party in non-steady operation.

In the insurance payment system, in the phase of, after occurrence of a collision accident between a space object in steady operation and a space object in non-steady operation, assessing an insurance payment for each of the space object A and the space object B that have collided with each other, based on a difference between record orbit information and forecast orbit information, a higher insurance payment is assessed for the party in steady operation.

In the insurance payment system, in the phase of, after occurrence of a collision accident between a satellite during orbital transfer and a space object in steady operation, assessing accident liability of each of the space object A and the space object B that have collided with each other, based on a difference between record orbit information and forecast orbit information, lighter accident liability is assessed for the satellite during orbital transfer.

In the insurance payment system, in the phase of, after occurrence of a collision accident between a satellite during orbital transfer and a space object in steady operation, assessing an insurance payment for each of the space object A and the space object B that have collided with each other, based on a difference between record orbit information and forecast orbit information, a higher insurance payment is assessed for the party in steady operation.

In the insurance payment system, the contract information includes information stating that a collision with a mega-constellation business operator formed at altitudes of 600 km or lower is treated as a disclaimer.

In the insurance payment system, the contract information includes information stating that a case in which in a collision accident between space objects each with the function to perform a collision avoidance operation, a collision avoidance operation measure had been taken without notice is treated as a disclaimer.

In the insurance payment system, a mega-constellation business operator can purchase insurance on a per satellite group basis, and can receive an insurance payment in the event of a collision accident associated with a collision alert or an ad-hoc collision risk.

In the insurance payment system, the error information included in the orbit forecast information includes a basis for calculating the amount of error, and the insurance premium rate is set to a lower value as the basis is clearer.

In the insurance payment system, the error information included in the orbit forecast information includes a verification record, and the insurance premium rate is set to a lower value as the verification record is more detailed.

In the insurance payment system, the assessment of the insurance premium rate varies depending on the records of past similar collision accidents.

In the insurance payment system, the assessment of accident liability and the assessment of an insurance payment vary depending on the records of past similar collision accidents.

The server includes the following phases.
  A phase of accepting a contract after a space object collision alert has been acquired.
  A phase of deciding an insurance premium rate, based on the error information of forecast orbit information recorded in the space object information.
  A phase of, after occurrence of a collision accident, assessing accident liability of each of the space object A and the space object B that have collided with each other, based on a difference between record orbit information and forecast orbit information.
  A phase of assessing an insurance payment.
  A phase of terminating the contract upon completion of an insurance payment or when a collision accident alerted by the space object collision alert has not occurred.

The space insurance program causes a computer to execute a process of making an insurance payment from a pre-collected insurance premium when a collision has occurred between the space object A and the space object B among the plurality of space objects.

The space insurance program includes danger alert output means to identify existence of danger-anticipated objects based on the orbit forecast information included in the space information recorder before a collision occurs between space objects among a plurality of space objects flying in space, and output a danger alert.

The space collision insurance by the space insurance program is ad-hoc space collision insurance to be purchased, after a danger alert is issued by the collision avoidance assistance program, by the management business operator that owns a space object for which a collision is foreseen. An insurance payment is made when the foreseen collision accident has actually occurred, and the contract is terminated when the danger time period for which the alert is issued has elapsed without any accident.

The space collision insurance by the space insurance program can be purchased by a mega-constellation business operator that owns a mega-constellation, which is a large-scale satellite constellation, on a per satellite group basis, and an insurance payment can be received in the event of a collision accident.

The space collision insurance by the space insurance program does not cover higher-order damage associated with a chain-reaction collision caused by a foreseen collision accident.

The space collision insurance by the space insurance program covers higher-order damage associated with a chain-reaction collision caused by a foreseen collision accident.

In the space collision insurance by the space insurance program, the details of the insurance premium rate setting means and the insurance payment assessment means vary depending on the records of past similar collision accidents.

Embodiment 5

In this embodiment, differences from Embodiments 1 to 4 will be mainly described. Components that are substantially the same as those in Embodiments 1 to 4 are denoted by the same reference signs and description thereof may be omitted.

*Description of Configuration*

Figure 41:
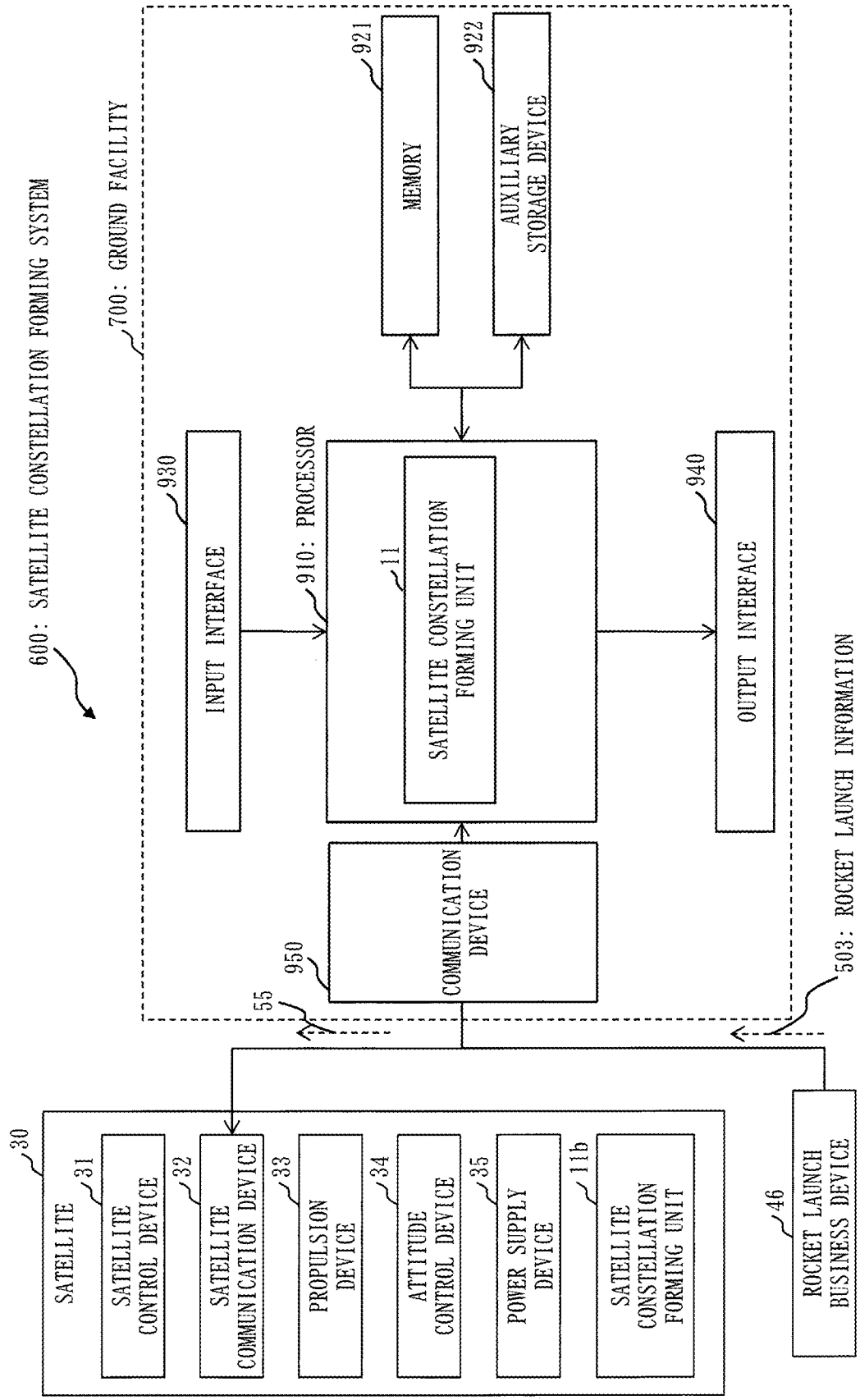
FIG. 41 is an example of a functional configuration of the satellite constellation forming system according to Embodiment 5.

FIG. 41 is a diagram illustrating an example of the functional configuration of the satellite constellation forming system 600.

FIG. 41 differs from FIG. 8 in that communication with the rocket launch business device 46 is illustrated.

Figure 42:
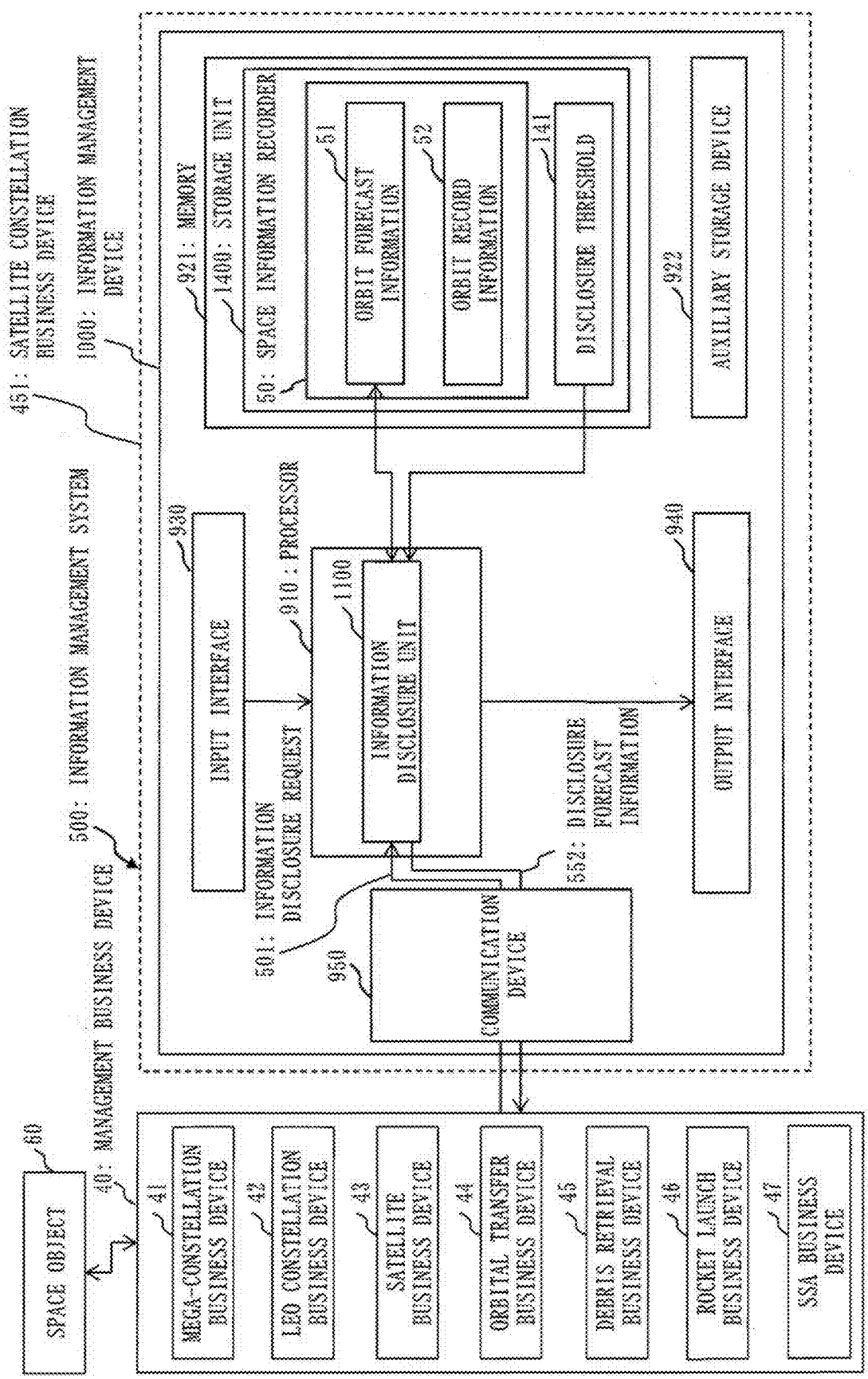
FIG. 42 is a configuration diagram of an information management system according to Embodiment 5.

FIG. 42 is a configuration diagram of an information management system 500 according to this embodiment.

The information management system 500 includes the management business devices 40 and an information management device 1000.

The information management device 1000 is installed in at least one of the management business devices 40 each of which manages a plurality of space objects 60 flying in space. Specifically, the information management device 1000 is a satellite constellation business device 451 used by a satellite constellation business operator that forms a satellite constellation composed of a plurality of satellites. The mega-constellation business device 41 and the LEO constellation business device 42 are examples of the satellite constellation business device 451.

The information management device 1000 discloses information on a plurality of space objects flying in space, for example, information on a satellite constellation to another management business device 40.

Another management business device 40 refers to another management business device in which the information management device 1000 itself is not installed. Specifically, another management business device 40 is the rocket launch business device 46, the orbital transfer business device 44, or the debris retrieval business device 45 used by a debris retrieval business operator. Even when the information management device 1000 is installed in the satellite constellation business device 451, another management business device 40 may be another satellite constellation business device.

The information management device 1000 may be a device that centrally manages a satellite constellation business device used by a satellite constellation business operator that forms a satellite constellation composed of a plurality of satellites and a rocket launch business device used by a rocket launch business operator.

The management business device 40 manages space objects 60 such as artificial satellites or debris. The management business device 40 is a computer of a business operator that collects information on space objects 60 such as artificial satellites or debris.

The management business device 40 includes devices such as the mega-constellation business device 41, the LEO constellation business device 42, the satellite business device 43, the orbital transfer business device 44, the debris retrieval business device 45, the rocket launch business device 46, and the SSA business device 47.

The management business device 40 may collect information on space objects such as artificial satellites or debris, and provide the collected information to the information management device 1000. When the information management device 1000 is installed on a public SSA server, the information management device 1000 may be configured to function as the public SSA server.

The information management device 1000 includes a processor 910, and also includes other hardware components such as a memory 921, an auxiliary storage device 922, an input interface 930, an output interface 940, and a communication device 950. The processor 910 is connected with other hardware components via signal lines and controls these other hardware components.

The information management device 1000 includes, as functional components, an information disclosure unit 1100 and a storage unit 1400. In the storage unit 1400, the space information recorder 50 and a disclosure threshold 141 are stored. The disclosure threshold 141 is a threshold for determining whether the orbit forecast information 51 is to be disclosed.

The functions of the information disclosure unit 1100 are realized by software. The storage unit 1400 is provided in the memory 921. Alternatively, the storage unit 1400 may be provided in the auxiliary storage device 922. Alternatively, the storage unit 1400 may be divided and provided in the memory 921 and the auxiliary storage device 922.

The hardware configuration of the space insurance assistance device 200 is substantially the same as that in the collision avoidance assistance device 100 in Embodiment 1.

\*\*\*Description of Operation\*\*\*

<Information Disclosure Process: S1000>

Figure 43:
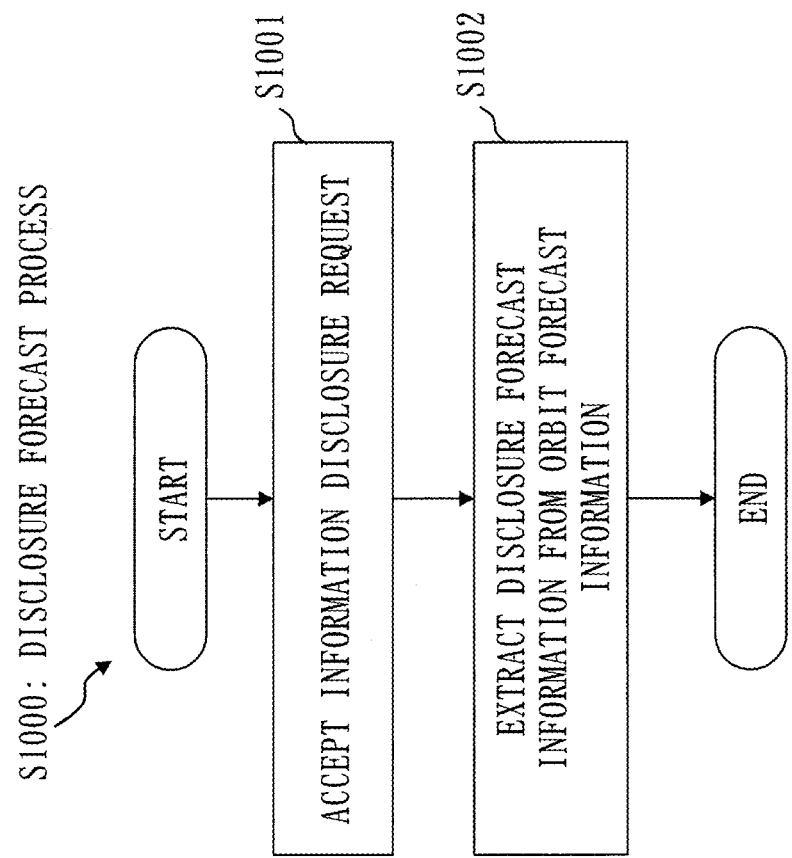
FIG. 43 is a flowchart of an information disclosure process according to Embodiment 5.

FIG. 43 is a flowchart of an information disclosure process S1000 according to this embodiment.

In the information disclosure process, the information disclosure unit 1100 determines whether the orbit forecast information 51 is to be disclosed to another management business device 40, based on the disclosure threshold 141 for determining whether the orbit forecast information 51 is to be disclosed and the forecast error 514. For example, if the forecast error 514 is equal to or greater than the disclosure threshold 141, the information disclosure unit 1100 discloses the orbit forecast information 51 to another management business device. For example, if the forecast error 514 is smaller than the disclosure threshold 141, the orbit forecast information 51 is not to be disclosed to another management business device. A determination as to whether information is to be disclosed or not to be disclosed may be made by a determination method other than the above.

In step S1001, the information disclosure unit 1100 accepts, from another management business device, an information disclosure request 551 to request disclosure of the orbit forecast information 51.

In step S1002, the information disclosure unit 1100 extracts disclosure forecast information 552 from pieces of orbit forecast information corresponding to the space objects included in the orbit forecast information 51. For example, the information disclosure unit 1100 may extract orbit forecast information in which the forecast error 514 is equal to or greater than the disclosure threshold 141 as the disclosure forecast information 552 from the pieces of orbit forecast information corresponding to the space objects included in the orbit forecast information 51. The information disclosure unit 1100 may extract the disclosure forecast information 552 by any other method. The information disclosure unit 1100 outputs the disclosure forecast information 552 to the other management business device. At this time, it may be arranged that the information disclosure unit 1100 transmits the disclosure forecast information 552 to the other management business device for a fee after accepting the information disclosure request 551.

For example, the rocket launch business device 46 transmits the information disclosure request 551 to request disclosure of the orbit forecast information 51 to the information management device 1000. The rocket launch business device 46 receives the disclosure forecast information 552 from the information management device 1000 as a response to the information disclosure 552 request 551.

<Satellite Constellation Control Process: S2000>

Figure 44:
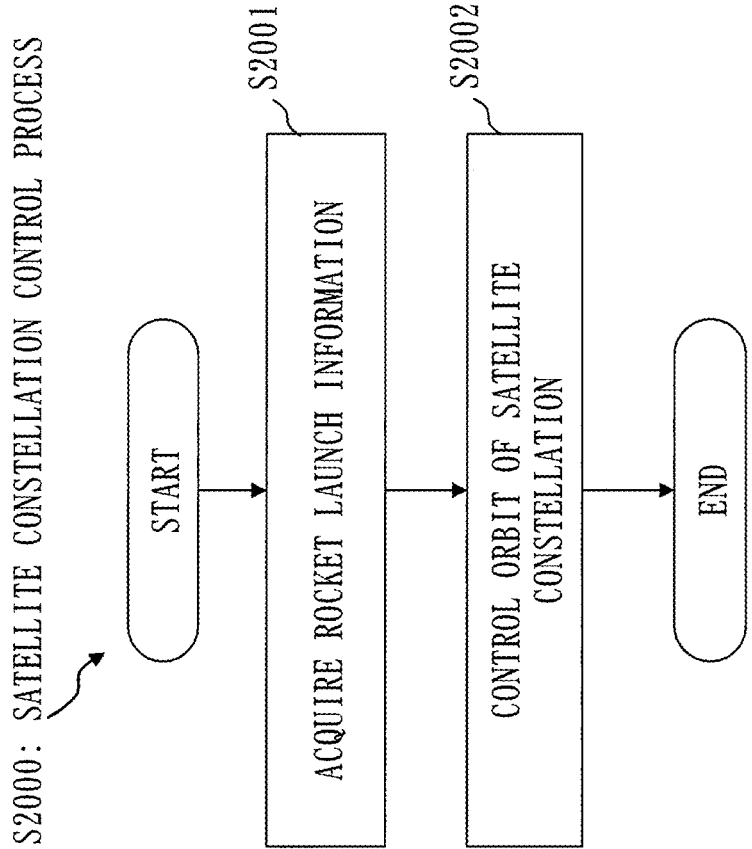
FIG. 44 is a flowchart of a satellite constellation control process according to Embodiment 5.

FIG. 44 is a flowchart of a satellite constellation control process S2000 according to this embodiment.

Referring to FIGS. 41 and 44, the satellite constellation control process S2000 will be described, which is performed when the satellite constellation forming system 600 acquires rocket launch information 503 from the rocket launch business device 46 that has received the disclosure forecast information 552.

The satellite constellation control process S2000 is a process of controlling the orbit of a satellite constellation 20 when a space object such as a rocket passes the satellite constellation 20.

In step S2001, the satellite constellation forming unit 11 acquires, from the rocket launch business device 46, the rocket launch information 503 including a lift-off point of a rocket in a rocket launch and a scheduled lift-off time of the rocket at the lift-off point.

In step S2002, based on the rocket launch information 503, the satellite constellation forming unit 11 controls the orbit of each of a plurality of satellites so that each of the plurality of satellites will not fly on the flight path of the rocket at the time at which the rocket after lift-off is scheduled to fly on the flight path. Specifically, the satellite constellation forming unit 11 operates the propulsion device 33 of each of the plurality of satellites to raise or lower the orbital altitude of each of the plurality of satellites, so as to control the orbit of each of the plurality of satellites so that the orbital plane of the plurality of satellites is shifted from airspace above the lift-off point. For example, the satellite constellation forming unit 11 generates an orbit control command 55 to perform the above orbit control and transmits it to each satellite 30.

Specific examples and effects of the information disclosure process and the satellite constellation control process will be described below.

Figure 45:
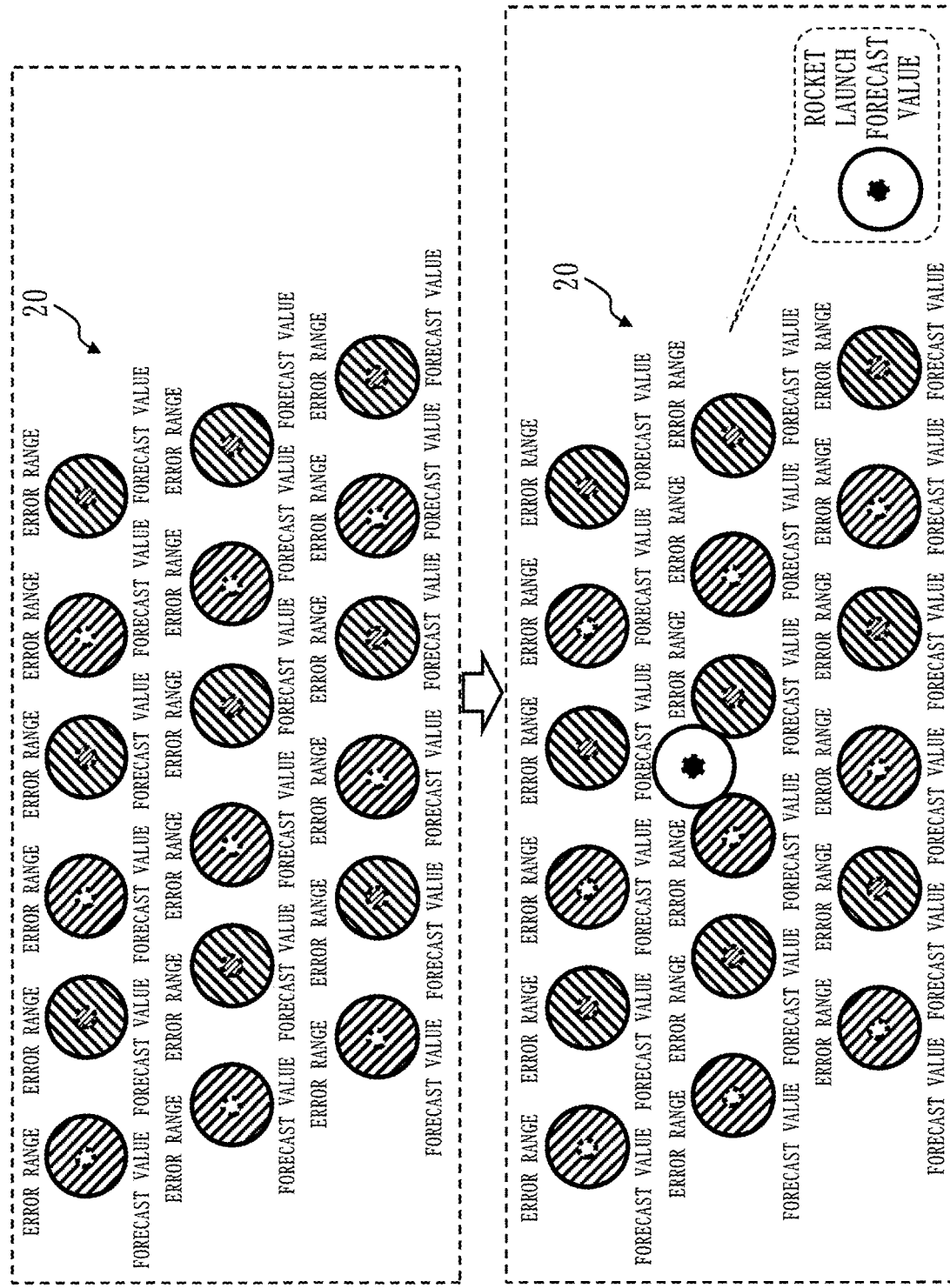
FIG. 45 is a diagram illustrating a forecast value of a rocket launch and error ranges of a satellite constellation according to Embodiment 5.

FIG. 45 is a diagram illustrating a rocket launch forecast value and error ranges of the satellite constellation 20. The satellite constellation 20 is, for example, a large-scale satellite constellation including several hundred to several thousand satellites, that is, a mega-constellation.

The upper part of FIG. 45 is a conceptual diagram of the satellite constellation 20 modeled in a two-dimensional space. The lower part of FIG. 45 is a conceptual diagram of a launch window for a rocket launch when the satellite constellation 20 of the upper part of FIG. 45 is located overhead.

As illustrated in the lower part of FIG. 45, when the error range of each satellite in the satellite constellation 20 is considered, the launch window allowed for a rocket launch is limited.

Therefore, the satellite constellation forming system 600 needs to control the orbit of the satellite constellation 20 based on the rocket launch information 503.

Figure 46:
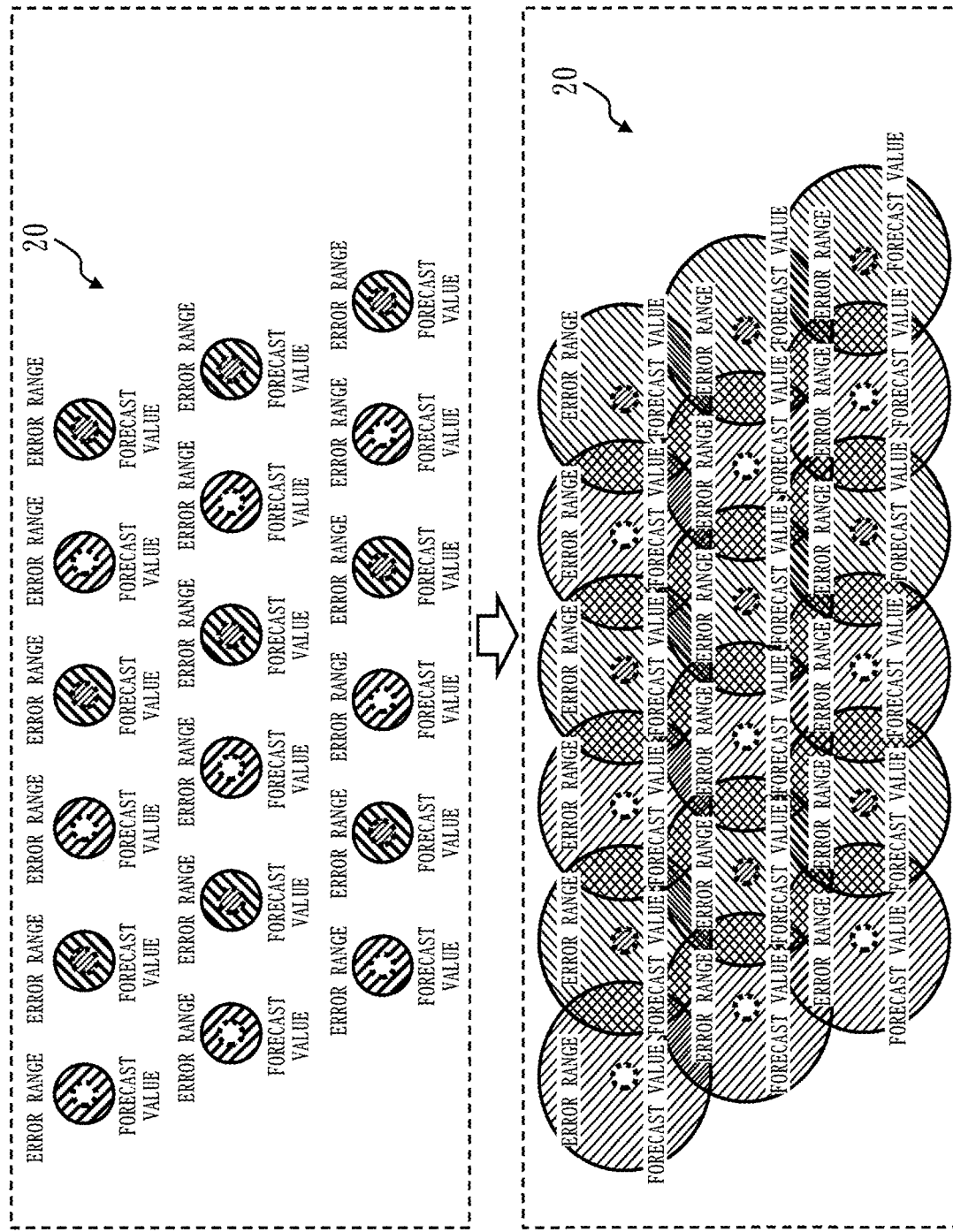
FIG. 46 is a diagram illustrating a forecast value of a rocket launch and error ranges of a satellite constellation according to Embodiment 5.

FIG. 46 is a diagram illustrating a rocket launch forecast value and error ranges of the satellite constellation 20.

The upper part of FIG. 46 is a conceptual diagram illustrating the satellite constellation 20 with small error ranges. The lower part of FIG. 46 is a conceptual diagram illustrating the satellite constellation 20 with large error ranges.

As illustrated in the upper part of FIG. 46, it may be possible to reduce the error ranges in the satellite constellation business operator's own system by using methods such as differential evaluation of inter-satellite distance measurement data and GPS measurement values or statistical data evaluation.

If the satellite constellation business operator does not disclose the error ranges, the rocket launch business operator will rely on external measurement information such as the SSA business operator for information on the forecast values of satellite orbits. As a result, the rocket launch business operator may be able to know only forecast values with large error ranges.

By arranging that orbit forecast information with error ranges within a predetermined range is disclosed for a fee as described above, it is possible to contribute to a business that provides precise orbit forecast values that are useful for the rocket launch business operator.

The orbit forecast information used by the rocket launch business operator when launching a rocket has been described here. However, this embodiment can also be applied in various situations such as passage through a satellite constellation when a satellite is inserted, passage through a satellite constellation in retrieving debris, or research on the orbit of a space object.

Description of Effects of this Embodiment

The information management device 1000 according to this embodiment allows a satellite constellation business operator that forms a mega-constellation to disclose forecast values of orbit information of its own satellites to a rocket launch business operator, a geostationary satellite orbital insertion business operator, or a debris retrieval business operator for a fee.

In order for the rocket launch business operator to fulfil its obligations to secure flight safety, precise predicted orbit information of the satellites constituting mega-constellations is needed. Therefore, the information management device 1000 according to this embodiment has the effect of increasing the asset value of satellite orbit prediction information and providing a source of revenue for satellite business operators.

While a satellite after completing a mission is deorbiting, there is a high risk of collision with a satellite in a mega-constellation. Similarly, it may be possible to seek liability of a deorbit satellite business operator or a debris retrieval business operator that has failed to take collision avoidance measures for orbit information that has been disclosed, and this has the effect that satellite orbit information becomes a source of revenue.

Furthermore, the business operator that inserts a geostationary satellite into orbit launches the geostationary satellite into a geostationary transfer orbit with a rocket, and then achieves orbital transfer to a geostationary orbit with the propulsion device included in the satellite, so that there is a risk of collision with a mega-constellation satellite in that process and a similar effect is expected.

The information management device 1000 according to this embodiment allows the rocket launch business operator to share the forecast values of satellite orbit information of a mega-constellation business operator of low orbital altitudes. Therefore, the rocket launch business operator can develop a rocket launch business whose competitiveness is to launch a rocket without risk of collision without using disclosed information of predicted satellite orbit information.

If the predicted orbit information of satellites itself becomes valuable in monetary terms, the capability to launch a rocket without using paid information produces a cost reduction effect, which has the effect of becoming a source of the competitiveness as a business operator.

With the satellite constellation forming system 600 according to this embodiment, in a rocket launch for which the allowed launch time at the lift-off point is limited the orbits of satellites can be changed in advance so that no satellite will be flying on the flight path at the scheduled lift-off time at the lift-off point.

In a planetary space probe for rendezvous with a planet flying in a specific orbit, the launch window that allows appropriate launch from the lift-off point may be limited to a short period of time of several seconds. Since Earth is rotating in contrast to the orbital planes of satellites flying in inertial space according to the law of nature, there is a risk of collision with a satellite that happens to be flying on the launch flight path. In a mega-constellation the interval between arrivals of successive satellites in the same orbital plane may be only several tens of seconds, so that sufficient collision avoidance is difficult unless measures are taken to prevent the orbital plane from being positioned overhead. In the satellite constellation forming system 600 according to this embodiment, the satellite mega-constellation side operates the propulsion devices of all the satellites in advance so that the orbital plane is not positioned in airspace above the specific lift-off point at the specific time. By raising or lowering the orbital altitude of the satellites to adjust the relative relationship between the orbital plane and the rotation of Earth, the orbital plane is shifted to avoid being positioned in airspace above the specific lift-off point at the specific time, so as to avoid collisions. If only individual satellites are adjusted, there will be a risk of collision with other satellites in the mega-constellation, so that it is important to adjust all the satellites in synchronization.

In this embodiment, the information management method of the information management device as presented below has been described.

The information management device manages orbit forecast information included in a management business device that manages satellites constituting a satellite constellation.

A processor of the information management device includes a disclosure threshold and information disclosure allowance judging means to determine whether or not disclosure is to be performed. The disclosure threshold is information for determining whether orbit forecast information of a satellite constellation management business device is to be disclosed if it is forecast based on the orbit forecast information that a satellite in the satellite constellation and a space object whose orbit forecast information has been acquired from a different management business device will come in proximity to each other at a specific time.

The different management business device is a rocket launch business device, an orbital transfer business device, or a debris retrieval business device.

A management business device A that manages a rocket launch includes a space information recorder A to record space object information A including lift-off time information of the rocket launch and orbit forecast information.

A management business device B that manages satellites constituting a satellite constellation includes a space information recorder B to record space object information B including a forecast epoch, forecast orbit information, and a forecast error of each of the satellites constituting the satellite constellation.

A management business device C with which an analysis business operator that analyzes a collision between space objects manages space object information includes a space information recorder C to record various types of space object information acquired from a management business device used by a management business operator that manages a plurality of space objects.

The satellite constellation management business device does not disclose the space object information B to the space information recorder A and the space information recorder C owned by other business operators.

Then, a single business operator exclusively uses the space object information A and the space object information B to perform a collision analysis, so as to derive conditions for securing flight safety in the rocket launch and avoid a collision.

The satellite constellation management business device discloses the space object information B for a fee to the space information recorder A and the space information recorder C owned by other business operators.

Then, only a single business operator uses the space object information A and the space object information B at no cost to perform a collision analysis, so as to derive conditions for securing flight safety in the rocket launch and avoid a collision.

The satellite constellation management business device does not disclose the space object information B to the space information recorder A and the space information recorder C owned by other business operators.

Then, the satellite constellation business operator uses the space object information A and the space object information to B to perform a collision analysis, and if a collision is foreseen, the satellite constellation business operator carries out an avoidance action to secure flight safety.

*Other Configurations*

In this embodiment, the functions of the information management device 1000 are realized by software. As a modification example, the functions of the information management device 1000 may be realized by hardware.

Figure 47:
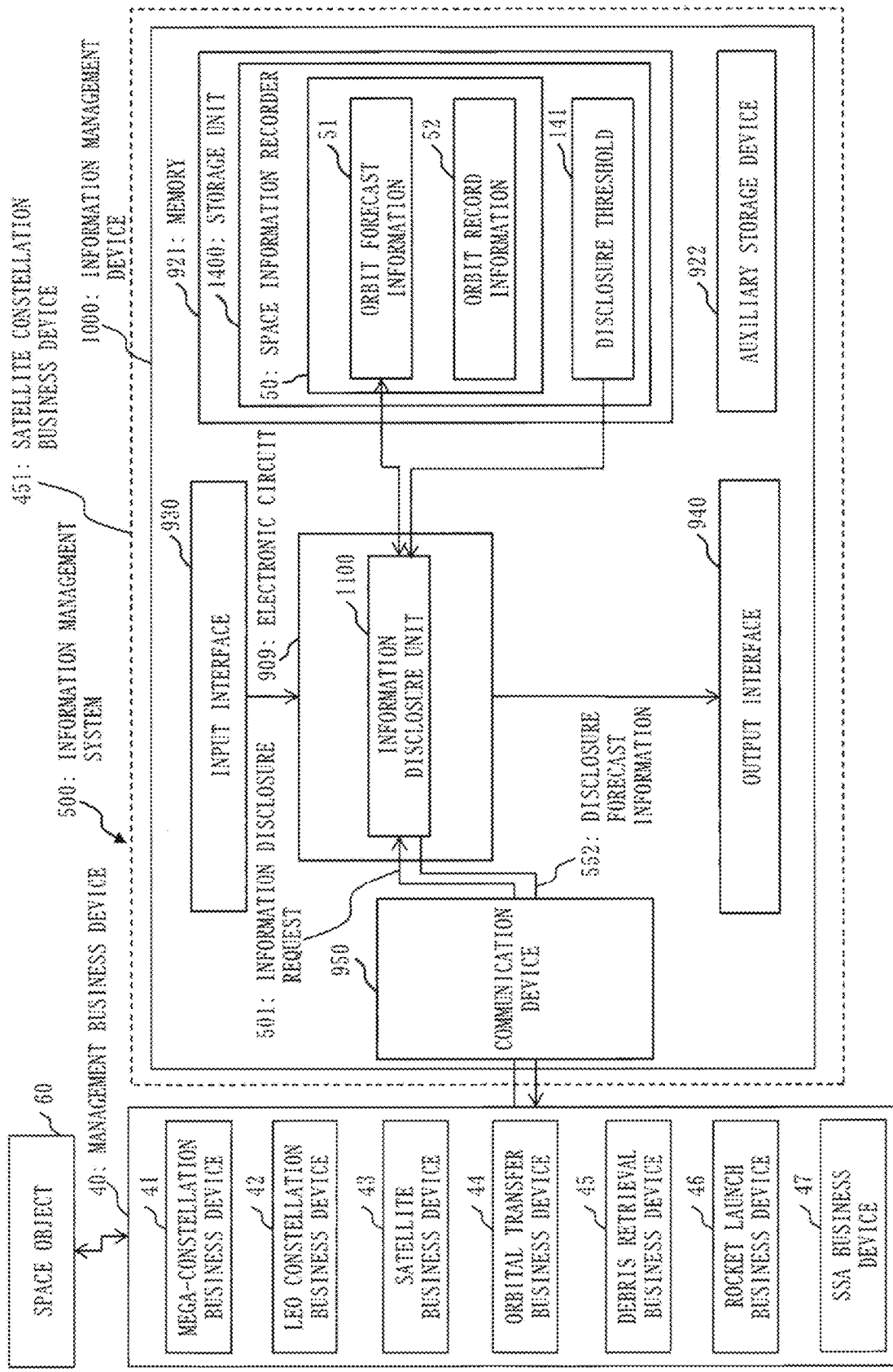
FIG. 47 is a configuration diagram of an information management device according to a modification example of Embodiment 5.

FIG. 47 is a diagram illustrating a configuration of the information management device 1000 according to a modification example of this embodiment.

The information management device 1000 includes an electronic circuit in place of the processor 910.

The electronic circuit is a dedicated electronic circuit that realizes the functions of the information management device 1000.

Specifically, the electronic circuit is a single circuit, a composite circuit, a programmed processor, a parallel-programmed processor, a logic IC, a GA, an ASIC, or an FPGA. GA is an abbreviation for Gate Array.

The functions of the information management device 1000 may be realized by one electronic circuit, or may be distributed among and realized by a plurality of electronic circuits.

As another modification example, some of the functions of the information management device 1000 may be realized by the electronic circuit, and the rest of the functions may be realized by software.

Each of the processor and the electronic circuit is also called processing circuitry. That is, the functions of the information management device 1000 are realized by the processing circuitry.

In Embodiments 1 to 5 above, each unit of each device and each system has been described as an independent block. However, the configurations of each device and each system may be different from the configurations described in the above embodiments. The functional blocks of each device and each system may be arranged in any configuration, provided that the functions described in the above embodiments can be realized. Each device and each system may be configured with one device or a plurality of devices.

In Embodiments 1 to 5 above, the terms such as "unit", "step", "procedure", "phase", "process", and "means" in the constituent elements of each device and each system can be interpreted or replaced interchangeably. For example, the terms "phase of making an insurance payment" described in the modification examples of Embodiments 3 and 4 can be interpreted as "means for making an insurance payment" or "unit to make an insurance payment". The information disclosure unit of the information management device 1000 described in Embodiment 5 may be interpreted as the information disclosure step, the information disclosure phase, the information disclosure process, or the information disclosure means.

Portions of Embodiments 1 to 5 may be implemented in combination. Alternatively, one portion of these embodiments may be implemented. These embodiments may be implemented as a whole or partially in any combination.

In Embodiments 1 to 5, Embodiments 1 to 5 may be freely combined. In Embodiments 1 to 5, the constituent elements may be modified in any way. Alternatively, Embodiments 1 to 5 may be implemented with any of the constituent elements omitted.

The embodiments described above are essentially preferable examples and are not intended to limit the scope of the present invention, the scope of applications of the present invention, and the scope of uses of the present invention. The embodiments described above can be modified in various ways as necessary.

REFERENCE SIGNS LIST

20: satellite constellation; 21: orbital plane; 22: proximity alert; 23: collision alert; 25: danger alert; 30, 30a, 30b: satellite; 31: satellite control device; 32: satellite communication device; 33: propulsion device; 34: attitude control device; 35: power supply device; 40: management business device; 41: mega-constellation business device; 42: LEO constellation business device; 43: satellite business device; 44: orbital transfer business device; 45: debris retrieval business device; 46: rocket launch business device; 47: SSA business device; 50: space information recorder; 51: orbit forecast information; 511, 521: space object ID; 512: forecast epoch; 513: forecast orbital elements; 514: forecast error; 515: forecast flight state; 52: orbit record information; 522: record epoch; 523: record orbital elements; 524: specific record; 525: record flight state; 241: specific time; 242: record location coordinates; 515: forecast flight state; 60: space object; 65: danger-anticipated object; 69: avoidance space object; 70: Earth; 100, 100a: collision avoidance assistance device; 110: recorder processing unit; 120: alert control unit; 130: record presentation unit; 131: collision record; 140: storage unit; 141: alert issuance information; 150: avoidance decision unit; 160: machine learning unit; 401: flight forecast information; 402: flight record information; 403: avoidance object notification; 500: collision avoidance assistance system; 55: orbit control command; 501, 501a, 501b: orbit forecast; 502, 502a, 502b: error range; 600: satellite constellation forming system; 601: collision-anticipated object; 602: proximity-anticipated object; 65: danger-anticipated object; 11,11b: satellite constellation forming unit; 300: satellite group; 700: ground facility; 510: orbit control command generation unit; 520: analytical prediction unit; 910: processor; 921: memory; 922: auxiliary storage device; 930: input interface; 940: output interface; 950: communication device; 1000: information management device; 1100: information disclosure unit; 1400: storage unit; 503: rocket launch information.

The invention claimed is:

1. A satellite constellation forming system to form a satellite constellation composed of a plurality of satellites, the satellite constellation forming system comprising:
    processing circuitry to acquire rocket launch information including a lift-off point of a rocket in a rocket launch and a scheduled lift-off time of the rocket at the lift-off point;
    the processing circuitry is further configured to control an orbit of each of the plurality of satellites based on the rocket launch information so that each of the plurality of satellites will not fly on a flight path of the rocket at a time at which the rocket after lift-off is scheduled to fly on the flight path; and
    the processing circuitry operates a propulsion device on each of the plurality of satellites to raise an orbital altitude of each of the plurality of satellites in synchronization based on the rocket launch information, so as to control the orbit of each of the plurality of satellites so that an orbital plane of the plurality of satellites is shifted from airspace above the lift-off point.

2. A ground facility comprising
    the satellite constellation forming system according to claim 1.

3. The satellite constellation forming system according to claim 1, wherein:
    the propulsion device on each of the plurality of satellites is an electronic thruster, an ion engine, or a Hall thruster configured to provide a thrust force to the respective satellite.

4. A satellite constellation forming method of a satellite constellation forming system to form a satellite constellation composed of a plurality of satellites, the satellite constellation forming method comprising
    acquiring rocket launch information including a lift-off point of a rocket in a rocket launch and a scheduled lift-off time of the rocket at the lift-off point
    controlling an orbit of each of the plurality of satellites, based on the rocket launch information, so that each of the plurality of satellites will not fly on a flight path of the rocket at a time at which the rocket after lift-off is scheduled to fly on the flight path; and
    operating a propulsion device on each of the plurality of satellites to raise an orbital altitude of each of the plurality of satellites in synchronization based on the rocket launch information, so as to control the orbit of each of the plurality of satellites so that an orbital plane of the plurality of satellites is shifted from airspace above the lift-off point.

\* \* \* \* \*